United States Patent [19]

Lu et al.

[11] Patent Number: 5,654,820
[45] Date of Patent: Aug. 5, 1997

[54] OPTOELECTRONIC SYSTEM FOR IMPLEMENTATION OF ITERATIVE COMPUTER TOMOGRAPHY ALGORITHMS

[75] Inventors: Tongxin Lu, Mountain View, Calif.; Satish S. Udpa, Ames, Iowa

[73] Assignee: Iowa State University Research Foundation, Inc., Ames, Iowa

[21] Appl. No.: 415,892

[22] Filed: Apr. 3, 1995

Related U.S. Application Data

[63] Continuation of Ser. No. 880,716, May 8, 1992, Pat. No. 5,414,623.

[51] Int. Cl.$^6$ .................. G02B 26/08; G01S 13/00; G06F 15/00
[52] U.S. Cl. .................. 359/298; 359/32; 342/179
[58] Field of Search .................. 359/559, 298, 359/32; 342/179; 364/413.19, 413.21, 413.16, 822, 413.17

[56] References Cited

U.S. PATENT DOCUMENTS

| | | | |
|---|---|---|---|
| 4,107,532 | 8/1978 | MaCovski | 250/360 |
| 4,222,104 | 9/1980 | Moore | 364/413.17 |
| 4,302,675 | 11/1981 | Wake et al. | 250/363 S |
| 4,709,333 | 11/1987 | Crawford | 364/414 |
| 4,879,652 | 11/1989 | Nowak | 364/413.18 |
| 4,916,745 | 4/1990 | Hart et al. | 382/6 |
| 4,920,491 | 4/1990 | Eberhard et al. | 364/413.19 |
| 4,980,552 | 12/1990 | Cho et al. | 250/363.03 |
| 5,008,822 | 4/1991 | Brunnett et al. | 364/413.21 |
| 5,053,958 | 10/1991 | Tam | 364/413.13 |
| 5,384,573 | 1/1995 | Turpin | 342/179 |

FOREIGN PATENT DOCUMENTS 1283915  8/1972  United Kingdom.

OTHER PUBLICATIONS

G. N. Hounsfield, "Computerized transverse axial scanning (tomography): Part 1. Description of system," *British Journal of Radiology*, 46, 1016–1022, 1973.

A. M. Cormack, "Representation of a Function by Its Line Integrals, with Some Radiological Applications," *Journal of Applied Physics*, vol. 34, No. 9, pp. 2722–2727 Sep. 1963.

Peter Gilbert, "Iterative Method for the Three-dimensional Reconstruction of an Object from Projections," *J. Theor. Biol.* 36, 105–117, 1972.

T. Lu, et al., "Projection Iterative Reconstruction Technique and Optoelectronic Implementation," *Proc. IEEE ISCAS '92*, 2469–2472, San Diego, May 10–13, 1992.

T. M. Peters, "Spatial Filtering to Improve Transverse Tomography," *IEEE Trans. on Biomed. Eng.*, BME 21, 214–219, 1974.

T. Lu, et al., "Tomographic Reconstruction Using Optoelectronic Architecture," *Proc. of IEEE ISCAS –91*, 1, 476–479, Singapore, Jun., 1991.

(List continued on next page.)

*Primary Examiner*—Loha Ben
*Attorney, Agent, or Firm*—Schwegman, Lundberg & Woessner, P.A.

[57] ABSTRACT

An optoelectronic tomographic reconstruction system utilizes spacial light modulators in charge couple devices to perform projection iterative reconstruction techniques and simultaneous iterative reconstruction techniques. A back projection processor uses a linear array of analog spacial light modulators in a cylindrical lens, an image detection array, and an image rotator. The image rotator smears a projected image at the same angle as the projection was taken. The back projection processor thus smears the projection back to the image space. An optoelectronic forward projection processor uses an spacial light modulator array, an image rotator, and an image detecting array. A reconstructed image displayed by the spacial light modulator is smeared by the rotator to forward project the reconstructed image on the image detecting array at the same angle as when the measured projection was taken. The forward projection processor thus smears the reconstructed image back into the projection space.

2 Claims, 52 Drawing Sheets

OTHER PUBLICATIONS

T. Lu, et al., "Optoelectronic implementation of filtered back projection tomography algorithm," *Proc. of SPIE 1991 Int. Symposium on Optical Appl. Sci. and Eng. on Optical Information Processing Systems and Architectures III, SPIE*, vol. 1564, pp. 704–713, San Diego, Jul. 21–26, 1991.

A. C. Kak, et al., "Principles of Computerized Tomographic Imaging," *IEEE Press*, New York, 1986, 1–4, 49–75, 107–112.

G. T. Herman, "Image Reconstruction from Projections –The Fundamentals of Computerized Tomography," *Academic Press*, New York, 1980, pp. 26–39.

Keigo Iizuka, "Engineering Optics –with 385 Figures," 35, Springer Series in Opt. Sci. Springer–Verlag, New York, 1985, pp. 295–311.

Johann Radon, "Uber die Bestimmug von Funktionen durch ihre integralwerte langas geswisser Manningfaltigkeiten," *Ber. Verb. Saechs. Akad. Wiss.*, Leipzig. Math. Phys. K1., 69, 262–277, 1977. (No Translation Available).

R. Gordon, et al. "Algebraic Reconstruction Techniques (ART For Three–dimensional Electron Microscopy and X–ray Photography," *J. theor. Biol.* 29, pp. 471–481, 1970.

S. Kaczmarz, "Angenaherete Auflosung von Systemen linearer Gleichungen," *Bull. Acad. Pol. Sci. Letter A.*, 6(8A), 355–357, 1937.

L. Landweber, "An Interation Formula for Fredholm Integral Equations of the First Kind," *Amer. J. Math.*, 73, 615–624, 1951.

M. R. Hestenes, et al., "Methods of Conjugate Gradients for Solving Linear Systems," *Journal of Research National Bureau of Standards*, vol. 49, No. 6, 409–436, Dec, 1952.

E. Artzy, et al., "Quadratic Optimization for Image Reconstruction, II," *Computer Graphics and Image Proc.* 11, 242–261, 1979.

Tin–Su Pan, "Numerical Study of Multigrid Implementations of Some Iterative Image Reconstruction Algorithms," *IEEE Trans. On Medical Imaging.*, 10 (4), 572–588, Dec., 1991.

S. Holte, et al., "Iterative Image Reconstruction for Positron Emission Tomography: A Study of Convergence and Quantitization Problems," *IEEE Trans. On Nuclear Science*, 37 (2), 629–635, Apr., 1990.

N. J. Dusaussoy, et al., "The Extended MENT Algorithm: A Maximum Entropy Type Algorithm Using Prior Knowledge for Computerized Tomography," *IEEE Trans. on Signal Proc.*, 39 (5), 1164–1180, May, 1991.

A. P., Dempster, et al., "Maximum Likelihood from Incomplete Data via the EM Algorithm," *J. Royal St. Soc.*, 39 (1), 1–38, 1977.

L. A. Shepp et al., "Maximum Likelihood Reconstruction for Emission Tomography," *IEEE Transactions on Medical Imaging*, vol. MI–1, No. 2, 113–122, Oct., 1982.

Linda Kaufman, "Implementing and Accelerating the EM Algorithm for Positron Emission Tomography," *IEEE Transactions on Medical Imaging*, vol. MI–6, No. 1, 37–51, Mar., 1987.

J. H. Kim, et al., "Iterative Reconstruction–Reprojection in Projection Space," *Proc. IEEE*, 73, 1140–1141, Jun., 1985.

J. H. Kim, et al., "Projection Space Iteration Reconstruction–Reprojection," *IEEE Transactions on Medical Imaging*, MI–4, No. 3, 139–143, Sep., 1985.

Jerry L. Prince and Alan S. Willsky, "A Projection Space Map Method for Limited Angle Reconstruction," *Proc. IEEE ICASSP '88*, 1268–1271, 1988.

Jerry L. Prince and Alan S. Willsky, "A Geometric Projection–Space Reconstruction Algorithm," *Linear Algebra and Its Applications*, 130, 151–189, 1990.

Jerry L. Prince and Alan S. Willsky, "Reconstructing Convex Sets from Support Line Measurements," *IEEE Transactions on Pattern Analysis and Machine Intelligence*, 12 (4), 377–389, Apr., 1990.

S. Kawata, et al., "Construction Iterative Reconstruction by the Conjugate Gradient Method," *IEEE Transactions on Medical Imaging*, vol. MI–4 No. 2, Jun., 1985.

A. van der Sluis, et al. "SIRT–and CG–Type Methods for the Iterative Solution of Sparse Linear Least–Squares Problems," *Linear Algebra and Its Applications*, 130, 257–303, 1990, Special issue on linear algebra in computed tomography, edited by G. T. Herman.

Guy Demonent, "Image Reconstruction and Restoration: Overview of Common Estimation Structures and Problems," *IEEE Transactions on Acoustics, Speech, and Signal Processing*, vol. 37 (12), 2024–2036, Dec., 1989.

M. I. Sezan and H. Stark, "Image Restoration by the Method of Convex Projections: Part 2—Applications and Numerical Results," *IEEE Transactions on Medical Imaging*, vol. MI–1, No. 2, pp. 95–101 Oct., 1982.

S. Kou, et al., "Resolution Enhancement of Reconstructed Images by Using Image Restoration Techniques," *Proc. IEEE Int. Conf. EMBS*, Philadelphia, PA, Nov., 1990.

C. Hamaker, et al. "The Angles between the Null Spaces of X Rays," *J. of Math. Analysis and Applications*, 62, 1–23, 1978.

A. H. Andersen and A. C. Kak, "Simultaneous Algebraic Reconstruction Technique (SART): A Superior Implementation of the ART Algorithm," *Ultrasonic Imaging* 6, 81–94, 1984.

Anders H. Andersen, "Tomography transform and inverse in geometrical optics," *Journal of Optical Society of America*, 4 (8), 1385–1395, Aug., 1987.

S. Duinker, et al. "Transaxial Analogue Tomography," *Oldelft Sci. Eng. Q.*, 1, 41–66, 1978.

Paul Edholm, et al., "Transverse Tomography with Incoherent Optical Reconstruction," *Phys. Med. Biol.*, 23 (1), 90–99, 1978.

Paul Edholm, "Tomogram Reconstruction Using an Opticophotographic Method," *Acta Radiologica Diagnosis*, 18, pp. 126–144, 1977.

Harrison H. Barrett, et al. "Analog Reconstruction Methods for Transaxial Tomography," *Proceedings of the IEEE*, vol. 65, No. 1, pp. 89–107, Jan., 1977.

A. F. Gmitro, et al., "Optical computers for reconstructing objects from their x–ray projections," *Optical Engineering*, vol. 19, No. 3, pp. 260–271, May/Jun. 1980.

G. Gindi, et al. "Optical feature extraction via the Radon transform," *Optical Engineering*, vol. 23, No. 5, pp. 499–506, Sep./Oct. 1984.

B. Easton, Jr., "Tomographic Transformation in Optical Signal Processing," *Optical Signal Processing*, edited by J. L. Horner, Academic Press, Inc., San Diego, CA, pp. 335–386, 1987.

Andrew M. Garvie, et al., "Video–based analog tomography," *Rev. Sci. Instrum.*, vol. 61, No. 1, pp. 138–145, Jan., 1990.

Arthur F. Gmitro, et al., "Videographic Tomography –Part I: Reconstruction with Parallel–Beam Projection Data," *IEEE Transactions on Medical Imaging*, vol. 9, No. 4, pp. 366–375, Dec., 1990.

E. Kaneko, "Liquid Crystal TV Displays: Principles and Applications of Liquid Crystal Displays," *KTK Scientific Publishers/Tokyo*, pp. 1–32, 1987.

Dror G. Feitelson, "Optical Computing –A Survey for Computer Scientists," *MIT Press*, Cambridge, Mass., pp. 24–33, 1990.

Alastair D. McAulay, "Optical Computer Architectures –The Application of Optical Concepts to Next Generation Computers," *John Wiley & Sons, Inc.*, New York, pp. 68–73, 1991.

J. A. Neff, et al., "Two–Dimensional Spatial Light Modulators: A Tutorial," *Proceedings of the IEEE*, vol. 78, No. 5, pp. 826–855, May, 1990.

Arthur D. Fisher, "Spatial light modulators: functional capabilities, applications and devices," *International Journal of Optoelectronics*, vol. 5, No. 2, pp. 125–167, Sep., 1990.

David A. Jared, et al. "Ferroelectric Liquid Crystal Spatial Light Modulators," *SPIE Critical Reviews Series* vol. 1150, pp. 46–60, Aug., 1989.

K. B. Nichols, et al., "Spatial light modulations using charge–coupled–device addressing and electroabsorption effects in GaAs/AlGaAs multiple quantum wells," *Appl. Phys. Lett.*, vol. 52, No. 14, pp. 1116–1118, Apr., 1988.

T. Y. Hsu, et al., "Multiple quantum well spatial light modulators," *Spacial Light Modulators and Applications III*, 1150, pp. 61–85, Aug., 1989.

B. E. Burk, et al., "Optical Processor Components Based on GaAs CCD Technology," *Optical Computing –Digital and Symbolic*, R. Arrathoon, Editor, Marcel Dekker, Inc., New York, pp. 65–103, 1989.

B. Javidi, editor, "SLMs standardized," *SPIE Int. Tech. Working Group Newsletter*, vol. 2, No. 2, p. 5, Nov., 1991.

W. S. Boyle, et al., "Charge Coupled Semiconductor Devices," *Bell Syst. Techn. J.*, vol. 49, pp. 587–593, Apr., 1970.

D. K. Schroder, "Charge Coupled Devices–Applications," *Advanced MOS Devices (Modular Series on Solid State Devices)*, G. W. Neudeck and R. F. Pierret, Editors, Addison–Wesley Publishing Company, Inc., New York, chapter 4, pp. 129–159, 1987.

D. F. Barbe, et al., "Signal Processing with Charge–Coupled Devices," *Charge–Coupled Devices (Topics in Applied Physics)* No. 38, Springer–Verlag, New York, pp. 91–145, 1980.

C. D. Knittle, et al., "Stochastic Modeling of the Optical Distributed Arithmetic Unit," *Proc. of Opt. Computing 88*, SPIE, vol. 963, pp. 58–65, 1988.

S. C. Chan, "SLM/CCCD Structures for High Speed Numerical Computing and Signal Processing," *IEEE ISCAS '90*, pp. 2361–2364, May, 1990.

J. Boddu, et al., "High–Speed Signal Processing Architectures Using Charge Coupled Devices," *Proc. of SPIE –Devices for Optical Processing*, vol. 1562, pp. 251–262, Jul., 1991.

Jerome J. Tiemann, "Charge Domain Recursive Filters," *IEEE J. of Solid–State Circuits*, vol. SC–17, No. 3, pp. 597–605, Jun., 1982.

T. Vogelsong, et al., "Charge–Domain Integrated Circuits for Signal Processing," *IEEE J. of Solid–St. Cir.*, SC–20 (2), pp. 562–570, Apr., 1985.

E. R. Fossum, "Charge–coupled computing for focal plane image preprocessing," *Optical Engineering*, vol. 26, No. 9, pp. 916–922, Sep., 1987.

J. van der Spiegel, et al., "A Foveated Retina–Like Sensor Using CCD Technology," *Analog VLSI Implementation of Neural Systems*, edited by Carver Mean and Mohammed Ismail, Kluwer Academic Publishers, Boston, pp. 189–211, 1989.

T. Lu, et al., "High Speed Image Processing Via SLM/CCD Devices," *Proc. IEEE ISCAS '90*, 763–766, May, 1990.

T. Lu, et al., "Novel Devices for High Speed Computer Vision," *Proc.of ISMM '91*, (4 pages) Dec., 1991.

H. Dollekamp, et al., "$P^2$CCD in 60 MHz oscilloscope with digital image storage," *Phillips Tech. Rev.*, 40, pp. 55–60, May, 1982.

"1991 Loral Fairchild CCD Imaging Databook," *CCD Sensors, System and Development Technology*, Milpitas, California, pp. 296–305, 1991.

Louis A. Hageman, et al., "Background on Basic Iterative Methods," *Applied Iterative Methods*, Academic Press, Inc., New York, pp. 18–38, 1981.

V. W. Hager, "Least Squares," (chapter 5) and Iterative Methods, (chapter 7) *Applied Numerical Linear Algebra*, Prentice–Hall, Englewood Cliffs, NJ, pp. 192–207 and 319–354, respectively, 1988.

L. A. Shepp, et al., "The Fourier Reconstruction of a Head Section," *IEEE Transactions on Nuclear Science*, vol. NS–21 (3), pp. 21–43, Jun., 1974.

L. L. Scharf, *Statistical Signal Processing –Detection, Estimation and Time Series Analysis*, Addison–Wesley Publishing Company, Inc., New York, pp. 392–395, 1991.

E. J. Craig, "The N–Step Iterative Procedures," *Journal of Mathematical Physics*, 64–73, 1955.

S. H. Lee, et al. *Optical Information Processing*, S. H. Lee, editor, Springer–Verlag, New York, pp. 1–41, 69–73, 1981.

D. Casasent, "Optical Feature Extraction," *Optical Signal Processing*, J. L., Horner, editor, Academic Press, Inc., San Diego, pp. 75–95, 1987.

S. Holte et al., "Iterative Image Reconstruction for Positron Emission Tomography: A Study of Convergence and Quantitization Problems," *IEEE Trans. on Nuclear Science*, 37 (2), 629–635 (Apr., 1990).

T.Y. Hsu et al., "Multiple quantum well spatial light modulators," *Spatial Light Modulators and Applications III*, 1150, 61–85 (Aug., 1989).

K. Iizuka, "Engineering Optics," Springer Series in Opt. Sci. Springer–Verlrag, 295–311 (1985).

D.A. Jared et al., "Ferroelectric Liquid Crystal Spatial Light Modulators," *SPIE Critical Reviews Series*, 1150, 46–60 (Aug., 1989).

S. Kaczmarz, "Angenäherte Aulfösung von Systemen linearer Gleichungen," *Bull. Acad. Pol. Sci. Letter A.*, 6 (8A), 355–357 (1937).

A.C. Kak et al., "Principles of Computerized Tomographic Imaging," *IEEE Press*, 1–4, 49–75, 107–112 (1986).

L. Kaufman, "Implementating and Accelerating the EM Algorithm for Positron Emissoin Tomography," *IEEE Transactions on Medical Imaging, MI–6*, No. 1, 37–51 (Mar. 1987).

S. Kawata et al., "Constrained Iterative Reconstruction by the Conjugate Gradient Method," *IEEE Transactions on Medical Imaging, MI–4*, No. 2, 65–71 (Jun., 1985).

J.H. Kim et al., "Projection Space Iteration Reconstruction–Reprojection," *IEEE Transactions on Medical Imaging, MI–4*, No. 3, 139–143 (Sep., 1985).

J.H. Kim et al., "Iterative Reconstruction–Reprojection in Projection Space," *Proc. of the IEEE* 73, 1140–1141 (Jun., 1985).

C.D. Knittle et al., "Stochastic Modeling of the Optical Distributed Arithmetic Unit," *SPIE Opt. Computing 88,* 963, 58–65 (1988).

S. Kuo et al., "Resolution Enhancement of Reconstructed Images by Using Image Restoration Techniques," *Proc. IEEE Int. Conf. EMBS,* (Nov., 1990).

L. Landweber, "An Iteration Formula for Fredholm Integral Equations of the First Kind," *Amer. J. Math.,* 73, 615–624 (1951).

S.H. Lee et al., *Optical Information Processing,* S.H. Lee, editor, Springer–Verlag, 1–41, 69–73 (1981).

T. Lu et al., "Projection Iterative Reconstruction Technique and Optoelectronic Implementation," *Proc. IEEE ISCAS '92,* 2469–2472 (May 10–13, 1992).

T. Lu et al., "Tomographic Reconstruction Using Optoelectronic Architecture," *Proc. of IEEE ISCAS '91,* 1, 476–479 (Jun., 1991).

T. Lu et al., "Novel Devices for High Speed Computer Vision," *Proc.of ISMM '91,* (4 pages) (Dec., 1991).

T. Lu et al., "Optoelectronic implementation of filtered back projection tomography algorithm," *SPIE Optical Information Processing Systems and Architectures III,* 1564, 704–713, (1991).

T. Lu, "An Iterative Method of Underdetermined System for Tomographic Image Reconstruction," An internal project report for Math 509, Iowa State University (May 9, 1991).

T. Lu, "An Iterative Method of Underdetermined System for Tomographic Image Reconstruction," An internal project report for Math 509, Iowa State University (Apr. 23, 1991).

T. Lu et al., "High Speed Image Processing Via SLM/CCD Devices," *Proc. IEEE ISCAS '90,* 763–766 (May 1990).

A.D. McAulay, "Optical Computer Architectures –The Application of Optical Concepts to Next Generation Computers," *John Wiley & Sons, Inc.,* 68–73 (1991).

G. Minerbo, "MENT: A Maximum Entropy Algorithm for Reconstructing a Source from Projection Data," *Computer Graphics and Image Processing,* 10, 48–68 (1979).

J.A. Neff et al., "Two–Dimensional Spatial Light Modulators: A Tutorial," *Proceedings of the IEEE,* 78, No. 5, 826–855 (May, 1990).

K.B. Nichols et al., "Spatial Light modulators using charge–coupled device addressing and electroabsorption effects in GaAs/AlGaAs multiple quantum wells," *Appl. Phys. Lett.,* 52, No. 14, 1116–1118 (Apr., 1988).

Tin–Su Pan et al., "Numerical Study of Multigrid Implementations of Some Iterative Image Reconstruction Algorithms," *IEEE Trans. on Medical Imaging,* 10 (4), 572–588 (Dec., 1991).

T.M. Peters, "Spatial Filtering to Improve Transverse Tomography," *IEEE Trans. on Biomed. Eng.,* BME–21, 214–219 (May, 1974).

J.L. Prince et al., "A Projection Space Map Method for Limited Angle Reconstruction," *Proc. IEEE ICASSP, '88,* 1268–1271 (1988).

J.L. Prince et al., "A Geometric Projection–Space Reconstruction Algorithm," *Linear Algebra and Its Applications,* 130, 151–189 (1990).

J.L. Prince et al., "Reconstructing Convex Sets from Support Line Measurements," *IEEE Transactions on Pattern Analysis and Machine Intelligence,* 12 (4), 377–389 (Apr., 1990).

J. Radon, "Über die Bestimmung von Funktionen durch ihre integralwerte längs gewisser Mannigfaltigkeiten," *Ber. Verb. Saechs. Akad. Wiss.,* Leipzig. Math. Phys. K1., 69, 262–277 (1977). (No Translation Available).

L.L. Scharf, *Statistical Signal Processing –Detection, Estimation, and Time Series Analysis,* Addison–Wesley Publishing Company, Inc., 392–395 (1991).

D.K. Schroder, "Charge Coupled Devices–Applications," *Advanced MOS Devices (Modular Series on Solid State Devices),* G.W. Neudeck and R.F. Pierret, Editors, Addison–Wesley Publishing Company, Inc., 129–159 (1987).

M.I. Sezan et al., "Image Restoration by the Method of Convex Projections: Par 2 –Applications and Numerical Results," *IEEE Transactions on Medical Imaging, MI–1,* No. 2, 95–101 (Oct., 1982).

L.A. Shepp et al., "Maximum Likelihood Reconstruction for Emission Tomography," *IEEE Transactions on Medical Imaging,* MI–1, No. 2, 113–122 (Oct., 1982).

L.A. Shepp et al., "The Fourier Reconstruction of a Head Section," *IEEE Transactions on Nuclear Science, NS–21* (3), 21–43 (Jun., 1974).

"SLMs standardized," *Signal & Image Processing,* 2, No. 2, p. 5 (Nov., 1991). B. Javidi.

J. Stoer, "Solution of Large Linear Systems of Equations by Conjugate Gradient Type Methods," *Mathematical Programming –The State of the Art,* A. Bachem, et al., editors, Springer–Verlag, 540–565 (1983).

Kunio Tanabe, "Projection Method for Solving a Singular System of Linear Equations and its Applications," *Numer. Math.,* 17, 203–214 (1971).

J.J. Tiemann et al., "Charge Domain Recursive Filters," *IEEE J. of Solid–State Circuits, Sc–17,* No. 3, 597–605 (Jun., 1982).

A. van der Sluis et al., "SIRT–and CG–Type Methods for the Iterative Solutoin of Sparse Linear Least–Squares Problems," *Linear Algebra and Its Applications,* 130, 257–302 (1990).

J. van der Spiegel et al., "A Foveated Retina–Like Sensor Using CCD Technology," *Analog VLSI Implementation of Neural Systems,* edited by Carver Mead et al., Kluwer Academic Publishers, 189–211 (1989).

T. Vogelsong et al., "Charge–Domain Integrated Circuits for Signal Processing," *IEEE J. of Solid–St. Cir.,* SC–20 (2), 562–570 (Apr., 1985).

P. Edholm, "Tomogram Reconstruction Using an Opticophotographic Method," *Acta Radiologica Diagnosis,* 18, 126–144 (1977).

D.G. Feitelson, "Optical Computing –A Survey for Computer Scientists," *MIT Press,* 24–33 (1990).

A.D. Fisher, "Spatial light modulators: functional capabilities, applications and devices," *International Journal of Optoelectronics,* 5, No. 2, 125–167 (1990).

E.R. Fossum, "Charge–coupled computing for focal plane image preprocessing," *Optical Engineering,* 26, No. 9, 916–922 (Sep., 1987).

A.M. Garvie et al., "Video–based analog tomography," *Rev. Sci. Instrum.,* 61, No. 1, 138–145 (Jan., 1990).

P. Gilbert, "Iterative Methods for the Three–Dimensional Reconstruction of an Object from Projections," *J. Theor. Biol.,* 36, 105–117 (1972).

G.R. Gindi et al., "Optical feature extraction via the Radon transform," *Optical Engineering,* 23, No. 5, 499–506 (Sep./Oct., 1984).

A.F. Gmitro et al., "Videographic Tomography –Part I: Reconstruction with Parallel–Beam Projection Data," *IEEE Transactions on Medical Imaging,* 9, No. 4, 366–375 (Dec., 1990).

A.F. Gmitro et al, "Optical computers for reconstructing objects from their x-ray projections," *Optical Engineering,* 19, No. 3, 260–271 (May/Jun., 1980).

R. Gordon et al., "Algebraic Reconstruction Techniques (ART) for Three–dimensional Electron Microscopy and X–ray Photography," *J. Theor. Biol.,* 29, 471–481 (1970).

L.A. Hageman et al., "Background on Basic Iterative Methods," *Applied Iterative Methods,* Academic Press, Inc., 18–38 (1981).

W.W. Hager, "Least Squares," (Chapter 5) and Iterative Methods, (Chapter 7) *Applied Numerical Linear Algebra,* Prentice–Hall, 192–207 and 319–354, respectively (1988).

C. Hamaker et al., "The Angles between the Null Spaces of X Rays," *J. of Math. Analysis and Applications,* 62, 1–23 (1978).

G.T. Herman, "Image Reconstruction from Projections –The Fundamentals of Computerized Tomography," *Academic Press,* 26–39 (1980).

M.R. Hestenes et al., "Methods of Conjugate Gradients for Solving Linear Systems," *Journal of Research of the National Bureau of Standards,* 49, No. 6, 409–436 (Dec., 1952).

H.H. Barrett et al., "Analog Reconstruction Methods for Transaxial Tomography," *Proceedings of the IEEE,* 65, No. 1, 89–107 (Jan., 1977).

J. Boddu et al., "High–Speed Signal Processing Architectures Using Charge Coupled Devices," *SPIE –Devices for Optical Processing,* 1562, 251–262 (1991).

W.S. Boyle et al., "Charge Coupled Semiconductor Devices," *Bell Syst. Techn. J.,* 49, 587–593 (Apr. 1970).

B.E. Burke et al., "Optical Processor Components Basedon GaAs CCD Technology," *Optical Computing –Digital and Symbolic,* R. Arrathdoon, Editor, Marcel Dekker, Inc., 65–103 (1989).

D. Casasent, "Optical Feature Extraction," *Optical Signal Processing,* J.L. Horner, editor, Academic Press, Inc., 75–95 (1987).

S.C. Chan et al., "SLM/CCDD Structures for High Speed Numerical Computing and Signal Processing," *IEEE ISCS '90,* 2361–2364 (May 1990).

A.M. Cormack, "Representation of a Function by Its Line Integrals, with Some Radiological Applications," *Journal of Applied Physics,* 34, No. 9, 2722–2727 (Sep., 1963).

E.J. Craig, "The N–Step Iteration Procedures," *Journal of Mathematical Physics,* 64–73 (1955).

G. Demoment, "Image Reconstruction and Restoration: Overview of Common Estimation Structures and Problems," *IEEE Transactions on Acoustics, Speech, and Signal Processing,* 37, (12), 2024–2036 (Dec. 1989).

A.P. Dempster et al., "Maximum Likelihood from Incomplete Data via the EM Algorithm," *J. Royal St. Soc.,* 39 (1) 1–38 (1977).

H. Dollekamp et al., "$P^2CCD$ in 60 MHz oscilloscope with digital image storage," *Phillips Tech. Rev.,* 40, 55–68 (1982).

S. Duinker et al., "Transaxial Analogue Tomography," *Oldelft Sci. Eng. O.,* 1, 41–66 (1978).

N.J. Dusaussoy, et al., "The Extended MENT Algorithm: A Maximum Entropy Type Algorithm Using Prior Knowledge for Computerized Tomography," *IEEE Trans. on Signal Proc.,* 39 (5), 1164–1180 (May 1991).

R. Easton, Jr. et al., "Tomographic Transformations in Optical Signal Processing," *Optical Signal Processing,* edited by J.L. Horner, Academic Press, Inc., 335–386 (1987).

P. Edholm et al., "Transverse Tomography with Incoherent Optical Reconstruction," *Phys. Med. Biol.,* 23 (1), 90–99 (1978).

Gilbert Amelio, "Charge–Coupled Devices," *1991 Loral Fairchild CCD Imaging Databook, CCD Sensors, System and Development Technology,* 296–304 (1991).

A.H. Anderson, "Tomography transform and inverse in geometrical optics," *J. Opt. Soc. Am. A,* 4 (8), 1385–1395 (Aug., 1987).

A.H. Anderson et al., "Simultaneous Algebraic Reconstruction Technique (SART): A Superior Implementation of the ART Algorithm," *Ultrasonic Imaging,* 6, 81–94 (1984).

E. Artzy et al., "Quadratic Optimization for Image Reconstruction, II," *Computer Graphics and Image Proc.,* 11, 242–261 (1979).

D.F. Barbe et al. "Signal Processing with Charge–Coupled Devices," *Charge–Coupled Devices,* Springer–Verlag, 91–145 (1980).

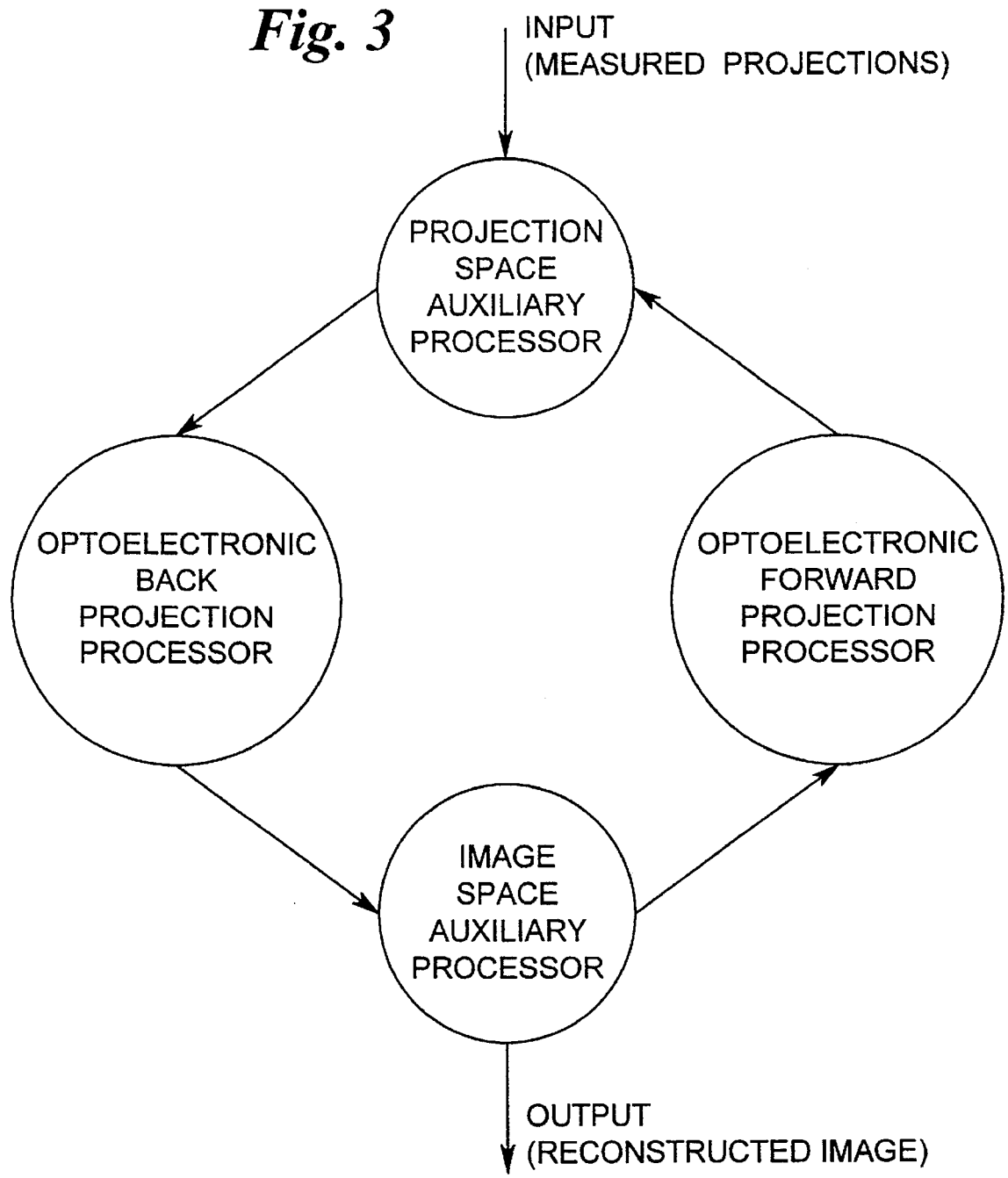

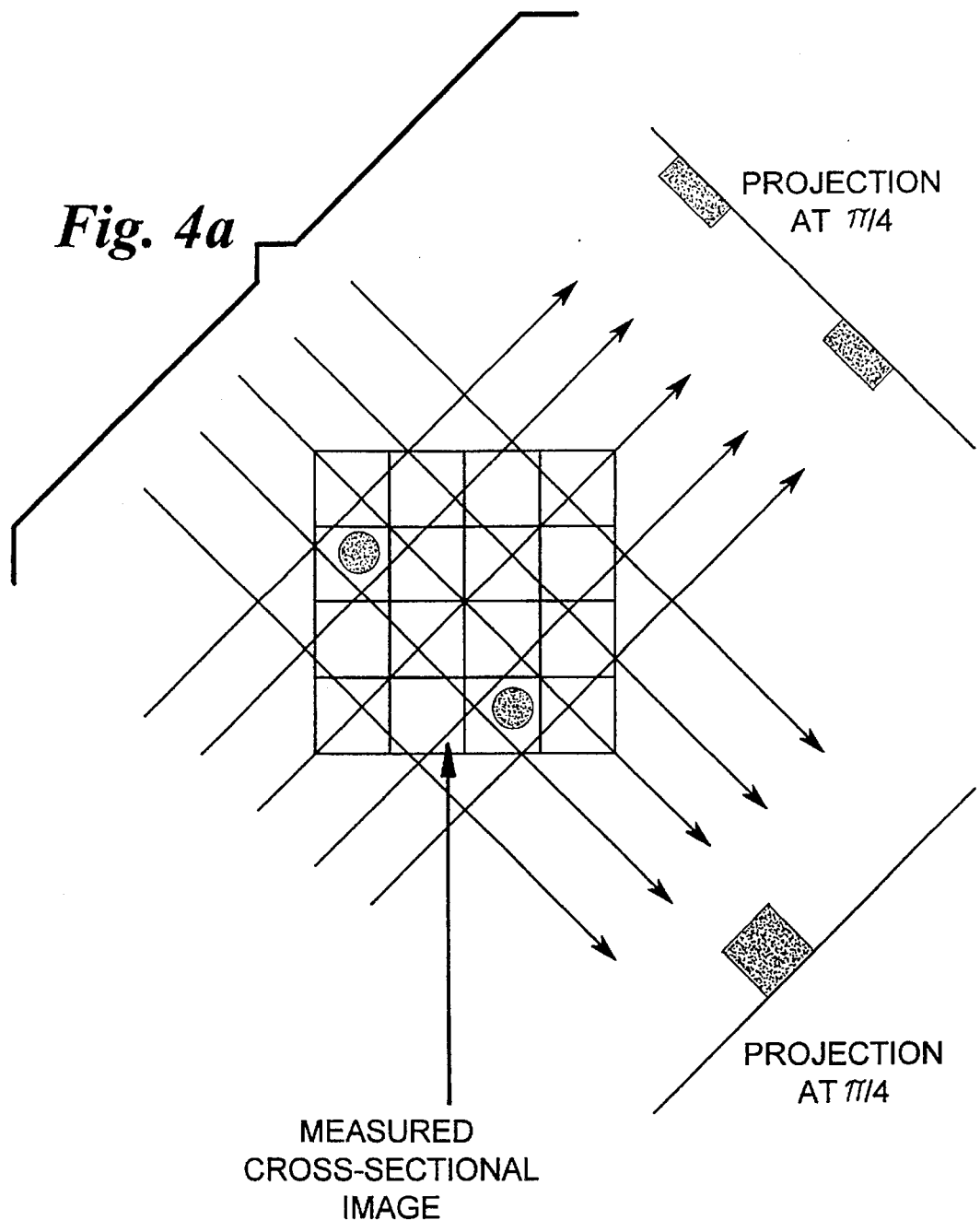

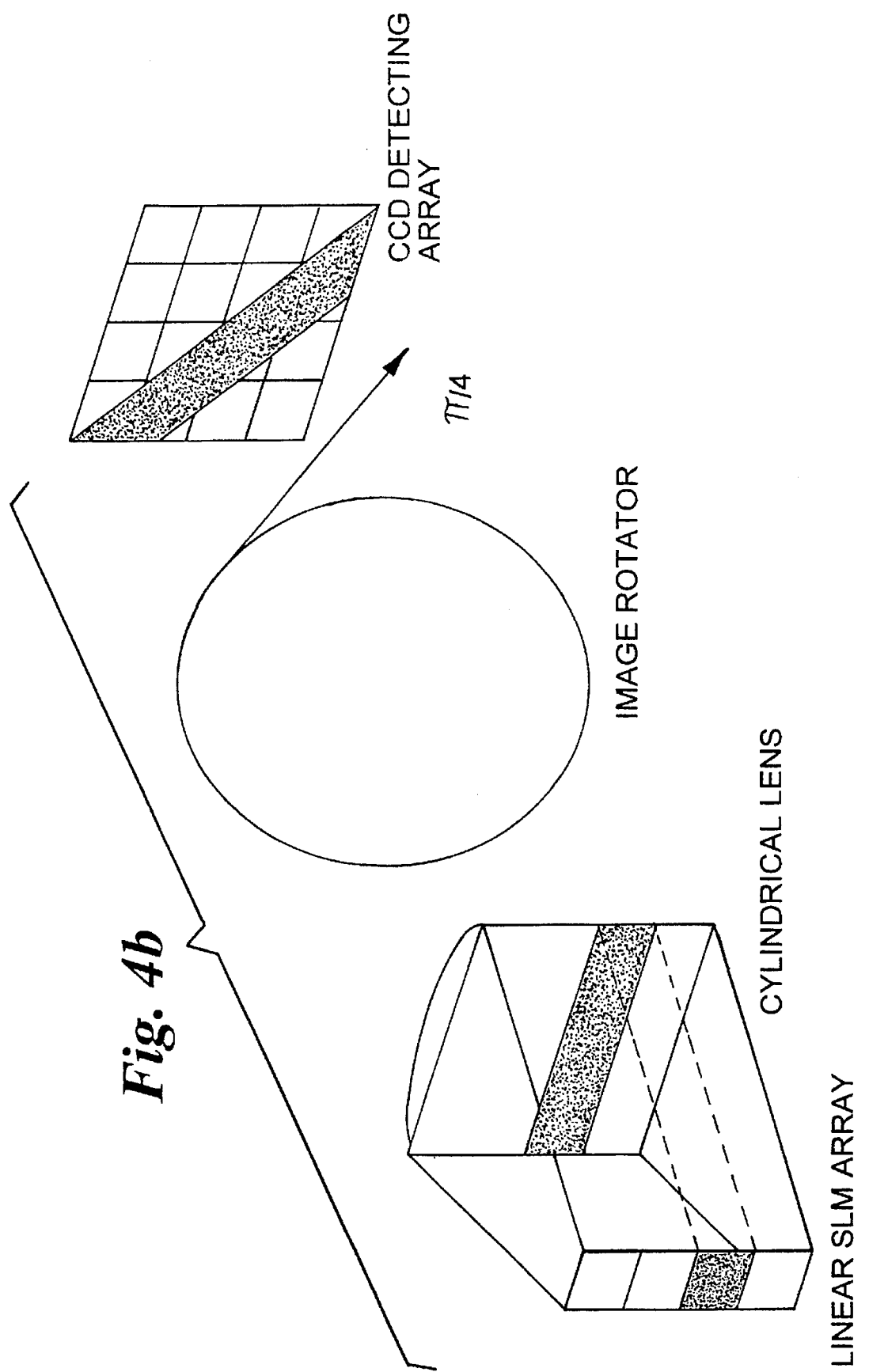

INPUT LIGHT → → MODULATED LIGHT

MODULATING SIGNAL
(OPTICAL OR ELECTRICAL)

INPUT LIGHT →

OUTPUT VOLTAGE SIGNAL

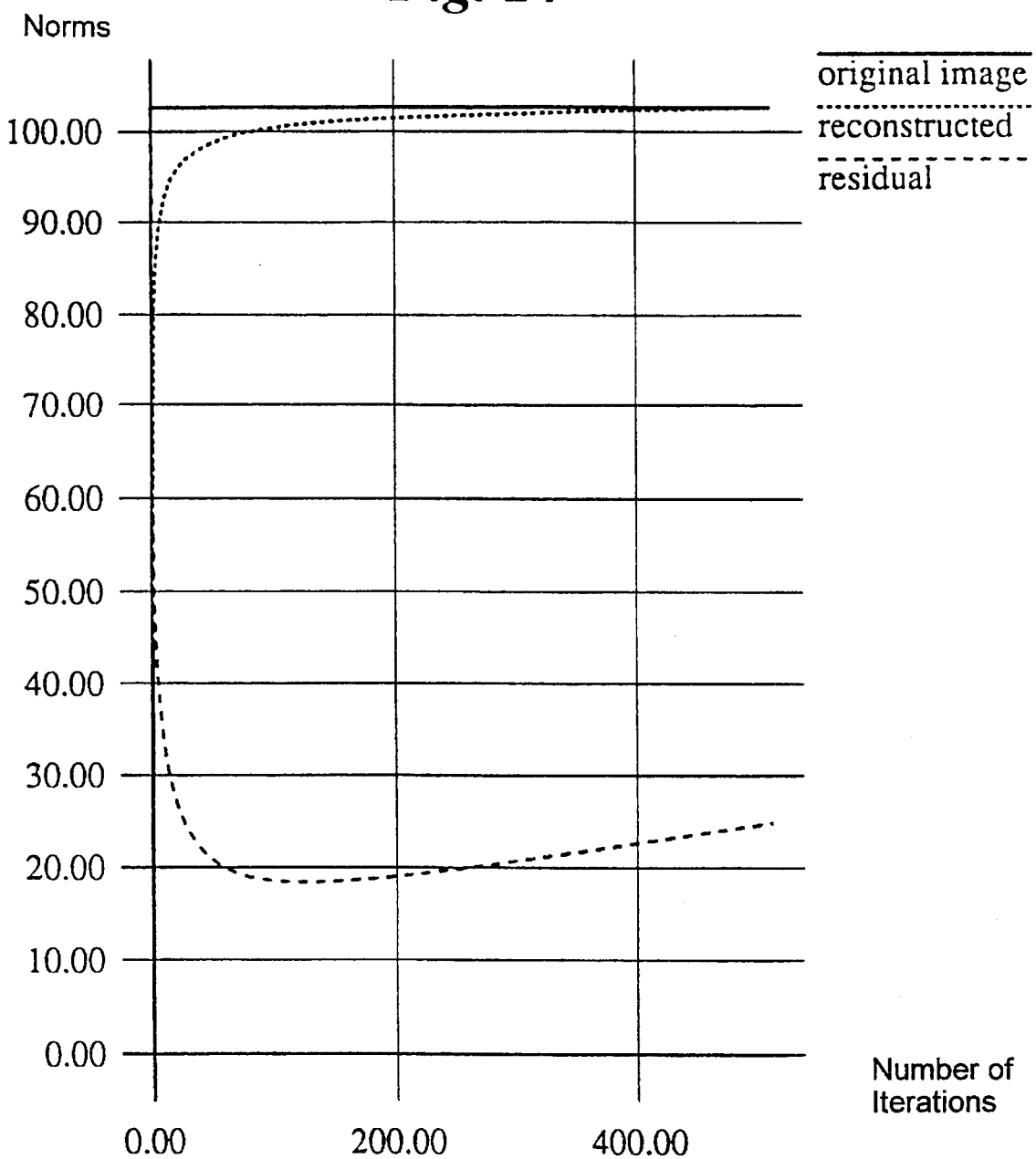

PROJECTION B

PROJECTION A

SLM OF POSITIVE RESPONSE

SLM OF NEGATIVE RESPONSE

SUPERIMPOSED RESPONSE FROM TWO CHANNELS

OPTOELECTRONIC SYSTEM FOR IMPLEMENTATION OF ITERATIVE COMPUTER TOMOGRAPHY ALGORITHMS

This application is a continuation of U.S. patent application Ser. No. 07/880,716, filed on May 8, 1992, now U.S. Pat. No. 5,414,623, issued on May 9, 1995.

TECHNICAL FIELD OF THE INVENTION

The present invention pertains generally to the field of computer tomography, and more particularly to methods and apparatus for tomographic reconstruction.

BACKGROUND OF THE INVENTION

Computer Tomography (CT) systems have enabled physicians to perform noninvasive examinations and glean information about the patient by obtaining a cross-sectional view of the patient. The quality and reconstruction speed have improved dramatically over the years. Simultaneously, wider recognition of the value and potential of CT systems as well as declining costs have contributed to dramatic growth in the industry. Although CT systems have witnessed significant increase in market penetration, the untapped potential is enormous. In order to tap the market further, both costs and performance characteristics have to improve. Recent attempts to meet these needs have led, for example, to the development of videographic tomographic techniques based on the convolution back projection algorithm. Although the design of systems that can generate images at frame rates (30 frames per second) using the technique are now feasible, the method suffers from several disadvantages. The disadvantages include:

High costs due to the need for using expensive high speed filters.

Distortion introduced by the high speed filter, optical devices and prism image rotator.

Commonly used tomographic algorithms can be broadly classified as direct and iterative methods, based on the method of computation. When a system is underdetermined, commonly used iterative algorithms, such as the Simultaneous Iterative Reconstruction Technique (SIRT) do not guarantee a unique solution. The Projection Iterative Reconstruction Technique (PIRT) proposed in the present invention is a basic iterative image reconstruction algorithm which can be considered as a counterpart of the conventional algorithm—SIRT. The PIRT attempts to obtain the minimum-norm solution of an underdetermined system, whereas, conventional methods are usually based on an attempt to estimate the least squares solution of an overdetermined system. Therefore, when the PIRT algorithm is applied to an underdetermined system, a unique solution is intrinsically guaranteed. The proposed algorithms include a family of accelerated algorithms, such as PIRT-CG (PIRT - Conjugate Gradient), and PIRT-PC (PIRT - Partial Convolution).

A 2-D cross-sectional image of a 3-D object is shown in FIG. 6. Parallel x-ray projections are taken around the object in several orientations. The objective of the tomographic image reconstruction algorithm is to reconstruct the 2-D cross-sectional image on the basis of information contained in the ray-sums of projections measured from several orientations across the image plane around the object.

In the continuous case, a ray sum is expressed by the Radon transform which is obtained by performing a line integration along each ray. As shown in FIG. 7, a line integral $P_\theta(t)$ can be defined as $$P_\theta(t) = \int_{(\theta,\, t)\, \text{line}} f(x,y)dx \tag{1}$$

Using the sifting property of the delta function, eq. 5 can be rewritten as $$P_\theta(t) = \int_{-\infty}^{\infty} \int_{-\infty}^{\infty} f(x,y)\delta(x\cos\theta + y\sin\theta - t)dxdy \tag{2}$$

The function $P_\theta(t)$ is known as the Radon transform of the function $f(x, y)$.

In the discrete case, eq. 6 can be rewritten in the form of a summation and projection operations can be modeled using a linear system representation $$A x = b \tag{3}$$

where x represents all pixels on the two dimensional image, b represents data measured at all projection orientations, and the matrix A maps data from the image space to the projection space. Image reconstruction involves estimation of the 2-D image x from known projections b.

Tomographic image reconstruction involves operations of mapping the data from the projection space back to the image plane. The operation is called back projection. The back projection was one of the earliest methods used to obtain the a cross-section of an object in an x-ray film before computed tomography was invented. Since the method simply smears the projection data back to the image space instead of solving for the true inverse, information in the reconstructed image severely lacks in detail.

Tomographic image reconstruction involves estimation of $f(x, y)$ from given $P_\theta(t)$ using the inverse Radon transform. The task is summarized in eq. 6 for the continuous case. In the discrete case, the objective is to determine x from known b as expressed in eq. 7. In computed tomography, the enormous amount of data contained in the projections collected in several directions has to be appropriately manipulated to obtain the spatial distribution of the parameters. The algorithms for tomographic imaging solves the inverse problem by estimating the cross-sectional images from the given projections.

In the case of most iterative reconstruction methods, the error corrections are fed back in the image space except for a few exceptions, such as the Projection Space Iterative Reconstruction-Reprojection (PIRR) and Projection Space MAP (PSMAP) methods. The PIRR projects the reconstructed image to the projection space recursively in order to recover the missing projection data whereas the PSMAP optimizes data in the projection space iteratively and then reconstructs the image using convolution back projection (CBP). The approaches and objectives of the projection space iterative algorithms differ from the PIRT proposed in the present invention.

Because of the extreme computational demands, iterative methods usually are not able to compete with direct algorithms in commercial CT systems. However, the iterative algorithms still offer advantages in certain applications. They are particularly suitable for reconstructing images from incomplete data, reconstruction with a priori statistical knowledge as well as single photon emission computerized tomography (SPECT) and positron emission tomography (PET).

As mentioned before, conventional x-ray tomography techniques were used to estimate cross-sectional images of objects even before the invention of computed tomography.

In this method, a photographic film and the object are rotated synchronously. X-rays pass through a narrow slit, penetrate the object and are recorded on the film. The signal is then smeared on the film plane. Although, the technique may be considered as the earliest optical implementation of tomography, the method is mathematically equivalent to the back projection method. However, the quality of results obtained are poor compared with those obtained using modern computed tomography techniques.

The computed tomography methods differ from the conventional tomography schemes in that they attempt to solve the inverse problem using the measured projection instead of simply smearing the projections back into the image space.

The earliest reported optical computed tomographic reconstruction processor was built by Peter in 1973. An image was first recorded on a film using back projections. The output image was obtained by filtering the blurred image using a coherent optical spatial filter. The resulting image was much sharper than those obtained using back projections only.

In order to avoid the problems associated with coherent processing such as speckle and other coherent noise, several incoherent optical tomographic reconstruction systems were built.

The Oldelft transaxial tomography system, built in 1978, implements the convolution back projection method. The Oldeft system is a hybrid system and optics is used only for one dimensional and two channel convolutions. The two channels are used for positive and negative valued convolution respectively.

The Edholm's system, built in 1977, is an optical system using films. The original projections and the filtered negative projections are prepared on two separate films. The reconstructed image is then recorded on a rotating output film.

Since 1977, several structures have been proposed by Gmitro et al. where pupil plane masks have been used for spatial radius filtering operations. This approach, known as optical transfer function (OTF) synthesis, is a technique for performing spatial filtering operations in an incoherent system. The loop processor records all projections on a continuous film loop and the drum processor records projections on the surface of a drum. The CCD processor collects the back projected output image using a CCD camera.

Several coherent computed tomography systems have been proposed by Hansen et al., and Nishimura and Casasent. These approaches have been summarized by Gmitro et al. All of these algorithms involve the use of direct algorithms. Due to the finite dynamic range of materials and devices, and distortions of optical transforms, these approaches could not compete with electronic computers in respect of the quality of reconstructed images.

Advances in technology related to video imaging devices have led to improvements in the quality and speed of optical implementations. Recently, a videographic tomographic structure for medical imaging, built by Gmitro et al., was able to achieve 1% contrast resolution. The structure was able to achieve real time reconstruction. Three filter structures were evaluated including a digital FIR filter, an Acoustic-optic (AO) convolver and a Surface Acoustic Wave (SAW) convolver. The best results were obtained using the digital FIR filter. However, the digital FIR filter was not only expensive but also introduced distortions in the low frequency range since the order of the filter used was not long enough to cover the entire frequency range. In addition, optical distortions were not eliminated. Nevertheless, the development is very encouraging since it demonstrated the feasibility of high quality and high speed optoelectronic tomography.

The present invention provides a new approach/structure for tomographic reconstruction. The basic structure is built from optoelectronic devices and allows for implementation of a number of reconstruction algorithms. The critical devices used in this structure are Spatial Light Modulator (SLM) and Charge Coupled Device (CCD) arrays which are commonly used as liquid crystal television display panels and solid state video image detectors, respectively.

Spatial Light Modulators (SLM's) are devices which can be employed to modulate the intensity, magnitude, polarization or phase of light. Applications of SLM range from commercial television displays, real-time image processing to parallel optical computing. FIG. 8 shows an example of a linear SLM array with four cells. The optical transmissivity of each cell can be controlled by the applied modulating signal. The intensity of the output light beam from each cell is, therefore, a function of the intensity of the incident beam and the transmissivity of the cell. SLM's can be classified on the basis of their addressing modes. If the modulating signal is controlled by an electrical signal, it is referred to as an electrically addressed SLM (E-SLM). If the modulating signal is a second beam of light, it is classified as an optically addressed SLM (O-SLM).

SLM's have been built using several technologies. This had led to the development of the optoelectronic SLM, opto-acoustic SLM, and opto-magnetic SLM. Commercially available SLM's, such as Liquid Crystal (LC) SLM, and Ferroelectric Liquid Crystal (FLC) SLM will be briefly described in this section. For the sake of completeness, Multiple Quantum Well (MQW) SLMs are also discussed.

Liquid crystals are organic materials that possess an intermediate phase between the solid and liquid phase. The molecular orientations of liquid crystal materials can be changed by applying electrical fields. Therefore, the polarization of the light through such materials can also be twisted. Amplitude and intensity modulation is obtained by placing a polarizer and an analyzer in front of and behind the liquid crystal layer respectively. The technology relating to Liquid Crystal SLM has been used in commercial video image projectors and miniature television sets. Since commercial LCTV's offer many of the same attractive features as other modulators, but at only a fraction of the cost, they have also been used in many optical signal processing and computing systems.

Ferroelectric liquid crystals are characterized by a spontaneous molecular polarization caused by an anisotropy in the molecule. The molecular polarization allows the orientation of FLC's to be easily switched with a small electric field. The FLC SLM has the advantage of high speed and high contrast ratio. Commercial available FLC SLM only offer binary light modulation since tilting of FLC molecules is confined to two orientational positions.

Multiple quantum well (MQW) structures consist of thin layers of low bandgap semiconductor (wells) sandwiched between layers of larger bandgap semiconductor (barriers). When the thickness of the well layers is on the order of a carrier de Broglie wavelength, the electron and the hole are forced to orbit close to each other and the binding energy increase correspondingly. The electrical and optical properties of the structure are then dominated by quantum size effects (QSE). The QSE results in the features of step-like absorption edges in the optical absorption spectrum and room temperature exciton resonances. The change in the energy levels of the excitons resulting from applied electric field, called the quantum-confined Stark-effect (QCSE), allows shifting of the abrupt, highly absorbing edge. By shifting the absorption edges, the MQW structures produce larger absorption changes (in a narrow spectrum range around the absorption edges) than those in bulk semiconductors with the same applied field.

The LCTV's are able to provide better grey level images. However most of them can only operate at television frame rates (30 to 60 frames per second). The FLC SLM's support binary processing only but can operate at relatively higher speed (up to 100 Khz). The MQW SLM's are expected to operate at GHz rates. However, the spectrum of modulated light has to be within a narrow range.

TABLE 1

Characteristics of Several Common SLMs

| SLM | Visibility | Resolution | Size | Speed | Cost |
|---|---|---|---|---|---|
| MSLM | 0.5 | 4 lp/mm | 25 mm dia | 2 sec | $25K |
| MOD | 0.91 | 6.4 lp/mm | 1 × 1 cm | 200 Hz | $18K |
| DMD | 0.5 | 10 lp/mm | 0.64 cm | 60 Hz | ? |
| FELC | 0.9 | 40 lp/mm | 12.5 mm dia | 60 Hz | $17.5K |
| HC LCLV | 0.86 | 60 lp/mm | 50 × 50 mm | 60 Hz | $25K |
| Epson LCTV | 0.96 | 6.3 lp/mm | 2.54 × 1.9 cm | 60 Hz | $800 |

TABLE 2

Specificaitons of Several Electrically Addressed SLMs

| device | material | pixels | frame rate Hz | pixel size μm | fill factor | contrast ratio |
|---|---|---|---|---|---|---|
| STC Ltd. | FLC | 128 × 128 | 165 | 165 × 165 | 0.83 | 200:1 |
| Displaytech | FLC | 10 × 10 | 2000 | $1^3 \times 10^3$ | 0.77 | 100:1 |
| Disp.tech CMOS | FLC | 64 × 64 | 4500 | 45 × 45 | 0.56 | 12:1 |
| Semetex SMD | Iron | 128 × 128 | 2000 | 56 × 56 | 0.54 | — |
| Litton MOSLM | Iron Garnet | 128 × 128 | 100 | 56 × 56 | 0.54 | — |
| TI DMD | Def.mirror | 128 × 128 | 1200 | 25 × 25 | 0.9 | 2:1 |

Charge Coupled Devices (CCD) are also called Charge Transfer Devices (CTD). These devices were introduced by Boyle and Smith in 1970. The applications of CCD's include optoelectronic computing, charge domain signal processing, focal plane image processing, high speed analog-to-digital and digital-to-analog conversion, time-axis conversion, and image detection.

A CCD array functions like shift registers in which sampled values of an analog signal are stored in the form of charges in a series of neighboring cells. Clock pluses allow the transfer of charge from one cell to the next without significant loss in accuracy. The charge, which is called a charge packet, is a small amount of charge stored in potential wells created by the gate voltage. By periodically varying the electrode or gate voltage, the potential wells are shifted along the semiconductor. The charge packet, located under the voltage gate, moves along with the potential wells.

CCDs can be classified as surface-channel CCD (SCCD) and bulk-channel CCD (BCCD) depending on the device structures. A device is called SCCD if the charge resides at the semiconductor surface. In the BCCD, the charge location is moved away from the surface into the n-channel. There is no interaction between the charge and the interface states. In the case of peristaltic CCD, the n-channel is thicker and the charge is farther away from the surface. In spite of the increased process complexity, almost all of today's devices are BCCD's, due to their superior performance.

High performance Silicon CCDs can offer charge transfer efficiencies as high as 0.999999. Some of the fastest Silicon CCDs have been operated at several hundred MHz. Silicon peristaltic CCDs have been operated with clock frequencies up to 200 MHz. High mobility GaAs is a good material for building very high frequency CCD's. Devices with operating frequency in the range of GHz have been fabricated. However, typical operational frequencies of commercially available Silicon CCD's are usually below 20 MHz.

CCD detecting arrays are commonly used as solid state image detectors. FIG. 9 shows a linear CCD detector array with four cells. Each cell generates an electrical charge proportional to the number of photons incident on it. Alternatively, the charge developed is proportional to the intensity of the light integrated over the period of exposure. Charges in a CCD array can be shifted from cell-to-cell without significant loss in magnitude. The output is a sequence of voltage values proportional to the charge in each cell. Typical contrast resolution of commercial image detectors can be in excess of 4096 distinguishable gray levels.

SUMMARY OF THE INVENTION

The present invention provides for iterative tomographic reconstruction. The apparatus of the invention comprises an optoelectronic back projection processor, an optoelectronic forward projection processor, and a projection space auxiliary processor. The system optionally includes an image space auxiliary processor.

The back projection processor comprises a linear array of analog SLMs, an image detection array, and an image rotator. A light source is applied to the analog SLM array, which transmits an image from the projection space through the image rotator back to the image detecting array. The image rotator smears the projection image, initially obtained by a parallel beam imaging device, on the image detecting array, at the same angle as the projection was taken. The back projection processor thus smears the projection back to the image space.

The optoelectronic forward projection processor comprises an SLM array, an image rotator, and an image detecting array. A light source passes through the SLM array and the image rotator and is projected on the image detecting array. A reconstructed image displayed by the SLM is smeared by the rotator to forward project the reconstructed image on the image detecting array at the same angle as when the measured projection was taken. The purpose of the forward projection processor is to smear the reconstructed image back into the projection space.

The projection space auxiliary processor receives data from the forward projection detecting array, performs simple arithmetic operations, stores projections, and sends data back to the back projection SLM array. The projection space auxiliary processor is used to perform successive error corrections using back and forward projections.

According to another aspect of the invention, a projection iterative reconstruction technique (PIRT) uses the above-described structure to reconstruct an image by reiteratively correcting a plurality of state vectors representing the state of the reconstructed image. The state vectors for each projection angle are supplied to the SLM array in the back projection processor, which uses the state vectors to reconstruct an iteration of the image on the CCD detecting array.

The approach of the present invention employs feedback to overcome distortion introduced by the optical devices. The system is based on existing technology and offers significant improvement over current systems both with respect to cost and performance. The advantages offered by this invention are:

a) It is able to compensate for distortions caused by optical systems.
b) It is able to reduce effects caused by the limited dynamic range of optoelectronic devices.
c) It does not require computation of Fourier transforms or convolution operations.
d) It is a closed-loop system.
e) Since all computations are performed in the projection space, the effects of dark current in the CCD detector do not result in degradation of the reconstructed image.

Since there is no need for computing Fourier transforms and convolution operations, this structure can be used for high speed and low cost tomography reconstruction where the rotations can be replaced by static geometric rotation schemes. Static image rotation techniques can be performed using devices employing current technologies, such as holograms or coupled CCD/SLM pairs. The scheme described in the disclosure, however, employs mechanical image rotators. The operation of the system is independent of the technique employed for rotating the image.

Iterative tomographic reconstruction algorithms that can be implemented/executed using the structure include:
a) Projection Iterative Reconstruction Technique (PIRT).
b) accelerated version of PIRT using partial convolutions (PIRT-PC).
c) accelerated version of PIRT using conjugate gradient acceleration technique (PIRT-CG).
d) Simultaneous Iterative Reconstruction Technique (SIRT).
e) accelerated version of SIRT using filtered back projection method (SIRT-FBP).

BRIEF DESCRIPTION OF THE DRAWING

FIG. 3 is a block diagram of the optoelectronic architecture for iterative image reconstruction according to the present invention;

FIG. 4-$a$ is an illustration of two projections of a 3-D object;

FIG. 4-$b$ is an illustration of the back projection processor according to the present invention;

FIG. 24 depicts a plot of residual versus the number of iterations for SIRT;

DETAILED DESCRIPTION OF THE INVENTION

In the following detailed description of the preferred embodiments, reference is made to the accompanying drawings which form a part hereof, and in which is shown by way of illustration, specific embodiments in which the invention may be practiced. It is to be understood that other embodiments may be utilized and structural changes may be made without departing from the scope of the present invention.

Overview

Figure 1:
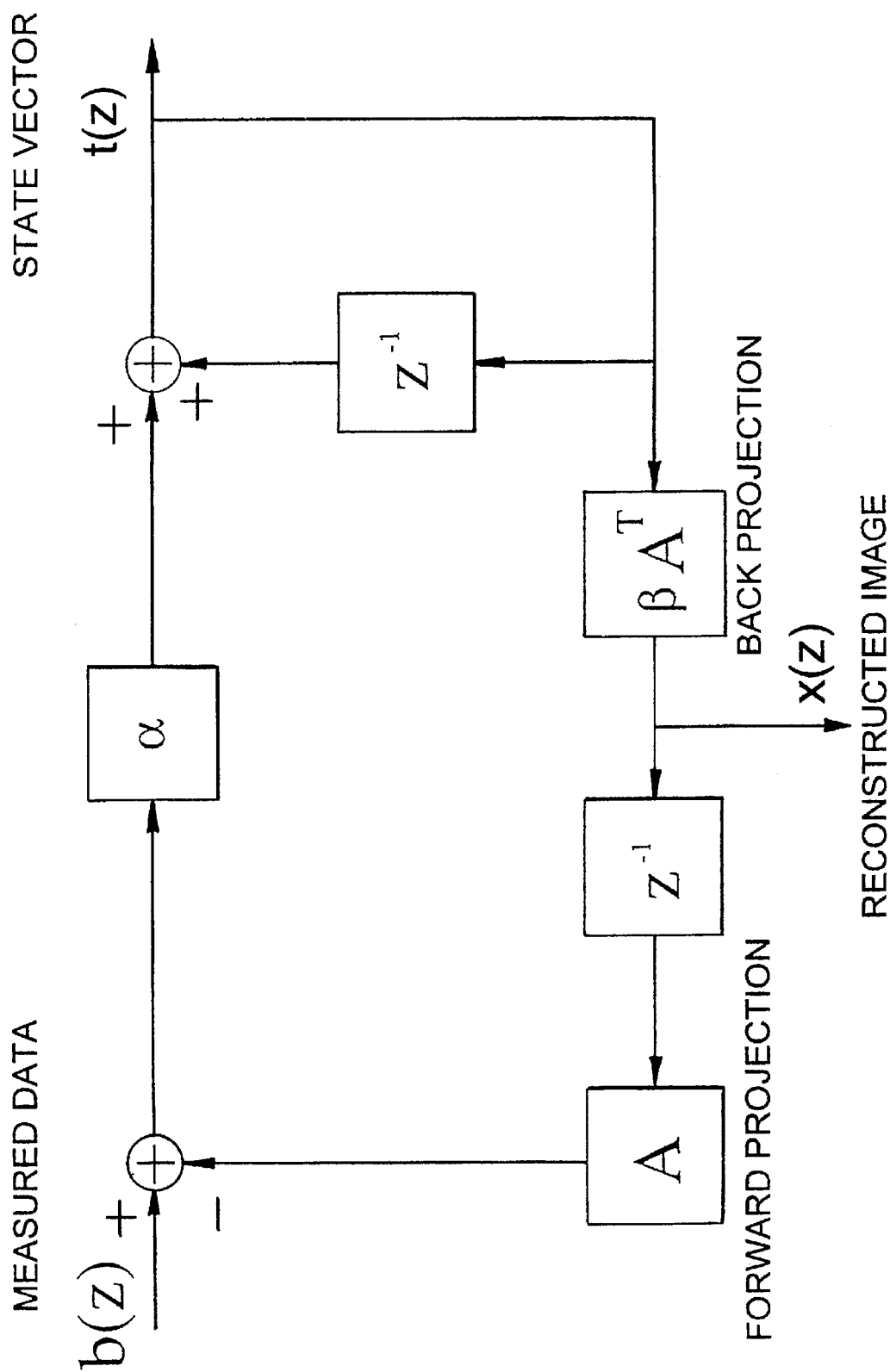
FIG. 1 illustrates a block diagram of the Projection Iterative Projection Technique (PIRT) according to the present invention.
Figure 2:
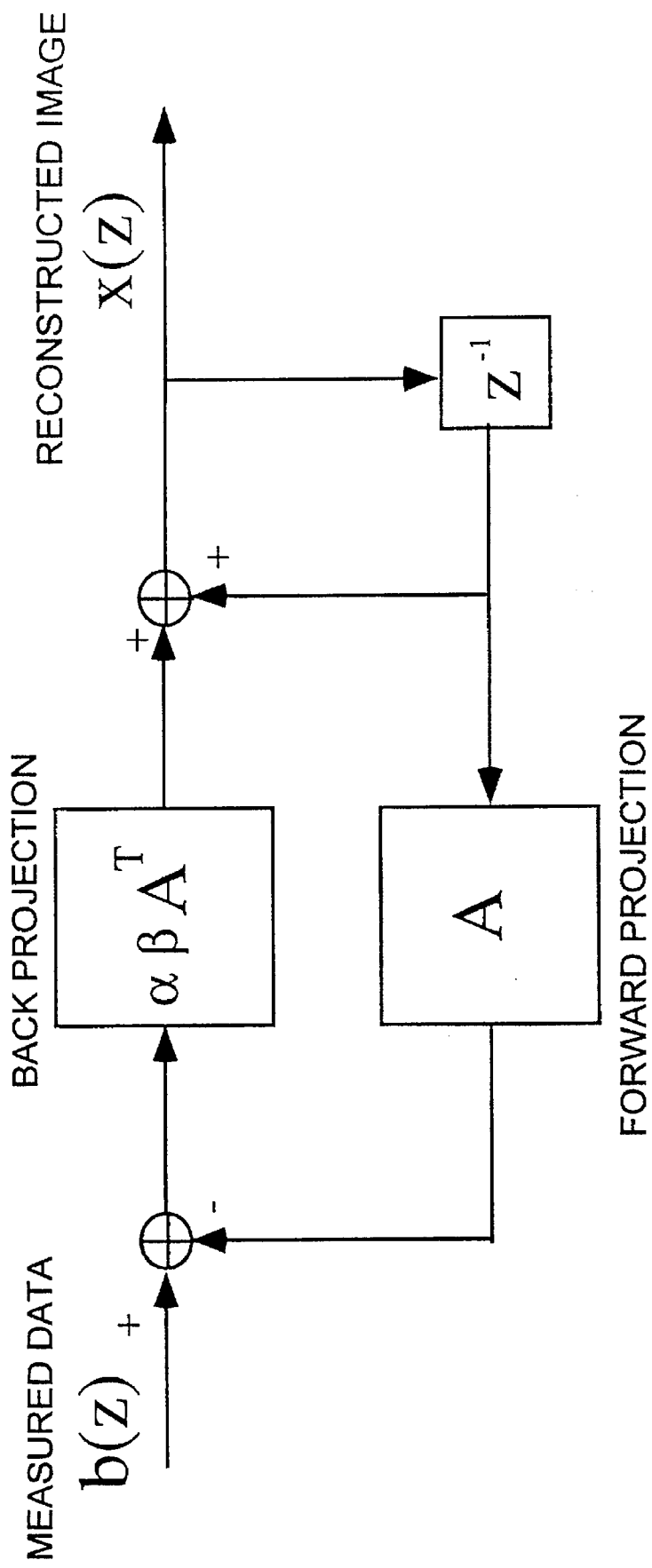
FIG. 2 is a block diagram of the Simultaneous Iterative Reconstruction Technique (SIRT)

FIG. 1 and FIG. 2 show feedback block diagrams associated with the basic PIRT and SIRT algorithms respectively, to be discussed below.

Optoelectronic Structure for Tomographic Reconstruction

FIG. 3 shows a line diagram outlining the basic building blocks in the system. The building blocks include An Optoelectronic Back Projection Processor.

An Optoelectronic Forward Projection Processor.

An Image Space Auxiliary Processor.

A Projection Space Auxiliary Processor.

Each of the building blocks is described briefly in the following sections.

The Optoelectronic Back Projection Processor

A set of back projections in tomographic image reconstruction involves mapping the data in the projection space into the image space from all the measured projection angles. FIG. 4-a shows the projection of x-rays onto the projection space at two different angles. The optoelectronic back projection processor as shown in FIG. 4-b performs the tomographic back projection. It consists of:

a linear array of analog SLMs and a cylindrical lens.

an image detection array.

an image rotator.

The transmissivity of the linear SLM array represents the magnitudes of the data in the projection space corresponding to a projection angle. The pattern in the linear array is then "stretched" into an array of strips as shown in FIG. 4-b. The linear SLM array is not specified. However, based on available devices, an implementation using binary Ferroelectric Liquid Crystal (FLC) SLMs is suggested.

The image detection array integrates the projection data corresponding to the area intercepted on the pixel by the light beam at all the projection angles. The image detection array can be a CCD image detector or a commercial CCD TV camera.

A complete set of back projections involves performing back projection operations at all the projection angles over an angle of 180°. The purpose of the image rotator is to rotate the projection pattern to the corresponding projection angle relative to the image detector. It can be done by rotating the linear SLM array and the lens back and forth over a range 180°, or by using a prism image rotator driven by a stepper motor. Alternative approaches using a static structure can also be employed.

The Optoelectronic Forward Projection Processor

Figure 5:
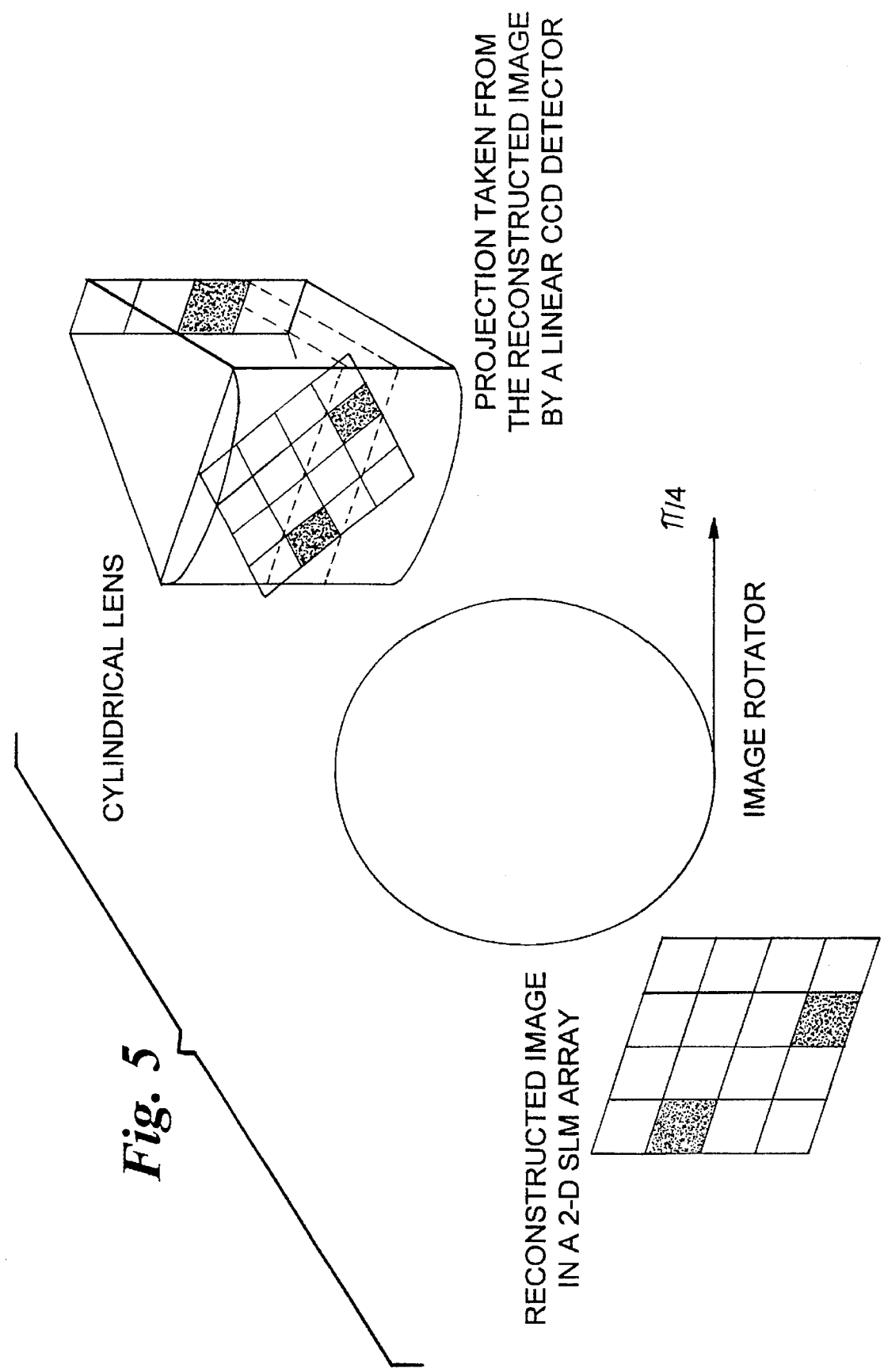
FIG. 5 is an illustration of the forward projection processor according to the present invention.
Figure 6:
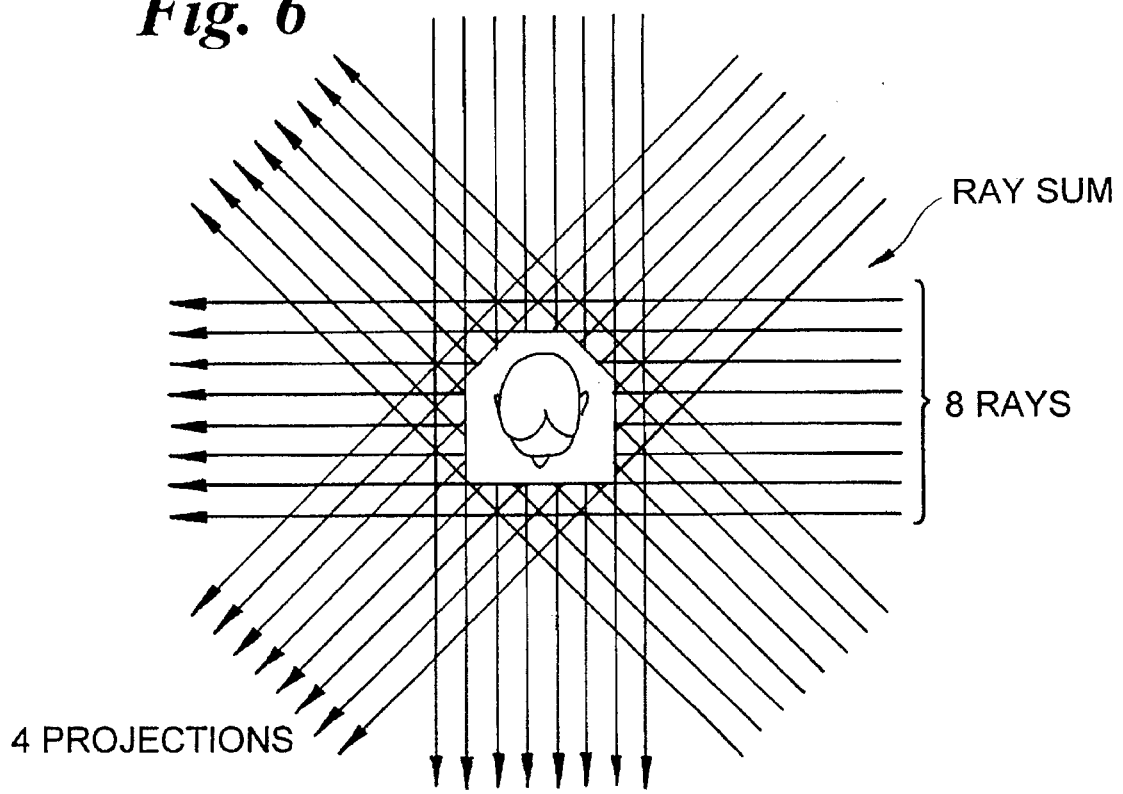
FIG. 6 depicts a two dimensional cross-sectional image of a three dimensional object.
Figure 7:
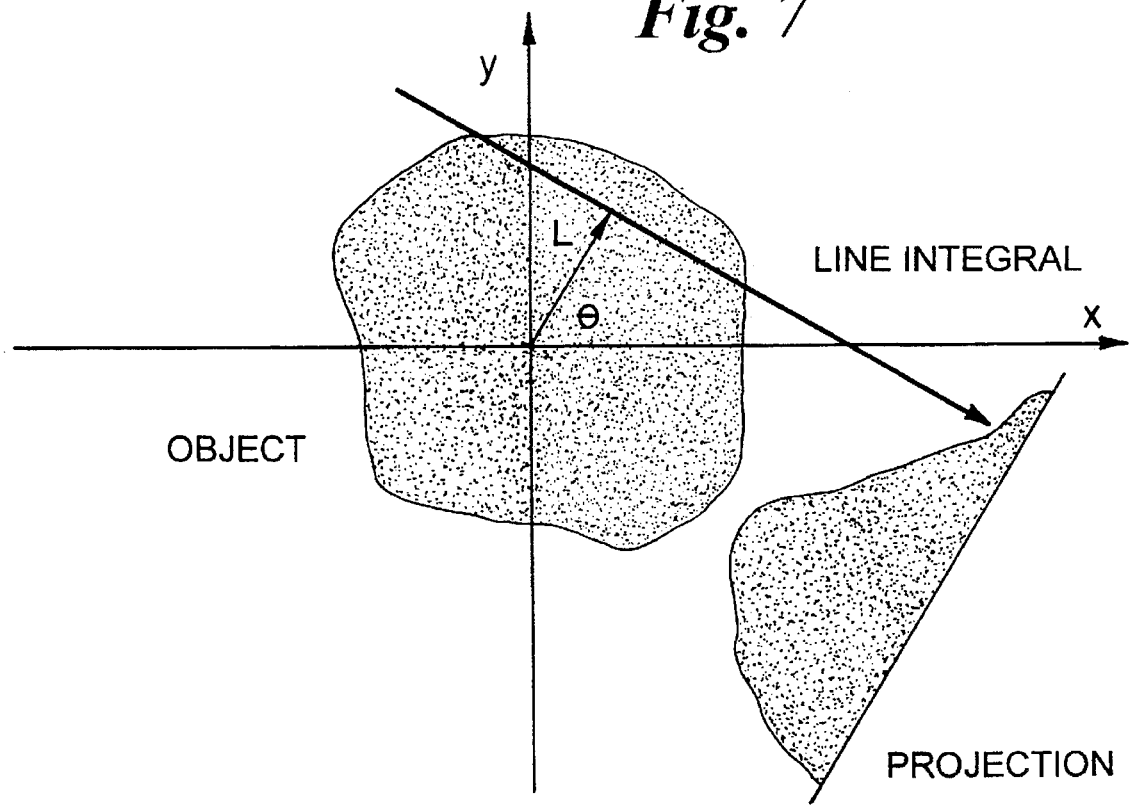
FIG. 7 depicts a two dimensional cross-sectional image and corresponding projections.
Figure 8:
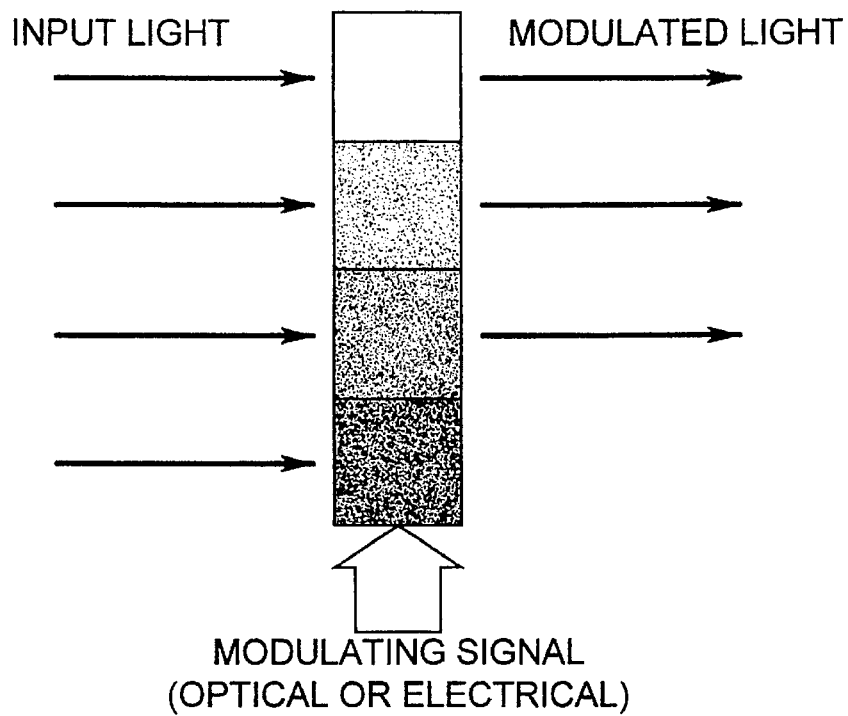
FIG. 8 depicts a linear spatial light modulator (SLM) array with four cells.
Figure 9:
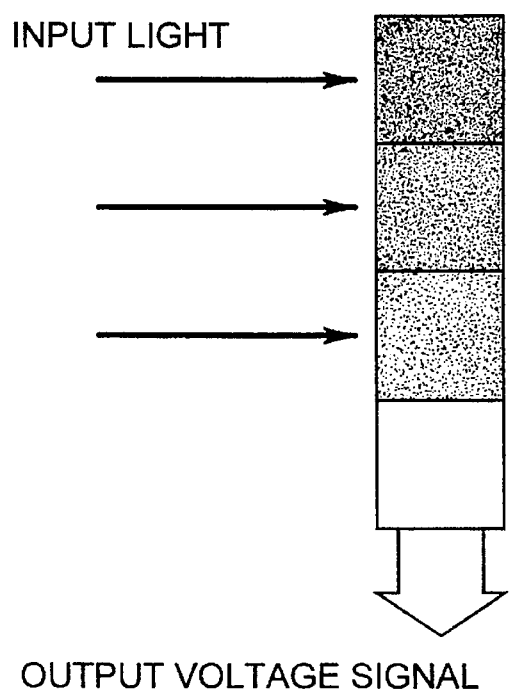
FIG. 9 depicts a linear charge coupled device (CCD) detecting array with four cells.

The optoelectronic forward projection processor as shown in FIG. 5 performs the tomographic forward projection to map the data in the image space into the projection space. It consists of:

an image display array.

a linear projection detector array and a cylindrical lens for "compressing" a two dimensional image to a one dimensional image.

an image rotator.

The image display array displays a reconstructed image using a two dimensional analog SLM or commercial liquid crystal projection TV. The linear projection detector array detects the image generated by the cylindrical lens. The linear projection detector array can be a linear CCD array. The role and the design of the image rotator is identical to the one described.

The Image Space Auxiliary Processor

Since operations of image addition can be performed directly on the CCD array, a separate image auxiliary processor may not be required. However, when performance of devices is not guaranteed, additional flexibility and improvement in accuracy can be gained by employing an auxiliary processor. The processor is required to be able to store a frame of the image and perform simple pixel by pixel addition or subtraction on images. Real-time digital video image processors which are commercially available can be used to perform these operations.

The Projection Space Auxiliary Processor

The basic functions of this auxiliary space processor are:

to receive data from the forward projection detector array.

to perform simple arithmetic operations.

to store projections; and to send data to the back projection linear SLM array.

This basic auxiliary processor can be built using either a commercial digital microprocessor or special purpose processor.

Algorithms

The rationale behind the algorithms is that a cross-sectional image can be reconstructed by successive error corrections using back and forward projections. The tomographic forward projection operations can be expressed by a matrix A and the corresponding back projection operations are expressed by the transpose of the matrix, $A^T$.

PIRT: Projection Iterative Reconstruction Technique

The present invention provides a new projection iterative reconstruction technique (PIRT). The operation involved in reconstruction using this technique can be summarized as follows:

$$t_k = t_{k-1} + \alpha [b - A \, x_{k-1}] \tag{4}$$

$$x_k = \beta \, A^T \, t_k$$

where $x_k$: an N×1 vector, represents the reconstructed image at the $k^{th}$ iteration.

--- b: an M×1 vector, represents the measured projections.

A: an M×N matrix, maps an image into the corresponding projections.

$t_k$: A state vector, is interactively built up in the projection space.

---

$\alpha$ and $\beta$ are scalars which are adjusted to achieve proper system gain. The block diagram is given in FIG. 1.

For an underdetermined system, the PIRT is guaranteed to converge to the unique minimum-norm solution.

$$\lim_{k \to \infty} x_k = A^T [A A^T]^{-1} b \tag{5}$$

In eq. 1, the matrix-vector multiplication $A \, x_{k-1}$ is performed using the optoelectronic forward projection processor, $t_{K-1}$ is updated to obtain $t_k$ and the result is then stored in the projection space auxiliary processor. The projection space auxiliary processor is also used to store b. The other matrix-vector multiplication operation involved in computing $\beta \, A^T \, t_k$ is performed using the optoelectronic back processor to $x_k$ which represents the output image.

PIRT-PC: Projection Iterative Reconstruction Technique with Partial Convolution When the Convolution Back Projection (CBP) method is used, full length convolutions have to be performed. In order to reduce hardware cost and accelerate the convergence of the PIRT, a short length convolution can be used as an acceleration technique. The improved algorithm can be described by $$t_k = t_{k-1} + \alpha \, H \, [b - A \, x_{k-1}] \tag{6}$$

$$x_k = \beta \, A^T \, t_k$$

or $$r_k = r_{k-1} - \alpha \, A \, A^T \, H \, r_{k-1} \tag{7}$$

$$x_k = x_{k-1} + \alpha \, A^T \, H \, r_k$$

where H is an N×N matrix representing a FIR filter of reduced length, $r_k$ is the residual in the projection space and $r_0 = b$. The order of the filter is significantly less than the order of the FIR filter used for the CBP algorithm and typically consists of only a few taps.

Other Techniques

Applications of the invention involving PIRT-CG, SIRT and SIRT-FBP are disclosed hereinbelow.

Methods for Eliminating Effects of Limited Dynamic Range

There are three sources which affect the dynamic range of reconstructed image:

a) The non-negative offset associated with the projection data may reduce the actual dynamic range to approximately 10%.

b) The finite dynamic range of the back projection 1-D SLM array.

c) The finite dynamic range of the forward projection 2-D SLM array.

The first effect can be eliminated by back projecting the positive and negative projection data separately. In addition, the error caused by the finite contrast ratio can also be canceled out using the dual projection scheme. The iterative procedure described in eq. 4 provides a choice for eliminating distortions caused by the finite dynamic ranges of the SLM arrays. In the iterative procedure, only back projections and forward projections of residuals are involved. In a stable feedback system, the magnitude of the residual will vanish as the number of iterations increase. Therefore, the vanishing residuals can always be adjusted to fit the maximum dynamic range of the SLM arrays and then rescaled back appropriately using the auxiliary processors after optical projections.

Background on SIRT

The Simultaneous Iterative Reconstruction Technique (SIRT) uses an iterative method to solve linear equations for tomographic image reconstruction. The SIRT was first proposed by Gilbert in 1971. The basic SIRT uses Richardson's method to solve a system Ax=b. The solution $x=[A^T A]^{-1} A^T b$ represents the least squares solution of the normal equations. It can also be treated as a method of quadratic optimization. Acceleration techniques, such as the Conjugate Gradient method, have been used in conjunction with SIRT to expedite convergence [18, 31–32].

Even though iterative tomographic algorithms have been discussed extensively during the last two decades, most applications employ direct reconstruction methods, such as the Filtered Back Projection (FBP) method and the Convolution Back Projection (CBP) method. The computation cost of iterative algorithms is formidable if they are implemented using today's electronic computers. An optoelectronic structure implementing SIRT is presented in this section. The proposed structure performs back and forward projection operations by simply projecting data optically. Time consuming matrix operations are, therefore, eliminated and the processing speed is improved significantly. Since, there is no need for computing Fourier Transforms or performing convolution operations explicitly, the cost of such a system is significantly lower.

This section introduces the notation used in casting the tomographic reconstruction issue as a problem of solving a linear system. The SIRT is reviewed as an iterative method for solving overdetermined systems. This is followed by a discussion on the issues of convergence. The optoelectronic implementation of SIRT is introduced after explaining the basic building blocks employed for back and forward projections.

Figure 10:
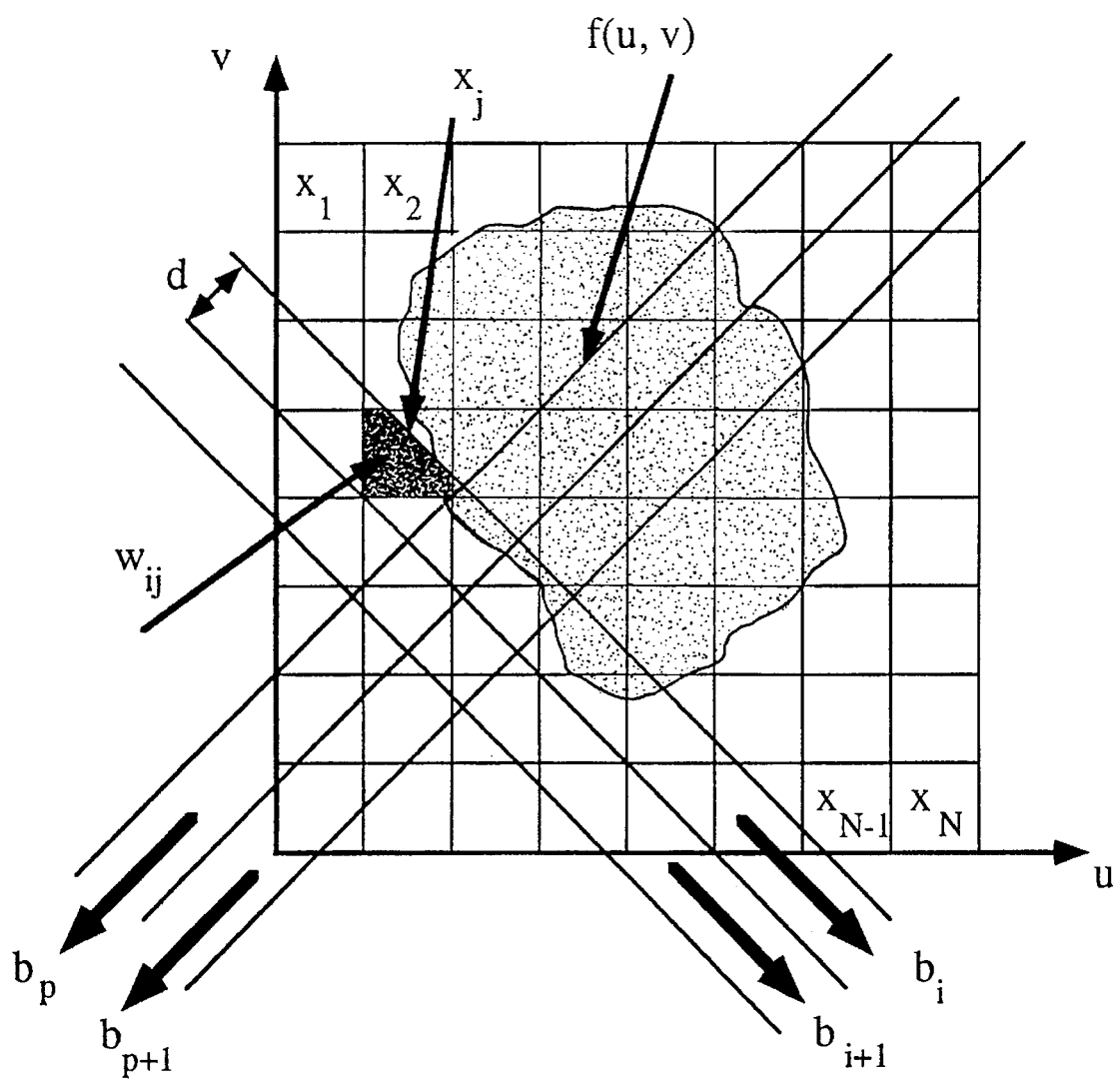
FIG. 10 depicts a two dimensional cross-sectional image and the corresponding projections.

A 2-D cross-sectional image of a 3-D object is shown in FIG. 10. The objective of the tomographic image reconstruction algorithm is to reconstruct the 2-D cross-sectional image on the basis of information contained in the ray-sums of projections measured from several orientations across the image plane around the object. A ray-sum is an integration or a summation of pixel grey levels across the image plane along that ray. A projection is a set of ray-sums in parallel with the same orientation.

Consider a 2-D discrete model for the n×n cross-sectional image where the pixels and ray-sums are numbered from 1 to N and 1 to M respectively. Let $x_j$, j=1, 2, ..., N, denote the grey level of the $j^{th}$ pixel, and $b_i$, i=1, 2, ..., M, represent the $i^{th}$ ray-sum. Then, the ray-sum $b_i$ can be expressed as $$b_i = \sum_{j=1}^{N} w_{ij} x_j, \text{ for } i = 1, \ldots, M \tag{8}$$

where $w_{ij}$ is the weight factor representing the fractional area intercepted by the $i^{th}$ ray-sum and the $j^{th}$ pixel. The projection operations of eq. 8 can be rewritten in a matrix form as $$A_{M \times N} x_{N \times 1} = b_{M \times 1}$$

where $$x = [x_1 \, x_2 \, \ldots \, x_N]^T \tag{9}$$

$$b = [b_1 \, b_2 \, \ldots \, b_M]^T$$

In this expression, all the n×n pixels in the 2-D cross-sectional image are stacked into the N×1 vector x and all the ray-sums from all projection orientations are denoted by the M×1 vector b. The matrix A is an M×N projection operator matrix mapping x into b and $w_{ij}$ is its $(i,j)^{th}$ element. Image reconstruction involves estimation of x from known b.

The operation of mapping the data from the projection space back to the image plane is called back projection. The back projection operation can also be expressed in the form of summation or matrix vector multiplication as $$\beta \sum_{i=1}^{M} w_{ij} b_i \text{ for } j = 1, \ldots, N \tag{10}$$

or $$\beta A^T b \tag{11}$$

where β is a constant used to normalize back projections. Usually, β is chosen as $$\beta = \frac{1}{\|A\|_1 \|A\|_\infty} \tag{12}$$

where $\|\cdot\|_1$ and $\|\cdot\|_\infty$ denote matrix one-norm and infinite-norm.

In what follows, the least squares solution of the normal equations representing overdetermined systems is reviewed briefly. The Simultaneous Iterative Reconstruction Technique (SIRT) for computing the least squares solution of overdetermined systems is then discussed.

When M>N and all N columns of the M×N matrix A are linearly independent, the system is overdetermined. This implies, that there is no direct solution, since the number of equations exceeds the number of unknowns. However, there exists a unique least squares solution. Using the normal equation method, the least squares solution for the overdetermined system is $$x = [A^T A]^{-1} A^T b \tag{13}$$

The result can be derived by minimizing $\|Ax-b\|_2$ where $\|\cdot\|_2$ is the Euclidean norm and $A^T A$ is symmetric and positive definite, $$\frac{d}{dx} \|Ax - b\|_2^2 = \frac{d}{dx} (Ax - b)^T (Ax - b) \tag{14}$$
$$= A^T A x - A^T b$$
$$= 0$$

$A^T A x = A^T b$
$x = [A^T A]^{-1} A^T b$
if $[A^T A]$ is nonsingular.

Figure 11:
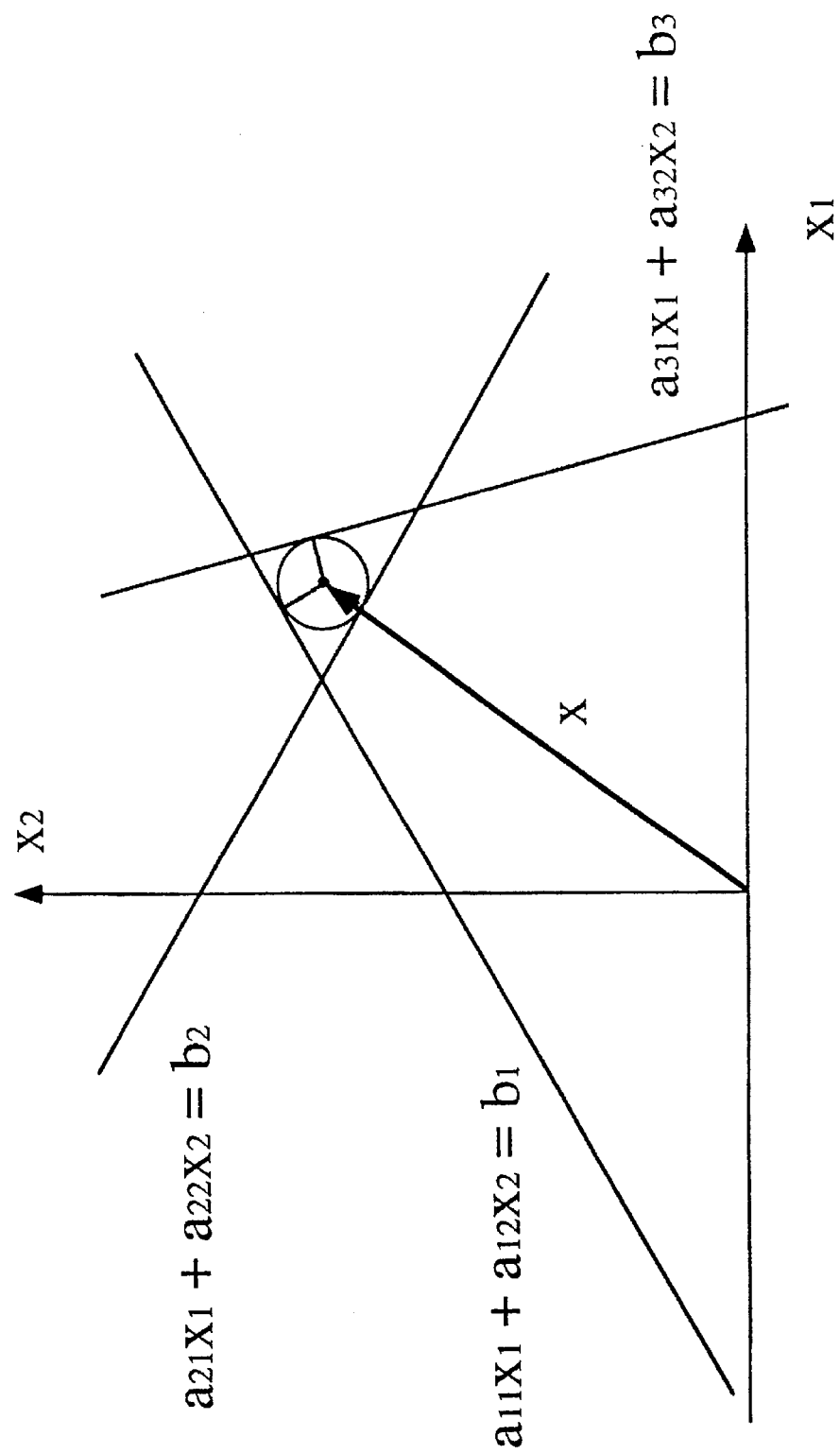
FIG. 11 depicts a least squares solution for an overdetermined system.

FIG. 11 shows the least squares solution for an overdetermined system where M=3, N=2.

In many applications such as the image reconstruction, the dimensions of the matrix A are large. In this case, least squares solution of the normal equations cannot be solved for directly using matrix inversion. Since the matrix A is extremely large and sparse in such cases, the matrix A cannot be formed in practice due to memory limitations and consequently only the non-zero entries of the matrix A are calculated on-line on an "as needed" basis and disposed off shortly thereafter. Since the matrix is not available in its entirety, techniques, such as Singular Value Decomposition (SVD), cannot be applied. However, these systems can be solved for using iterative methods where the matrix A is not required in full.

In eq. 13, the least squares solution x of the overdetermined linear system can be obtained by solving for x in a linear system D x=c, where $D=A^T A$ is an N×N symmetric positive definite matrix and $c=A^T b$ is an N×1 vector. The least squares solution of the overdetermined system can be obtained using iterative methods, such as the basic RF (Richardson's) method $$x(k) = (I - \alpha D) x(k-1) + \alpha c \tag{15}$$

or $$x(k)=x(k-1)+\alpha\ (c-A^T A\ x(k-1)) \quad (16)$$

or $$x(k)=x(k-1)+\alpha\ A^T\ [b-A\ x(k-1)] \quad (17)$$

where k is the iteration index and $\alpha$ is the relaxation coefficient chosen such that all the eigenvalues of $[I-\alpha A^{TT}A]$ lie within the unit circle. Eq. 17 can be rewritten as $$\begin{aligned} x\{z\} &= [I-[I-\alpha A^T A]z^{-1}]^{-1}\alpha A^T b\{z\} \quad (18)\\ &= [I-[I-\alpha A^T A]^{-1}]^{-1}\alpha A b \frac{1}{1-z^{-1}} \end{aligned}$$

where $z^{-1}$ is the unit delay in terms of k and b{z} is a constant vector. Invoking the final value theorem, the final value of x is $$\begin{aligned} \lim_{k=\infty} x(k) &= \lim_{z=1} [(1-z^{-1})x\{z\}] \quad (19)\\ &= [A^T A]^{-1} A^T b \end{aligned}$$

The result converges to the least squares solution of the normal equations as given in eq. 13. In tomographic image reconstruction, the matrix A is typically very large and sparse and consequently solving for x directly is unrealistic. The SIRT is a well-known method and uses a scheme identical to eq. 18 for solving an overdetermined system.

$$x(k)=x(k-1)+\alpha\ \beta\ A^T\ [b-A\ x(k-1)] \quad (20)$$

where $\beta$ is used to normalize the back projection defined in eq. 11 and eq. 12. When the system is overdetermined, the solution converges to the least squares solution.

Figure 12:
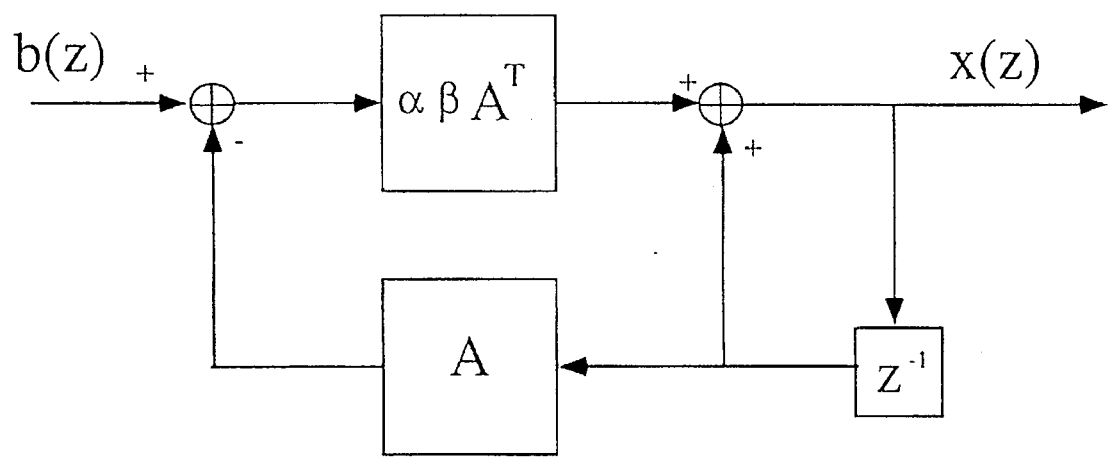
FIG. 12 depicts a block diagram of a simultaneous iterative reconstruction technique (SIRT)

The SIRT can be considered as a time-invariant linear feedback system as shown in the block diagram given in FIG. 12. The matrix-vector multiplication associated with the matrix A performs the forward projection. The forward projection maps the reconstructed image into the projection space. This is equivalent to determining the measured projections taken from the test object as described by eq. 9 and FIG. 10. The matrix-vector multiplication $\beta A^{TT}$ represents the back projection. The back projection maps the data from the projection space back to the image space. This operation is in the reverse direction of the forward projection and simply smears the data in the projection space back to the image space along each ray. The sparse matrix A is too large to be stored. The matrix-vector-multiplications associated with the back and forward projections are performed using eqs. 8 and 10 and weight factors, which are calculated on line ($w_{ij}$'s). Expressing SIRT using eq. 20, the residuals are obtained in the projection space as shown in the system block diagram in FIG. 12.3. From eq. 16, an alternative version of the original SIRT can be obtained by comparing the errors in the image space.

$$c=\beta\ A^T$$

$$x(k)=x(k-1)+\alpha\ [c-\beta\ A^T A\ x(k-1)] \quad (21)$$

The convergence properties of reconstruction algorithms expressed by eq. 20 and eq. 21 are the same. Both approach the least squares error in the projection space. However, when the system is overdetermined (M>N), the dimension of the back projected vector c is less than the dimension of the originally measured vector b.

If numerical noise is not present, the SIRT expressed by eq. 20 guarantees convergence to a solution irrespective of whether the system is overdetermined, underdetermined or undetermined. However, the solution may not be unique.

It is evident from eq. 20 that, if the error corrections, $$A^T[b-A\ x(\hat{k})]=0 \quad (22)$$

then, the solution converges after the $\hat{k}^{th}$ iteration.

When a system is overdetermined, or undetermined, i.e., the rank of A is less than M. The null space of $A^T$ is then not empty, and there exists $e\perp$range of A, (23)
where $b - Ax(\hat{k}) = e \neq 0$,
such that
$A^T \cdot e = 0$,
and $A^T[b - Ax(\hat{k})] = 0$.

In this case, the rank of A is less than M and the residuals in the projection space may not converge to zero. However, the errors in the image space converge to the null space of the matrix $A^T$. To emphasize the point further, the error corrections in the image space converge to zero even though the residuals in the projection space may not converge to zero.

When M=N or M<N, the system is said to be exactly determined or underdetermined respectively. In these cases, there exists at least one $\hat{k}$ satisfying $$b-A\ x(\hat{k})=0 \quad (24)$$

When the rank of A is equal to M, there exist solutions for [b−A x] and the residuals in the projection space converge to zeros. Hence, the condition for convergence expressed in eq. 22 is still satisfied. However, when the system is underdetermined, i.e., M<N, the solution obtained using SIRT is not guaranteed to be unique since there are infinitely many values of $x(\hat{k})$'s satisfying eq. 24. An uncertain component in the null space of A consequently exists in the image space. The corresponding component in the solution vector, x, can be caused by computational errors accumulated during the iterative process.

Optoelectronic Implementation of SIRT

In this section, an optoelectronic implementation of SIRT using SLM and CCD arrays is described in detail. The exact types of the SLM and CCD arrays are not specified in the proposed schemes. For example, the SLM arrays can be liquid crystal television displays and the CCD arrays can be solid state image detectors used in television cameras.

Figure 14:
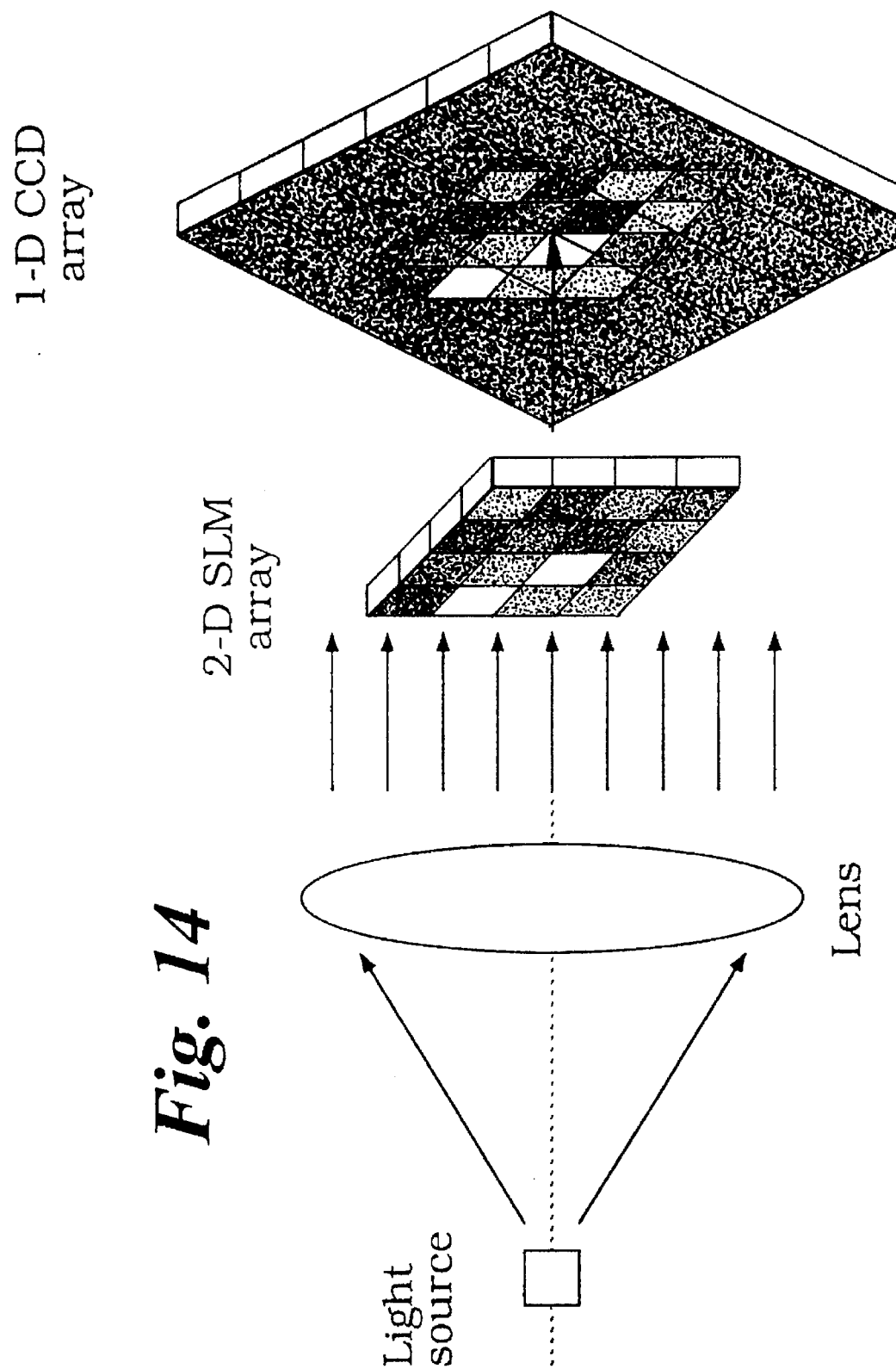
FIG. 14 depicts an optoelectronic back projection processor using a two dimensional SLM array and a one dimensional CCD array.

As shown in FIG. 10, ray-sums of a projection are obtained from strip integrations of pixel gray levels along areas intercepted by grids of pixels on the image plane and paths of rays in the projection. A forward projection from the reconstructed image is a duplication of the operation performed on the original image except that it is taken from the reconstructed image rather than the object under test. In FIG. 14, a 2-D SLM array is placed in front of a 1-D CCD array at an angle. The integrations are performed simultaneously by projecting the 2-D image pattern from the 2-D SLM array into the 1-D strip detector array. The 2-D SLM array represents the reconstructed cross-sectional image and the 1-D CCD array collects the projected pattern of the image according to the geometrically intercepted fractional areas along each strip at the given angle. The operation on the SLM/CCD array pair merely duplicates the original projection operation shown in FIG. 10 except that it is taken on the reconstructed image. The optoelectronic structure allows the matrix-vector-multiplication associated with the forward projection matrix at the $q^{th}$ angle, $A_q$, to be performed by a single optical projection between the SLM/CCD pair.

Figure 13:
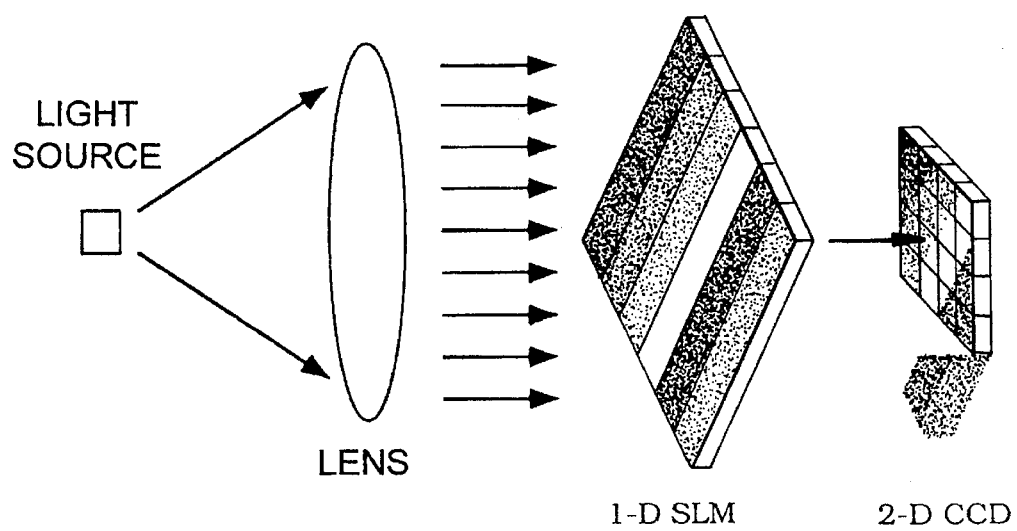
FIG. 13 depicts an optoelectronic forward projection processor using a one dimensional SLM array and a two dimensional CCD array.

A back projection, which is just an inverse of the forward projection operation, smears the data from the 1-D projection space back to the 2-D image space with the same intercepted fractional areas between projection strips and image pixels. In FIG. 13, a 1-D SLM array is placed in front of a 2-D CCD array, at an angle. The 1-D strip SLM array represents data in the projection space at the given angle and the 2-D CCD array represents the reconstructed image. After the light source is pulsed, the 1-D projected data is superimposed on the previously reconstructed image in proportion to the intercepted areas. The structure allows the matrix-vector-multiplication associated with the back projection matrix at the $q^{th}$ angle, $A_q^T$, to be implemented using a single optical projection between the SLM/CCD pair.

Figure 15:
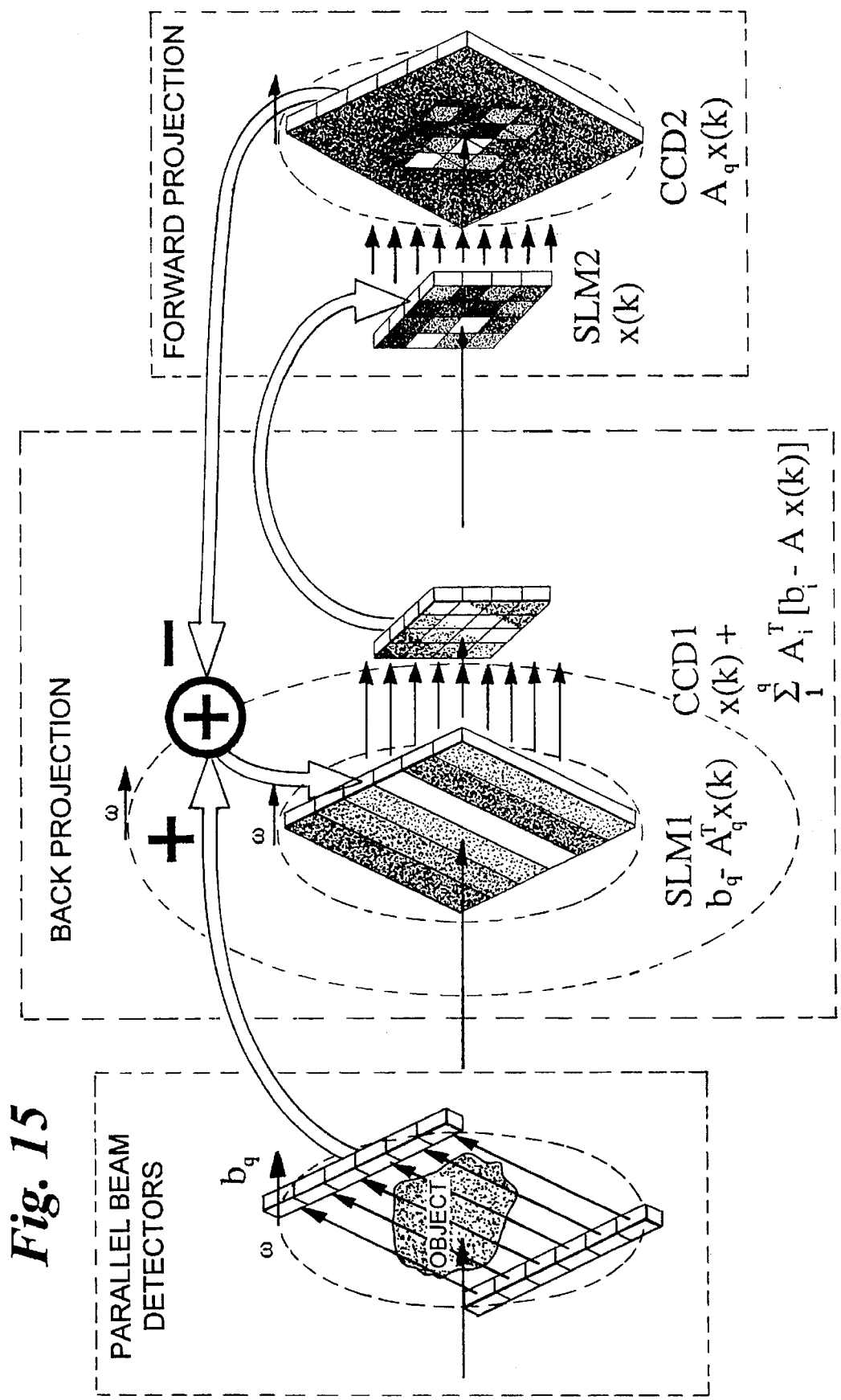
FIG. 15 depicts an iterative optoelectronic structure implementing SIRT.

The SIRT algorithm of eq. 20 can also be expressed in terms of projections taken at different angles:

repeat
$x_{old} \leftarrow x_{new}$
for q=1 to np do $$x_{new} \leftarrow x_{new} + \alpha A_q^T [\hat{b}_q - A_q x_{old}] \quad (25)$$

end of for
until done where $A^T_q$, $\hat{b}_q$ and $A_q$ are submatrices or subvector of $A^T$, b and A corresponding to the $q^{th}$ angle respectively and np is the total number of projections from all the measured angles. The structure is shown in FIG. 15. Forward projections are performed by the pair of arrays SLM2 and CCD2. Back projections are performed by the pair of arrays SLM1 and CCD1.

The iterative procedure using the structure shown in FIG. 15 can be described as follows:
procedure process for an iteration
  constant
    $b_q$: q=1 to np, measured projection at the $q^{th}$ angle;
  variable
    $x_{new}$: in CCD1, reconstructed image;
    $x_{old}$: in SLM2, reconstructed image from the last iteration;
1. Postprocess the image obtained from the last iteration (contents of CCD1) and then load it into SLM2 and CCD1 as $x_{old}$ and the initial value of $x_{new}$ respectively.
2. for q=1 to np do
3. Rotate SLM1 and CCD2 to the $q^{th}$ projection angle;
4. Forward project $x_{old}$, the reconstructed image from the 2-D array SLM2 into the 1-D array CCD2, thereby generating $[A_q x_{old}]$.
5. Determine errors in projection space, $[b_q - A_q x_{old}]$, by subtracting the reconstructed projection from the measured projection.
6. Load the errors into SLM1 after scaling their magnitudes up to the maximum dynamic range of the device.
7. Scale the back projection exposure period down by the same ratio as the scaling up factor used in step 6 and back project error corrections from the 1-D SLM1 into the reconstructed image in the 2-D CCD1. The result in CCD1 is $$x_{new} = x_{old} + \alpha \sum_{i=1}^{q} A_i^T [\hat{b}_i - A_i x_{old}] \quad (26)$$

8. end of for
9. end of the iteration.

A scaling factor is used in steps 6 and 7 to eliminate the effects of finite dynamic range. The factor will be described in the following section.

Since the proposed structure is essentially analog in nature, degradation in the performance caused by limitations of the optoelectronic devices have to be taken into account. Several sources of degradation are discussed in the section. The first source of degradation is caused by the finite dynamic range of the devices. The finite dynamic range arises due to the fact that there are only finite number of distinguishable gray levels which the optoelectronic device can generate. The second source of degradation is related to the nonlinear nature of the devices. The degradation in performance can also be caused by non-uniform distribution of light intensity incident on a plane from a point source. The effect of random generated noise, which may be caused by the dark current of the CCD array, is also discussed.

The number of distinguishable gray levels associated with CCD's is usually considered to be higher than those of SLM's. Hence, only the effects from SLM arrays are discussed here. For a typical liquid crystal television display, about two hundred distinguishable gray levels can be obtained.

The effect of the finite dynamic range of the back projection SLM can be minimized by scaling the magnitudes of the error terms up and then scaling the exposure period down correspondingly in steps 6 and 7 of the algorithm. In the feedback configuration, the magnitudes of the error correction terms decrease as the number of iterations increase. Therefore, the distortions caused by finite dynamic ranges of the device can be minimized by scaling the magnitudes of the errors up to the full range of the back projection SLM and then obtaining the proper error corrections by controlling the time interval of exposure accordingly. The factors of scaling can be estimated in advance for each iteration. The back projection SLM and CCD operate at their maximum dynamic ranges, although magnitudes of error corrections keep decreasing as the number of iterations increase. Consequently, the number of distinguishable gray levels of a reconstructed image does not depend on the back projections any longer and instead depends on the number of distinguishable gray levels of the forward projection operations only. Therefore, the performance of the proposed structures will rely on the 2-D SLM array used for forward projections. The image in the forward projection SLM is updated only once during each iteration and consequently the response time of the forward projection SLM array is not as critical from the perspective of overall system processing speed. The less stringent response time requirement results in more choices for selecting the device.

Figure 16:
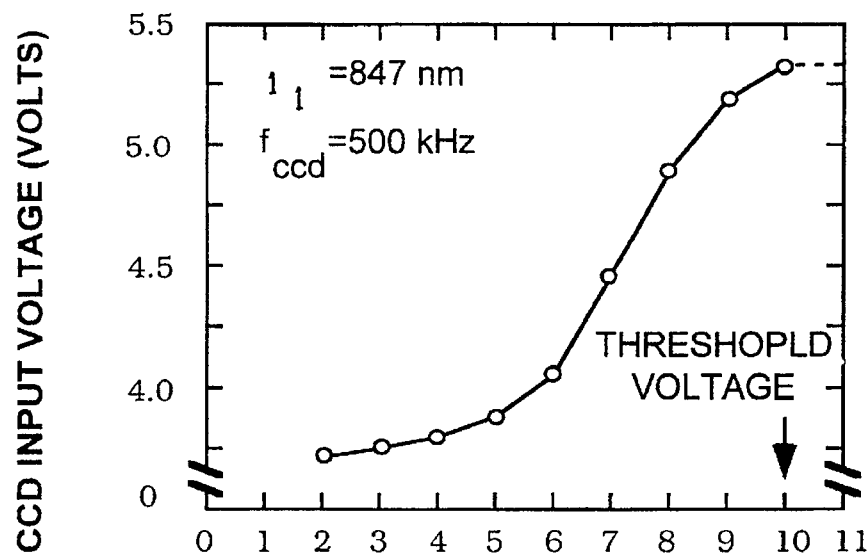
FIG. 16 depicts a nonlinear response curve of a GaAs/AlgaAs multiple quantum well SLM.

SLM's and CCD's are not perfectly linear devices. In general, the degree of nonlinearity of SLM's is usually worse than those of CCD's. FIG. 16 shows the relationship between the input voltage and the transmitted intensity for GaAs/AlGaAs-based CCD/MQW SLM's. In the block diagram of FIG. 17, block $N(k)_B$ and $N(k)_F$ can be treated as nonlinear functions of the back projection and forward projection data corresponding to SLM1 and SLM2 respectively. The system can be described as $$x(k) = x(k-1) + A^T N(k)_B [b - A N(k)_F x(k-1)] = [I - A^T N(k)_B A N(k)_F]$$
$$x(k-1) + A^T N(k)_B b \quad (27)$$

where $N(k)_B$ and $N(k)_F$ are diagonal matrices reflecting the nonlinear functions.

If the system is stable, then, the final value of the reconstructed image is given by $$\lim_{k \to \infty} x(k) = [A^T N_B A N_F]^{-1} A^T N_B b \quad (28)$$
$$= N_F^{-1} [A^T N_B A]^{-1} A^T N_B b$$
$$\approx N_F^{-1} [A^T A]^{-1} A^T b$$

where $N_B$ and $N_F$ correspond to the final value of $N(k)_B$ and $N(k)_F$.

In eq. 28, $N_B$ is neglected since its effect on the solution is secondary. Instead, we consider the effect of the nonlinearity on the back projection first. The term $[A^T N_B A]^{-1} A^T N_B b$ is equivalent to a least squares solution of a system $$N_B^{-\frac{1}{2}} A x = N_B^{-\frac{1}{2}} b$$

which minimizes (29)

$$\| N_B^{-\frac{1}{2}} [A x - b] \|_2.$$

The effect of nonlinearity on the back projection affects the distribution of the residuals. Therefore, the distortion associated with back projections can be neglected since the magnitude of the residuals are much smaller than the magnitude of the solution.

The effect of the nonlinear nature of the forward projection SLM cannot be neglected since it lies in the signal path. However, the effect is only to stretch the gray levels of reconstructed images. When a gray level of a pixel lies in the region of saturation of the SLM, the magnitude of the pixel is clamped at a constant value. Hence, the nonlinear character of the SLM functions acts as a constraint on the values of the solution. The constraints on the values of the solution tends to make the system relatively more overdetermined. The net effect of this constraint is to ensure that the least squares solution is obtained in a reduced space.

Figure 17:
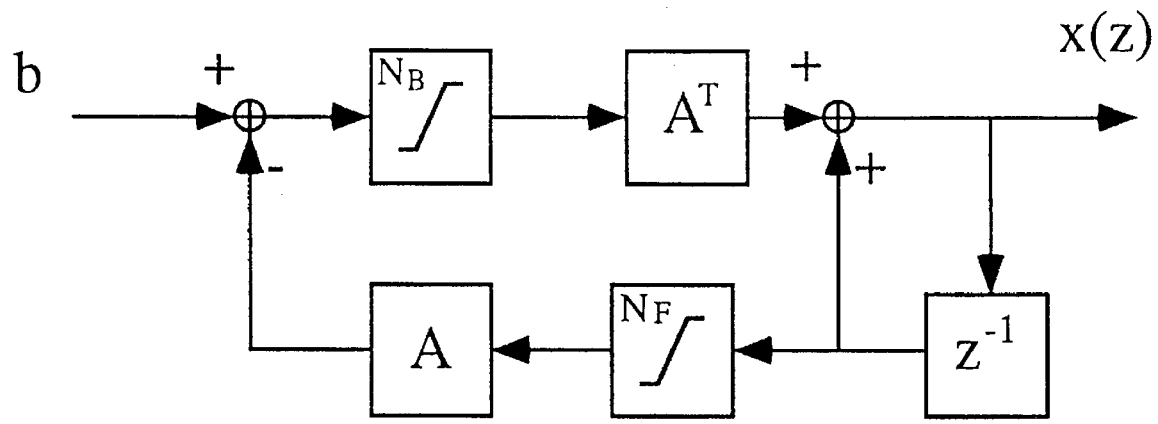
FIG. 17 depicts a block diagram for an optoelectronic implementation of SIRT with nonlinear functions of forward projection and back projection SLM arrays.

Another source of distortion is caused by the nonuniform distribution of the incident light intensity over SLM arrays. This can be caused by the Gaussian beam dispersion character of lasers. Let $D_B$ and $D_F$ be N×N diagonal matrices representing the light intensity distributions of the back and forward projections respectively and let $C(k)$ be an N×1 vector with identical elements representing the value of zero bias added during the back projection operation at the $k^{th}$ iteration. The block diagram is shown in FIG. 17 and the system can be described as $$x(k) = x(k-1) + D_B A^T [b + C(k) - A D_F x(k-1)] - A^T C(k) \quad (30)$$

where the zero bias $C(k)$ is added to the data to be projected before back projecting and subtracted from the image after each iteration. The final image is given by $$\lim_{k \to \infty} x(k) = [D_B A^T A D_F]^{-1} [D_B A^T b + [D_B - I] A^T C] \quad (31)$$
$$= D_F^{-1} [A^T A]^{-1} A^T b + D_F^{-1} [A^T A]^{-1} D_B^{-1} [D_B - I] A^T C$$
$$\approx D_F^{-1} [A^T A]^{-1} A^T b$$

where $$C = \lim_{k \to \infty} C(k).$$

The term in eq. 31 associated with C is caused by zero bias and its effect can be reduced. As the magnitudes of zero bias is adjusted down as the reconstructed image converges to the final solution, the magnitude of C can also be reduced. If positive and negative valued error corrections are projected separately, the zero bias term tends to cancel out. The $D_F^{-1}$ corrects the distortion caused by $D_F$ at the forward projection and the distortion is canceled out if an output image is taken from the image used for forward projections. If the light intensity decreases as we move from the center to the edge of an image, the term associated with $D_F^{-1}$ causes the brightness of the reconstructed image to increase from the center to the edge of the reconstructed image directly obtained from the back projection CCD array.

A dark voltage is generated in CCD cells as a result of build up caused by dark current. The effect of the dark voltage can be minimized by subtracting the average value from the CCD output after each iteration. Then, the residuals can be treated as random noise.

If the system is overdetermined or exactly determined, then the effect of this random noise can be minimized by the feedback scheme of the SIRT algorithm. When a system is underdetermined, i.e. the number of ray sums, M, is less than the number of pixels, N, the matrix $[A^T A]$ becomes singular. Components of the noise perpendicular to the null space of the matrix A will remain and accumulate in the image space. Consequently, convergence of the SIRT algorithm is not guaranteed. The problem of poor convergence is addressed hereinbelow where a new algorithm which guarantees convergence to a unique solution when the system is underdetermined is presented.

In order to assure the validity of the scheme, the system was simulated. The effects of limited dynamic range, nonlinearity, and random additive noise associated with optoelectronic devices have been included in the simulation model. Results of the simulation are presented in this section. The Shepp and Logan phantom is used as a test cross-sectional image throughout the simulation exercise. In order to model the intercepted fractional areas of optical projections in the free space, the weight factors, $w_{ij}$'s in eq. 8, are calculated exactly in the simulations. The mapping errors, introduced as a result of the fact that the original measured projections are taken from continuous cross-sectional plane and the images are reconstructed on a discrete plane, are included. Projections are usually taken from an image with higher spatial resolution. The image is, however, reconstructed with lower spatial resolution.

Figure 18:
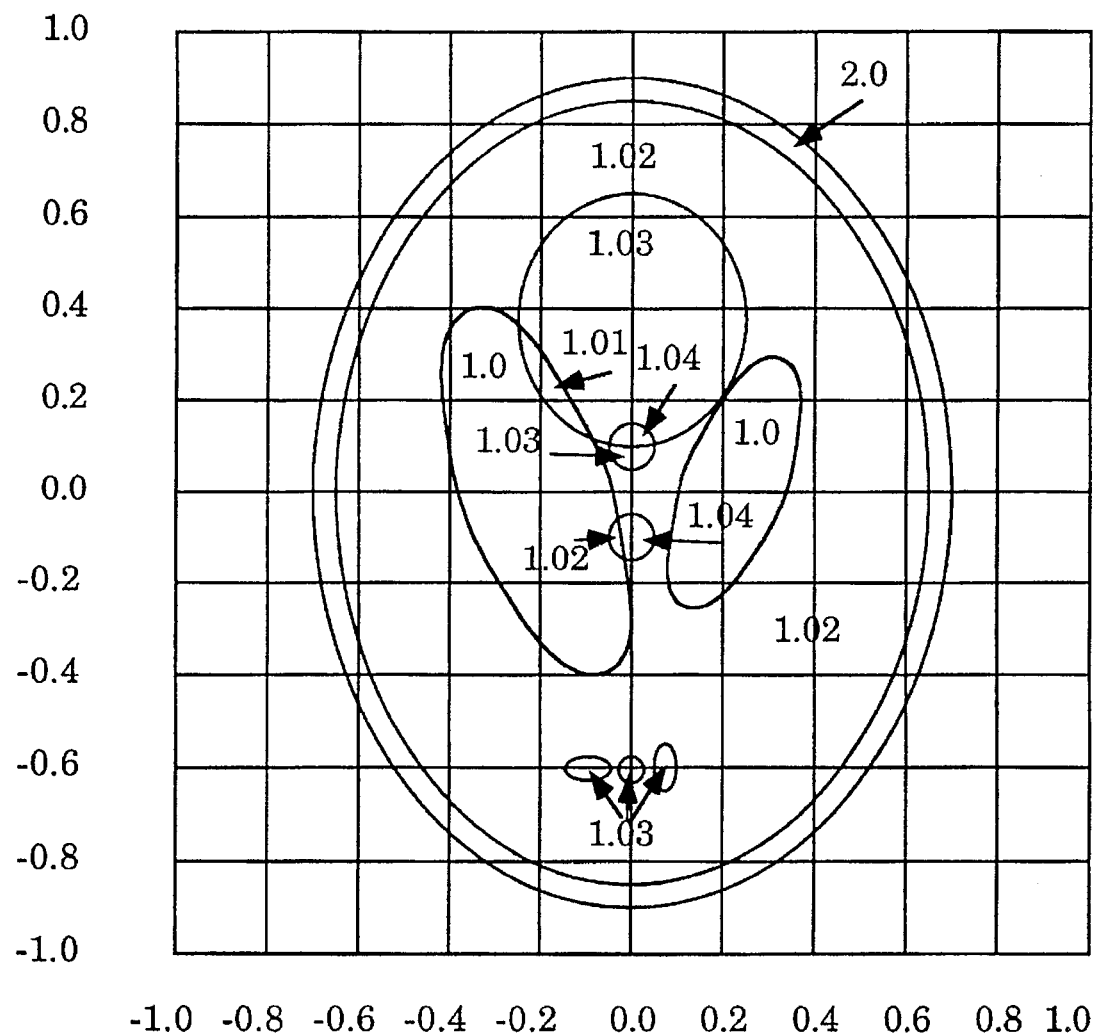
FIG. 18 depicts a Shepp and Logan phantom consisting of ten ellipses.

The Shepp and Logan phantom is a commonly used test cross-sectional image in tomographic image reconstruction. The phantom is specified in FIG. 18 and Table 3. Projections can be calculated directly from the given parameters of the ten ellipses or obtained by taking discrete Radon integrations from the image constructed using the given data.

TABLE 3

Parameters of the Shepp and Logan Phantom

| Center Coordinate | Major Axis | Minor Axis | Rotation Angle | Refractive Index |
|---|---|---|---|---|
| (0, 0) | 0.92 | 0.69 | 90 | 2.0 |
| (0, −0.0184) | 0.874 | 0.6624 | 90 | −0.98 |
| (0.22, 0) | 0.31 | 0.11 | 72 | −0.02 |
| (−0.22, 0) | 0.41 | 0.16 | 108 | −0.02 |
| (0, 0.35) | 0.25 | 0.21 | 90 | 0.01 |
| (0, 0.1) | 0.046 | 0.046 | 0 | 0.01 |
| (0, −0.1) | 0.046 | 0.046 | 0 | 0.01 |
| (−0.08, −0.605) | 0.046 | 0.023 | 0 | 0.01 |
| (0, −0.605) | 0.023 | 0.023 | 0 | 0.01 |
| (0.06, −0.605) | 0.046 | 0.023 | 90 | 0.01 |

Figure 19:
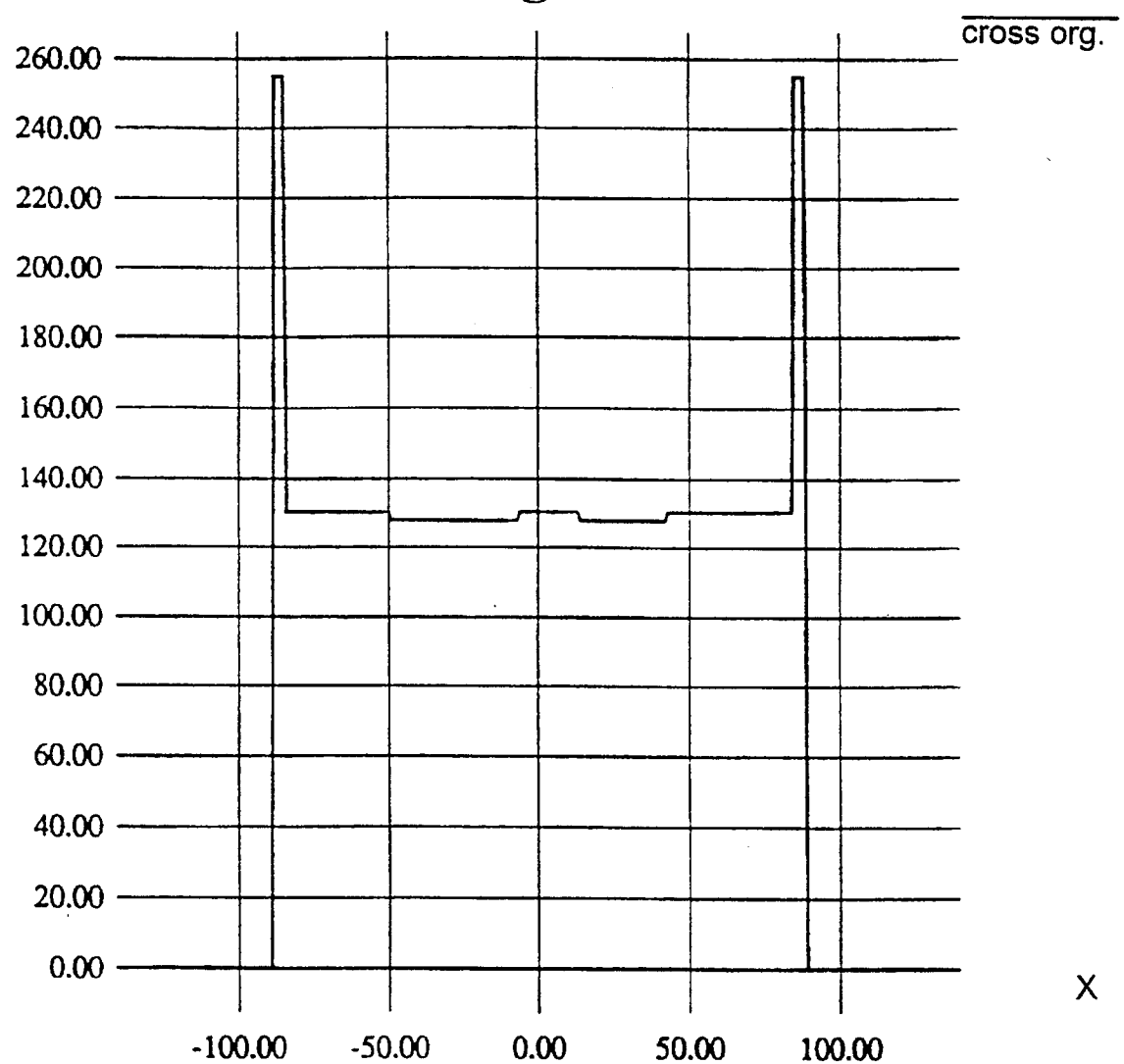
FIG. 19 depicts a cross-section of the original phantom and actual reconstructed images.
Figure 20:
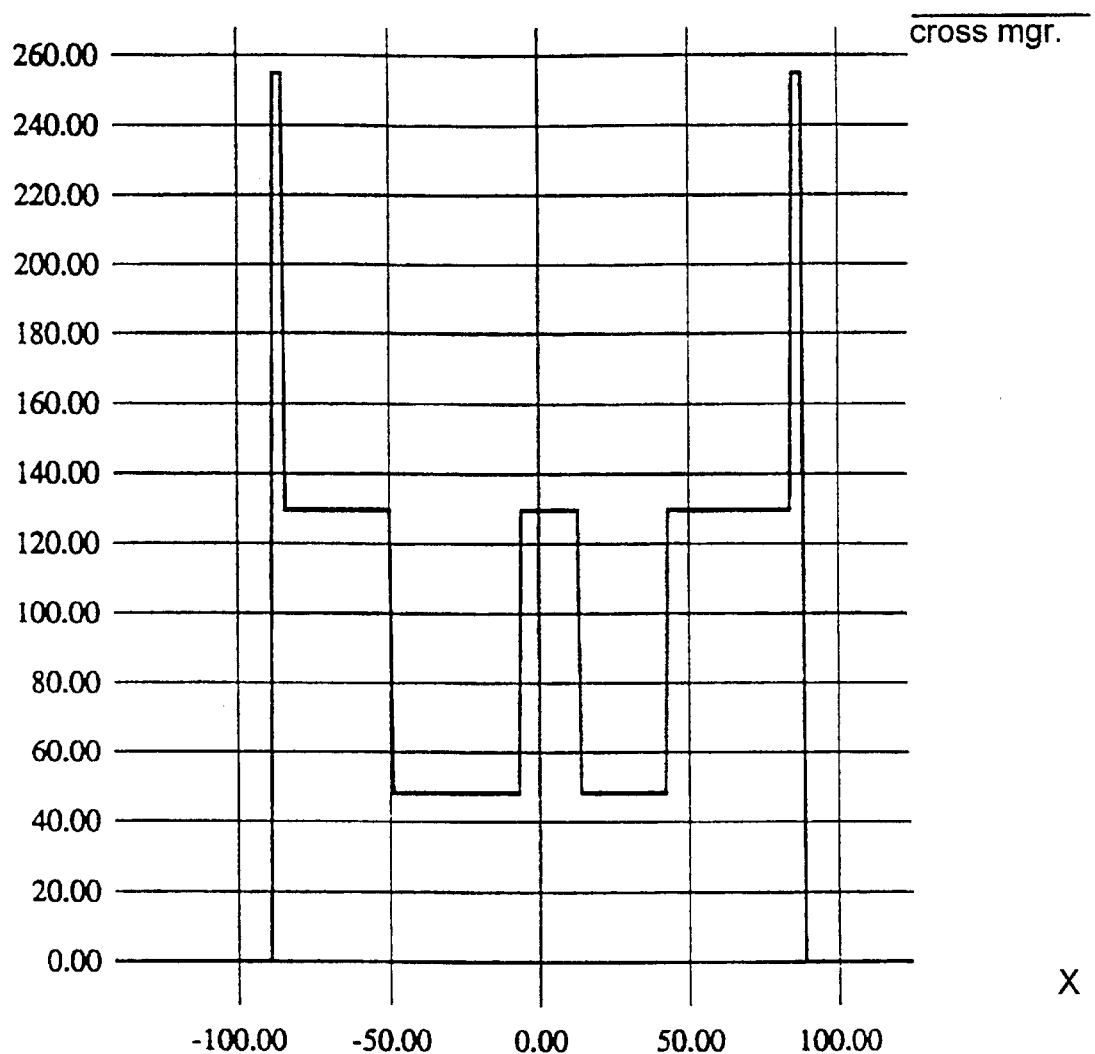
FIG. 20 depicts a cross-section of displayed images after contrast stretching.
Figure 21A:
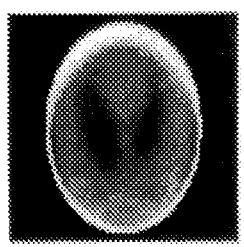
FIGS. 21$a$–$d$ depict a reconstructed image obtained using the SIRT at the $16^{th}$, $32^{nd}$, $64^{th}$ and $256^{th}$ iterations, respectively.
Figure 21B:
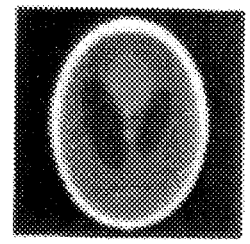
Figure 21C:
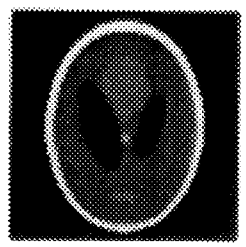
Figure 21D:
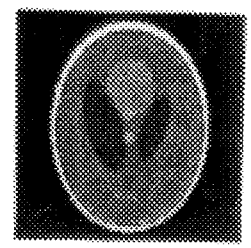
Figure 22A:
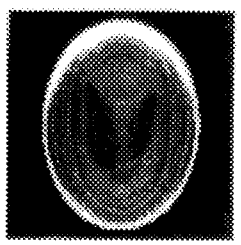
FIGS. 22$a$–$d$ depict reconstructed images at $16^{th}$, $32^{nd}$, $64^{th}$, and $128^{th}$ iterations, respectively where the number of distinguishable grey levels of the forward projection SLM is set at 256.
Figure 22B:
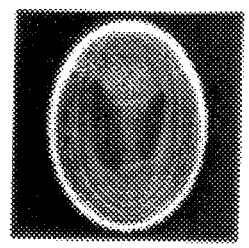
Figure 22C:
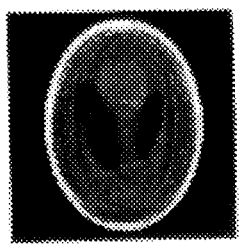
Figure 22D:
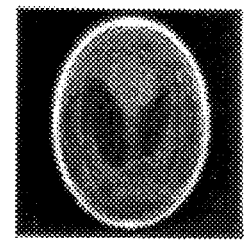
Figure 23A:
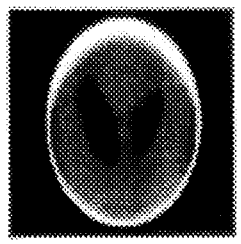
FIGS. 23$a$–$d$ depict reconstructed images at the $16^{th}$, $32^{nd}$, $64^{th}$, and $128^{th}$ iterations, respectively where the number of distinguishable grey levels of the forward projection SLM is set at 1024.
Figure 23B:
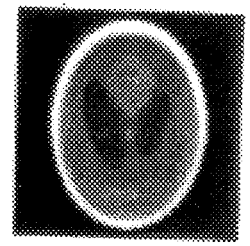
Figure 23C:
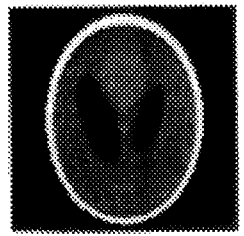
Figure 23D:
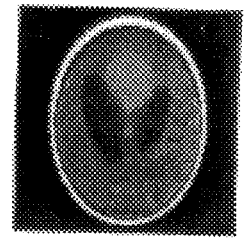
Figure 25A:
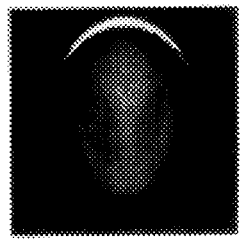
FIGS. 25$a$–$d$ depict reconstructed images at the $16^{th}$, $32^{nd}$, $64^{th}$, and $512^{th}$ iterations, respectively, with additive noise in the image space.
Figure 25B:
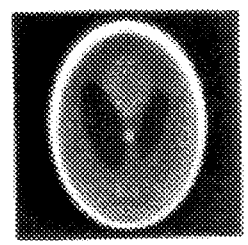
Figure 25C:
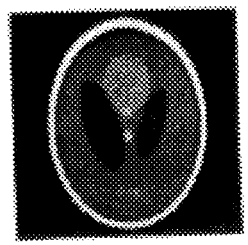
Figure 25D:
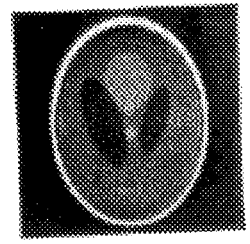

In simulations, an image is built first and then projections are taken from the image using eq. 8. The number of gray levels in the image is 200 as specified originally and a plot of a cross-section is shown in FIG. 19. However, the details of this phantom can not be observed if the gray levels are not stretched. The number of grey levels in the original phantom is 200, and the reconstructed image consists of real-valued gray levels in the range of 0–255. In order to enhance the contrast of the displayed image, gray levels in the range of 126–134 were stretched after reconstruction to cover the full range of the display by multiplying by a factor of 32. FIG. 20 shows a plot of the cross-section after contrast stretching.

FIGS. 21a–d show reconstructed images as a function of the number of iterations. These images are reconstructed using the basic SIRT algorithm. Projections are obtained by strip integrating the 512×512 original cross-sectional image. The dimensions of reconstructed images are 128×128. The system is overdetermined (M>N) with the number of projections set at 180. The width of ray-sums is the same as those of the pixels. Each projection covers the whole image plane.

FIGS. 22a–d and FIGS. 23a–d show the results obtained by simulating SLM arrays with 1024 and 256 distinguishable grey levels respectively. The finite number of gray levels is simulated by scaling the maximum pixel value to the maximum dynamic range and then quantizing properly. FIGS. 23a–d show that, when the number of distinguishable gray levels of the forward projection SLM array is reduced to 256, the reconstructed images show severe distortion. The results show that, for implementing the SIRT, the critical device parameter effecting the quality of reconstructed images is the number of distinguishable grey levels of the 2-D forward projection SLM array.

In this simulation, the nonlinear response curve in FIG. 16 is approximated using a fifth order polynomial $$f(x) = [y - 3.808249] \times 202.3996 \quad (32)$$
where
$$y = 0.000032051z^5 - 0.0033741z^4 + 0.063091z^3 - 0.41208z^2 + 1.1307z + 2.46$$

$$2.0 \leq z \leq 10.0 \text{ and } z = \frac{5 \times x}{256} + 4.5$$

The nonlinear function is employed during the back and forward projection operations separately.

In this simulation, the system is underdetermined. The dimensions of the reconstructed image are 256×256. The number of projections are 120 and there are 121 ray-sums in each projection. Therefore, the ratio of M to N is 0.22 where M and N are dimensions of the matrix A in eq. 20. Uniformly distributed noise in the range of −0.5 to +0.5 is added to the reconstructed image after each iteration. The SNR is 48.27 dB. FIG. 24 shows the plot of the residuals corresponding to the number of iterations. FIGS. 25a–d show the reconstructed image at different iterations. The result clearly begins to diverge after approximately one hundred iterations.

The Simultaneous Iterative Image Reconstruction algorithm—SIRT has been discussed from the point of view of the method of least squares solutions for overdetermined systems. A scheme for implementing the algorithm is also presented.

Optical computing offers the major advantages of massive parallelism and free space connectivity. These advantages can be exploited fully in tomographic image reconstruction. In the optical implementation of tomographic image reconstruction algorithm, the time consuming matrix-vector-multiplications associated with the back and forward projection operations are replaced by parallel optical projections. The inaccuracy associated with interpolations and approximations linked to tomographic projection operations are overcome since the intercepted fractional areas of free space optical projections are exact. In addition, iterative algorithms offer two major advantages over direct algorithms when implemented using optoelectronic devices. With iterative algorithms, the dynamic range of optoelectronic devices can be fully exploited. In addition, there is no need for filtering or convolution operations. The optoelectronic structures described in this section can be built using TV devices and mechanical image rotators that are commercially available. In the future, the performance of the proposed structures can be considerably enhanced by using higher speed SLM's and static image rotation devices.

The presence of noise and optical distortion prevents optical implementations of direct reconstruction algorithms using optical Fourier Transforms with an acceptable level of performance. However, the accuracy of the reconstruction can be enhanced using the feedback scheme proposed in this section. In other words, a less accurate optical filter can be used with the optoelectronic implementation in order to speed up the reconstruction.

In many applications, reconstruction of high spatial resolution images from fewer measured data is desired. The situation represents an underdetermined systems since the number of unknowns to be solved for, is more than the amount of measured data. It has been pointed out that, for an underdetermined system, the conventional SIRT algorithm does not guarantee unique convergence if numerical errors are present during computation. This problem is remedied in a new technique called Projection Iterative Reconstruction Technique which is described hereinbelow. An optoelectronic system for implementing the algorithm follows introduction to the novel approach.

Projection Iterative Reconstruction Technique

The Projection Iterative Reconstruction Technique (PIRT) is an iterative tomographic image reconstruction scheme for solving underdetermined systems. The PIRT guarantees convergence to a unique minimum-norm solution for an underdetermined system. Since, the state matrix associated with the PIRT is symmetric and positive definite, it allows application of the conjugate gradient method for solving underdetermined systems without the need for imposing explicit constraints.

In many applications of tomographic image reconstructions, images of higher spatial resolution are desired to be reconstructed from limited data. In all of these cases, the number of unknowns to be solved for, is more than the number of measurements. This results in an underdetermined system.

When a system is underdetermined, the SIRT algorithm described hereinbefore converges to the minimum-norm solution, if the initial value is selected properly and no numerical error is introduced during computing. However, numerical errors are unavoidable in most situations. This is particularly true for the optoelectronic implementation proposed in the previous section. In this case, the result obtained using SIRT will diverge as discussed hereinbefore and shown in FIG. 25. Consequently, there is interest in other algorithms where a unique solution is guaranteed when the system is underdetermined.

The conjugate gradient method is an efficient acceleration technique for solving large and sparse linear systems and has been used extensively in conjunction with the SIRT. Since, the conjugate gradient method is guaranteed to converge only when a system is symmetric and positive definite, it cannot be applied for solving underdetermined systems without imposing explicit constraints. Since the state matrix associated with the PIRT is symmetric and positive definite, the conjugate gradient method can be directly applied without the need for constraints.

The PIRT is an iterative tomographic image reconstruction algorithm which can be considered as a counterpart of the SIRT. The SIRT leads to the least-squares solution of the normal equations for overdetermined systems by correcting errors in the solution in the image space iteratively. This is in contrast to the PIRT which yields the minimum-norm solution of the normal equations for underdetermined systems by building up a state space vector in the projection space iteratively.

Consider a system, $Ax=b$, where $M<N$. If the M rows of the $M \times N$ matrix A are linearly independent, we have an underdetermined system and consequently there are an infinite number of solutions. However, the system has a unique minimum-norm solution. The solution of an underdetermined system which minimizes $\|x\|_2$ can be derived as follows $$\text{If} \quad x = A^T t \tag{33}$$
$$\text{where} \quad t = [t_1 t_2 \ldots t_M]^T$$
$$\text{then} \quad A[A^T t] = b$$
$$\text{or} \quad t = [AA^T]^{-1} b$$
$$x = A^T [AA^T]^{-1} b$$

The matrix $[A A^T]$ is symmetric and positive definite and therefore a unique solution of t exists.

The fact that x represents the minimum-norm solution can be shown as follows. The solution of x is a linear combination of the linearly independent rows of A, $$x = A^T t \tag{34}$$
$$= t_1 \hat{a}_1^T + t_2 \hat{a}_2^T + \ldots + t_M \hat{a}_M^T$$

where $\hat{a}_i$ is the $i^{th}$ row of A.
The solution vector x minimizes the Euclidian distance from the origin because it is orthogonal to the null space of A. This can be shown as follows:

$$\text{Let} \quad z \in \mathfrak{R}^N \text{ and } z \in \text{null space of } A \tag{35}$$
$$\text{then} \quad Az = 0$$
$$\hat{a}_i^T \cdot z = 0, \text{ for all } i, i \in \{1,2,\ldots,M\}$$
$$\text{or} \quad x^T \cdot z = 0$$

consequently $x \perp z$ where $\perp$ denotes orthogonality, i.e. $x \perp$ null space of A.

The minimum-norm solution of an underdetermined system can also be derived by minimizing $(\frac{1}{2})x^T x$ under the equality constraint $Ax=b$.

$$\frac{\partial}{\partial x} \left\{ \frac{1}{2} x^T x - (Ax-b)^T \lambda \right\} = 0 \tag{36}$$
$$x - A^T \lambda = 0$$
$$A^T \lambda = x$$
$$AA^T \lambda = Ax = b$$
$$\text{then}$$
$$\lambda = [AA^T]^{-1} b$$
$$x = A^T \lambda$$
$$= A^T [AA^T]^{-1} b$$

where the Lagrangian multiplier $\lambda$ is equivalent to the state vector t in eq. 33.

Figure 26:
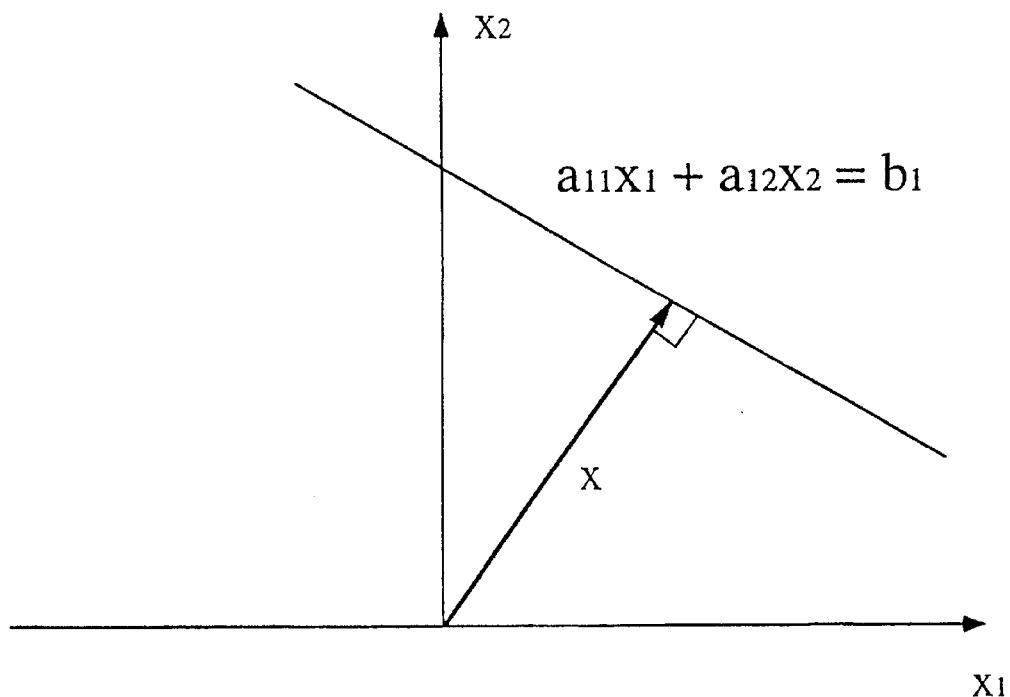
FIG. 26 depicts a minimum-norm solution for an underdetermined system.

The minimum-norm solution of an underdetermined system for the case of M=1, N=2 is shown in FIG. 26.

When a system is underdetermined, i.e. $M<N$ and all M rows of A are linearly independent, the SIRT cannot guarantee convergence to a unique solution since the $N \times N$ matrix $[A^T A]$ is not positive definite anymore. However, in eq. 33, the $M \times M$ symmetric matrix $[A A^T]$ is positive definite and therefore the state variable vector, i.e. the intermediate solution vector t, can be solved for iteratively. Consequently, the minimum-norm solution of an underdetermined system, $Ax=b$, can also be solved for by iteratively solving the equation $[A A^T]t=b$. The corresponding state and output equations can be written as $$t(k)=t(k-1)+\alpha [b-A A^T t(k-1)]$$

$$\text{and } x(k)=A^T t(k) \tag{37}$$

where k is the iteration index and $\alpha$ is the relaxation coefficient. $\alpha$ has to be chosen such that the eigenvalues of $[I-\alpha A A^T]$ lie within the unit circle.

Figure 27:
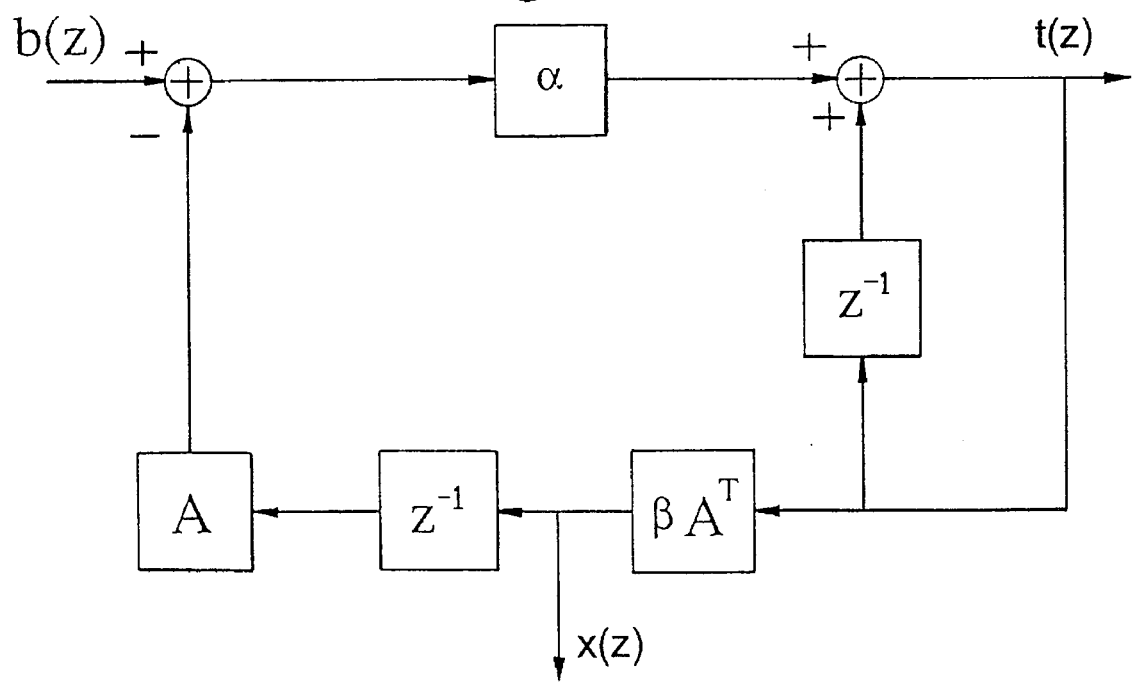
FIG. 27 depicts a block diagram of a projection iterative reconstruction technique (PIRT)

A block diagram summarizing the steps involved in PIRT is shown in FIG. 27. The convergence of eq. 37 can be proved by recursively using eq. 34 and finding the limit as $k \to \infty$.

$$\begin{aligned}
t(k) &= t(k-1) + \alpha[b - AA^T]t(k-1) \\
&= \alpha b + [I - \alpha AA^T]t(k-1) \\
&= \alpha b + \{[I - \alpha AA^T][\alpha b + [I - \alpha AA^T]t(k-2)]\} \\
&= \alpha\{I + [I - \alpha AA^T]\}b + [I - \alpha AA^T]^2 t(k-2) \\
&\ldots \\
&= \alpha \left\{ \sum_{n=0}^{k-1} [I - \alpha AA^T]^n \right\} b + [I - \alpha AA^T]^k t(0) \\
&= \alpha \{I - [I - \alpha AA^T]\}^{-1} \{I + [I - \alpha AA^T]^k\}b + [I - \alpha AA^T]^k t(0) \\
&= [AA^T]^{-1} \{I - [I - \alpha AA^T]^k\}b + [I - \alpha AA^T]^k t(0)
\end{aligned} \tag{38}$$

When $\|I - \alpha AA^{TT}\| < 1$, and $k \to \infty$, then $$[I - \alpha A A^T]^k \to 0 \tag{39}$$

and $$\lim_{k \to \infty} t(k) = [AA^T]^{-1} b \tag{40}$$

for any finite t(0).

The convergence can also be shown by taking z-transforms and invoking the final value theorem, $$t(z) = t(z)z^{-1} + \alpha[b(z) - AA^T t(z)z^{-1}] \quad (41)$$
$$= [I - [I - \alpha AA^T]z^{-1}]^{-1} \frac{\alpha b}{1-z^{-1}}$$

$$\lim_{k \to \infty} t(k) = \lim_{z \to 1} [(1-z^{-1})t(z)]$$
$$= [AA^T]^{-1}b$$

Hence $\lim_{k \to \infty} x(k) = A^T \lim_{k \to \infty} t(k)$
$$= A^T[AA^T]^{-1}b$$

This indicates that x(k) converges to the minimum-norm solution of the underdetermined system as shown in eq. 33. Since the state vector t is equivalent to the Lagrangian multiplier $\lambda$ in eq. 39, this algorithm can be considered as an iterative method for determining the Lagrangian multiplier and the optimum solution simultaneously.

Alternatively, we can determine the minimum-norm solution of the cross-sectional image of an underdetermined system using the PIRT algorithm by rewriting equation 37 as $$t(k)=t(k-1)+\alpha \, [b-A \, x(k-1)]$$
$$x(k)=\beta \, A^T \, t(k) \quad (42)$$

where $\beta$ is the coefficient used to normalize the back projections and t(k) is a state vector which is iteratively built up in the projection space. In this algorithm, the Lagrangian multiplier in the projection space and the minimum-norm solution in the image space are solved for simultaneously. The difference between the PIRT algorithm and the SIRT algorithm in respect of their computational procedure is that, with PIRT, there is an additional state vector in the projection space and the error corrections are fed back to the projection space instead of in the image space. Consequently, the solution in the image space is uniquely determined by back projecting the reconstructed projections. In contrast, the SIRT does not identify a state vector explicitly and the error corrections are fed back in the image space. Consequently, in the case of PIRT, a unique minimum-norm solution is guaranteed when the system is underdetermined.

In many applications, a priori information relating to the cross-sectional image can be obtained before applying iterative algorithms. An initial image can also be used in conjunction with the PIRT in order to improve the reconstruction result as well as speed. When an initial image is given, the solution obtained using PIRT minimizes the Euclidian distance to the initial image in the image space. This is in contrast to SIRT which minimizes the residual in the projection space.

When the initial image is known, we only need to solve for an image that represents the difference corresponding to the actual measurements and the initial image. This difference in the image space can be obtained from the initial residual in the projection space. The initial residual is found by projecting the initial image into the projection space and comparing it to actual measurements. Finally, the reconstructed image is obtained by superimposing the difference on the initial image.

Let $x_0$ denote the initial image. We rewrite A x=b as $$A \, [x_0+\tilde{x}]=b_0+\tilde{b} \quad (43)$$

where $$A \, x_0=b_0$$

$$A \, \tilde{x}=\tilde{b},$$

$b_0$ represents the projections obtained from the initial image, $\tilde{b}$ is the difference between the measured projections and the projections from the initial image, and $\tilde{x}$ is the difference in the image space based on the information from the actual measurements and the initial image. The initial residual in the projection space is $$\tilde{b} = b - b_0 \quad (44)$$
$$= b - Ax_0$$

Therefore, only $\tilde{x}$, the difference in the image space, need to be solved for in the iterative reconstruction process.

$$\tilde{t}(k)=\tilde{t}(k-1)+[\tilde{b}-A \, \tilde{x}(k-1)]$$
$$\tilde{x}(k)=A^T \, \tilde{t}(k) \quad (45)$$

and $$x(k)=x_0+\tilde{x}(k)$$

This algorithm minimizes $\|\tilde{x}(.)\|_2$ where $$\tilde{x}(.) \triangleq \lim_{k \to \infty} \tilde{x}(k),$$

i.e., the Euclidean norm of the differences between the solution' and the initial image, $$\|x-x_0\|_2 \quad (46)$$

It may be noted that, it is not necessary for the initial image, $x_0$, to be the minimum-norm solution of A $x_0=b_0$.

Constraints are very often used in conjunction with the SIRT and other iterative image reconstruction algorithms. Although a variety of constraints can be applied, only those applied to the values of solutions are discussed in this section. The constraints applied to the values of a solution confine the solution within a boundary that is usually based on an appropriate physical reasoning. Such constraints can include non-negative values or bounds for the pixel gray levels. Constraints imposed in conjunction with SIRT employed for solving an underdetermined system may not always lead to a unique solution.

When constraints are applied in conjunction with the PIRT for solving an underdetermined system, the solution does not get affected if the unconstrained solution is within the solution boundary. If the unconstrained minimum-norm solution is outside of the boundary, the solution converges to a minimum-norm solution in a reduced solution space provided that the minima exists within the reduced space and the constrained space is convex. In this case, the solution x can be expressed as $[x_v^T | x_c^T]^T$, where $x_v$ is an $N_v \times 1$ vector, $x_c$ is an $N_c \times 1$ vector and $N_v+N_c=N$. $x_c$ is a vector of constant values which corresponds to the part of the solution which is constrained by the boundary. $x_v$ denotes the rest of variables to be solved. The problem is equivalent to solving a system with reduced dimensions $$[A_v | A_c] \begin{bmatrix} x_v \\ x_c \end{bmatrix} = b \quad (47)$$

$$A_v \, x_v = b - A_c \, x_c = c \quad (47)$$

where $[A_v | A_c]=A$ and $c=b-A_c \, x_c$.

The dimension of the reduced system, $A_v \, x_v=c$, is $M \times N_v$ where $N_v<N$. The solution converges to the unique minimum-norm solution in the reduced space provided that the system is still underdetermined.

When more and more pixels are constrained to take constant values, the dimensions of the solution space may become smaller than the dimension of the measurements in the projection space. In this case, the originally underdetermined system is turned into an overdetermined system subject to the constraints. It is also possible that, after some pixels are constrained to take constant values, the number of linearly independent columns in the matrix A is less than M despite the fact that more than M pixels need to be solved for. In the latter case, the system become an undetermined system. In both of the above cases, the matrix $[A_v A_v^T]$ is not positive definite.

The state vector t in the projection space of the PIRT expressed by eq. 42 is only guaranteed to converge to a unique solution when the system is underdetermined or when the matrix A is square and full rank. The residual in the projection space will converge to zeros only when the rank of A is M. When the rank of A is less than M, the state variable, t, in the projection space will diverge as shown below.

Consider an overdetermined system, where the measured vector b can be decomposed into two orthogonal components let $b_\perp \in \Re^M$ with (48)

$b_\perp$ null space of $A^T$ and $b_\| \in \Re^M$ with $b_\| \in$ range of $A$ then
$$b = \bar{a}_1 x_1 + \bar{a}_2 x_2 + \ldots + \bar{a}_N x_N = b_\perp$$
$$= b_\| + b_\perp$$
for $b_\| \perp b_\perp$ where M>N, and $\bar{a}_j$ is the $j^{th}$ linearly independent column of A. Under these Conditions, the linear system can be decomposed into two independent systems $$t_\|(k) = t_\|(k-1) + [b_\| - A A^T t_\|(k-1)]$$

and $$t_\perp(k) = t_\perp(k-1) + [b_\perp - A A^T t_\perp(k-1)]$$

where $t_\|(k) \in$ range of $A$ $t_\perp(k) \in$ null space of $A^T$ for $t_\|(0) = t_\perp(0) = 0$ (49)

Consider a measurement $b\perp$ in the null space of $A^T$, $b\perp \neq 0$ and $A^T b\perp = 0$. The vector $t\perp$ therefore linearly increases in proportion to the iteration number k:
since $A^T t_\perp(k-1) \equiv 0$ $$\begin{aligned} t_\perp(k) &= t_\perp(k-1) + [b_\perp - AA^T t_\perp(k-1)] \\ &= t_\perp(k-1) + b_\perp \\ &= t_\perp(k-2) + 2b_\perp \\ &\ldots \\ &= kb_\perp, \text{ for } t_\perp(0) = 0 \end{aligned}$$ (50)

and $$\lim_{k\to\infty} \|t_\perp(k)\|_2 = \infty$$

This indicates that the state vector t has a tendency to diverge linearly as a function of the iteration number.

$$\lim_{k\to\infty} t(k) = \lim_{k\to\infty} [t_\|(k) + t_\perp(k)] = \infty. \quad (51)$$

When the system is overdetermined, the solution obtained using PIRT in the image space converges to the least squares solution despite divergence in the projection space.

Let x(.) denote the final converged solution and $x(.)_j$, j=1, 2, ..., N, be the $j^{th}$ element of x(.), then $$b_j = \bar{a}_1 x_1 + \bar{a}_2 x_2 + \ldots + \bar{a}_N x_N$$

$$A x(.) = \bar{a}_1 x(.)_1 + \bar{a}_2 x(.)_2 + \ldots + \bar{a}_N x(.)_N$$

since $b_j - A x(.) = 0$
hence $$\bar{a}_1 [x_1 - x(.)_1] + \bar{a}_2 [x_2 - x(.)_2] + \ldots + \bar{a}_N [x_N - x(.)_N] = 0 \quad (52)$$

and all $\bar{a}_j$'s are linearly independent
therefore, $x_j - x(.)_j = 0$, for all j=1 to N.
Then the residual is $$b_\perp = b - A x(.) \quad (53)$$

The solution is equivalent to the one obtained by minimizing $\|b - A x(.)\|_2$.

It has been shown that for the convergence of PIRT in the projection space, the system has to be underdetermined or determined. In this section, an important restriction on the projection geometry of the PIRT is introduced. It should be kept in mind that whenever the PIRT is used, none of the projections should cover the entire support region of the solution in the image space.

Figure 28:
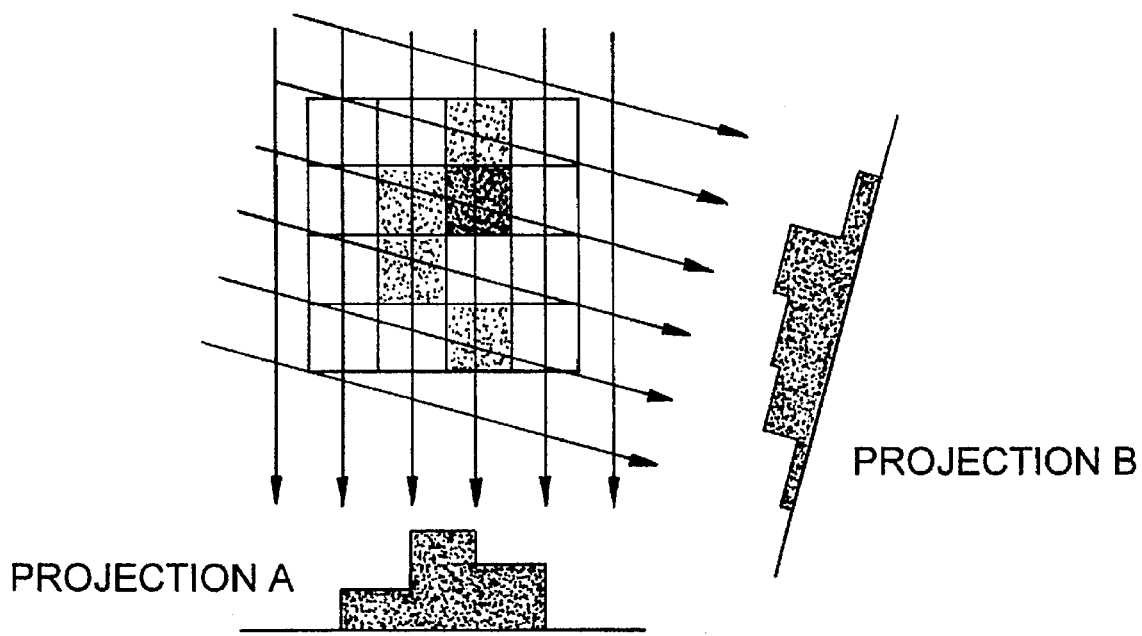
FIG. 28 depicts projection A and B covering the entire region of solution X.

In the case where M≦N for an M×N matrix A, , a set of projections should be chosen so that all columns of the matrix A are linearly independent in order to avoid having an indeterminate system. It can be shown that, if any two projections cover the entire support region of the solution x on the image plane as shown in FIG. 28, then the columns of A will become linearly dependent. The system then becomes indeterminate.

For an M×N matrix A, M≦N, if a row of A can be expressed as a linear combination of other rows of A, i.e. for any $\alpha_i \in \Re$ $$\hat{a}_p^T = \sum_{i \neq p} \alpha_i \hat{a}_i^T \quad (54)$$

where $\hat{a}_i^T$ is the $i^{th}$ row of A, i, p ∈ {1,2, ... N}
then the system is undeterminate.

If we assume that there are projections at angle $\theta_p$ and $\theta_q$ which cover the entire support region of the variable vector x on the image plane, then both projections have the same total mass, i.e.

$$\sum_{i_p \in S_p} \hat{a}_{i_p}^T \cdot x = \sum_{i \in S_q} \hat{a}_{i_q} \cdot x = \sum_{j=1}^{N} x \quad (55)$$

where $S_p$ and $S_q$ denote sets of indices of ray-sums corresponding to the projections at $\theta_p$ and $\theta_q$ respectively.
Then Therefore, the system is indeterminate since $\hat{a}_p^T$ is a linear combination of the other rows of A.

Figure 29:
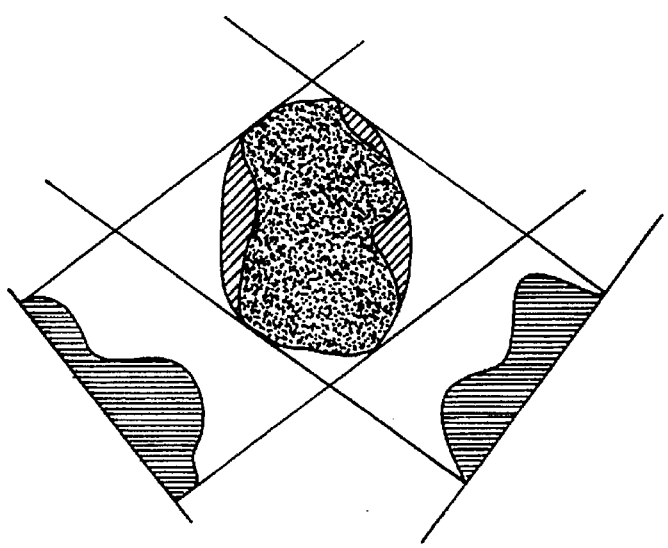
FIG. 29 depicts a convex support region constrained by support regions of projections.

If the solution x is constrained to be strictly in the convex support region on the image plane, defined by $$\hat{a}_p^T \cdot x = \left[ \sum_{i \notin S_q} \hat{a}_i^T - \sum_{i_p \neq p} \hat{a}_{i_p}^T \atop i_p \in S_p \right] \cdot x \quad (56)$$

and $$\hat{a}_p^T = \sum_{\substack{i \neq p \\ i \in S_p \cup S_q}} \hat{a}_i^T$$

the support regions of projections as shown in FIG. 29, then the system becomes undetermined. This is a consequence of the fact that every projection covers the entire support region of the solution x. In this case, constraints on the support region of solutions need to be somehow relaxed in order to prevent divergence of the state vector, t.

Conjugate Gradient Acceleration of SIRT & PIRT

The conjugate gradient method has been extensively used as an acceleration technique for solving linear systems. Unlike other iterative methods which may involve an infinite number of iterations, the conjugate gradient method, computes the exact solution in a finite number of iterations. However, the convergence is guaranteed only when the system is symmetric and positive definite.

Consider the problem where we wish to minimize a quadratic function $$F(x) = \frac{1}{2} x^T A x - b^T x \quad (57)$$

The gradient of F(x) is $$r(x) = \frac{\partial F(x)}{\partial x} = Ax - b \quad (58)$$

where, r(x) is also the residual of A x−b. When r(x) is zero, then the corresponding x is the solution of the linear system A x=b.

The conjugate gradient method of solving the equation A x=b involves the use of following iterative procedure $$p_k \leftarrow A d_k \quad (59)$$

$$\alpha_x = \frac{d_k^T r_k}{p_k^T d_k} \text{ or } \frac{r_k^T r_k}{d_k^T p_k} \quad (60)$$

$$x_{k+1} \leftarrow x_k + \alpha_k d_k \quad (61)$$
$$r_{k+1} \leftarrow r_k - \alpha_k p_k \quad (62)$$

$$\beta_k = \frac{-p_k^T r_{k+1}}{p_k^T d_k} \text{ or } \frac{r_{k+1}^T r_{k+1}}{r_k^T r_k} \quad (63)$$

$$d_{k+1} \leftarrow r_{k+1} + \beta_k d_k \quad (64)$$

The initial values can be chosen as $x_0=0$, $d_0=b$ and $r_0=b$. In the iterative procedure, $p_k$ and $\alpha_k$ are the descent direction and descent step respectively, $d_k$ and $\beta_k$ represent the search direction and the search step.

In the iterative procedure described by eqs. 59 to 64, the search direction $d_k$ is conjugate to all the previous search directions, i.e.

$$d_{k+1}^T A d_i = 0, \ i = 0, \ldots, k. \quad (65)$$

This is accomplished by choosing the search direction step size $\beta_k$ such that $$d_{k+1}^T A d_k = 0, \text{ for all } k. \quad (66)$$

Eq. 63 is derived by substituting eqs. 64, 63, 62, 60 and 59 into eq. 66. $\alpha_k$ represents the optimum step size in the linear search. The update equation, eq. 60, is derived from $$\frac{\partial F(x_{k+1})}{\partial \alpha_k} = 0 \quad (67)$$

where the function, F(x), is defined in eq. 57.

Figure 30:
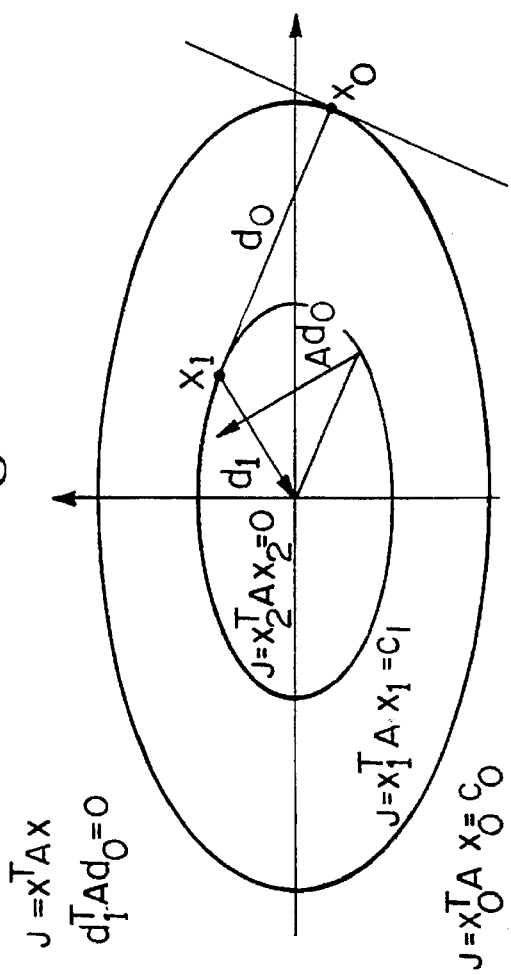
FIG. 30 depicts a conjugate gradient method converging in N steps.
Figure 31:
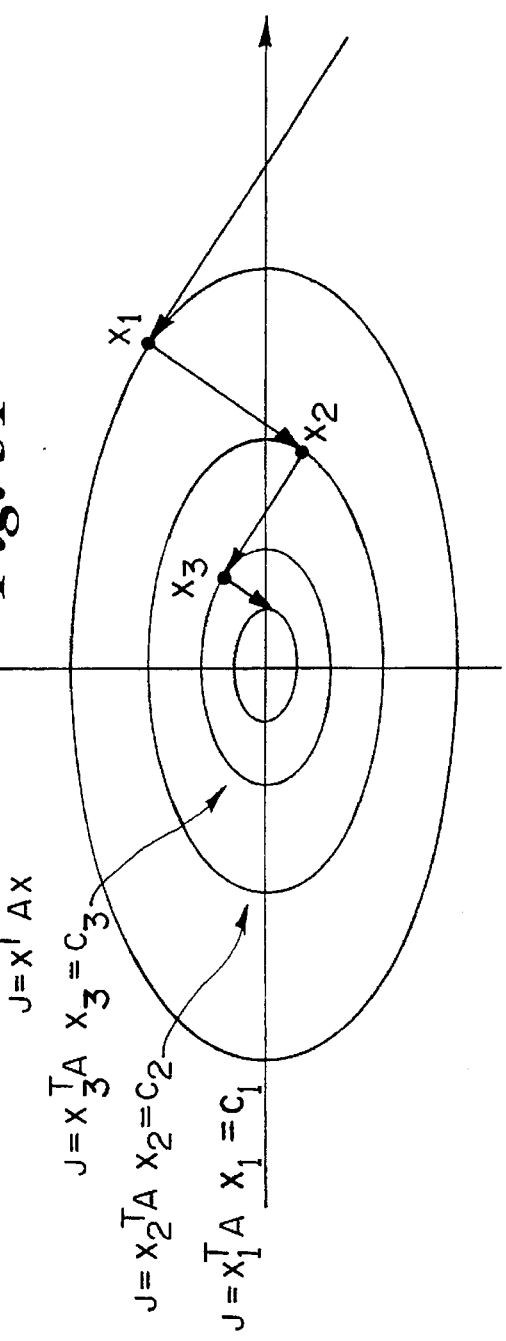
FIG. 31 depicts a steepest descend method converging in an infinite number of steps.

Since, all the search directions are conjugate to all previous search directions, the minimization along a given direction implies a minimization along all previous search directions also. Hence, for an N dimension problem, only N steps are needed to arrive at the solution provided there is no numerical error. If the system has M distinct eigenvalues, the conjugate gradient method converges in M steps rather than N steps. Examples of a two dimensional case are given in FIGS. 30 and 31. In the example, the conjugate gradient method arrives at the solution in at most two steps whereas the steepest descend method requires an infinite number of steps.

In order to guarantee the convergence of the conjugate gradient method, the matrix A has to be symmetric and positive definite. Otherwise, the relations given by eqs. 58, 65, 66 and 67 may not be valid.

When a system is overdetermined, the matrix $[A A^T]$ in eq. 13 is symmetric and positive definite. Hence, the convergence of the conjugate gradient method is guaranteed. In this case, the descent direction $p_k$ in eq. 59 is updated by $$p_k \leftarrow A^T A d_k \quad (68)$$

Then the iterative procedure is $$p_k \leftarrow A^T A d_k \quad (69)$$

$$\alpha_x = \frac{d_k^T r_k}{p_k^T d_k} \text{ or } \frac{r_k^T r_k}{d_k^T p_k}$$

$$x_{k+1} \leftarrow x_k + \alpha_k d_k$$
$$r_{k+1} \leftarrow r_k - \alpha_k p_k$$

$$\beta_k = \frac{-p_k^T r_{k+1}}{p_k^T d_k} \text{ or } \frac{r_{k+1}^T r_{k+1}}{r_k^T r_k}$$

$$d_{k+1} \leftarrow r_{k+1} + \beta_k d_k$$

The corresponding initial values can be chosen as $x_0=0$ and $d_0=r_0=A^T b$. Eq. 69 is the commonly used SIRT-CG type algorithm in image reconstruction.

When a system is underdetermined, the matrix $[A A^T]$ in eq. 33 is symmetric and positive definite. The convergence of the conjugate gradient method is, once again, guaranteed. In this case, eq. 59 is replaced by $$p_k \leftarrow A A^T d_k \quad (70)$$

The state vector can be solved using the following procedure $$p_k \leftarrow A A^T d_k \quad (71)$$

$$\alpha_x = \frac{d_k^T r_k}{p_k^T d_k} \text{ or } \frac{r_k^T r_k}{d_k^T p_k}$$

$$t_{k+1} \leftarrow t_k + \alpha_k d_k$$
$$r_{k+1} \leftarrow r_k - \alpha_k p_k$$

$$\beta_k = \frac{-p_k^T r_{k+1}}{p_k^T d_k} \text{ or } \frac{r_{k+1}^T r_{k+1}}{r_k^T r_k}$$

-continued $$d_{k+1} \leftarrow r_{k+1} + \beta_k d_k$$

where the corresponding initial values can be chosen as $t_0=0$, $d_0=b$ and $r_0=b$ and the final solution is $x=A^T$ t. Eq. 71 represents the PIRT-CG algorithm for tomographic image reconstruction. It can also be solved without building up the state vector $$p_k \leftarrow AA^T d_k \tag{72}$$

$$\alpha_x = \frac{d_k^T r_k}{p_k^T d_k} \text{ or } \frac{r_k^T r_k}{d_k^T p_k}$$

$$x_{k+1} \leftarrow x_k + \alpha_k A^T d_k$$
$$r_{k+1} \leftarrow r_k - \alpha_k p_k$$

$$\beta_k = \frac{-p_k^T r_{k+1}}{p_k^T d_k} \text{ or } \frac{r_{k+1}^T r_{k+1}}{r_k^T r_k}$$

$$d_{k+1} \leftarrow r_{k+1} + \beta_k d_k$$

where the corresponding initial values can be chosen as $x_0=0$, $d_0=b$ and $r_0=b$. The iterative procedure expressed in eq. 72 is similar to the algorithm used for solving unsymmetric systems.

For large and sparse systems, it is difficult to obtain the matrix-matrix product $[A^T A]$ or $[A A^T]$. In this case, the conjugate gradient method can be used directly on the matrices A and $A^T$ sequentially using matrix-vector-multiplications as shown in eq. 69.

In the case of tomographic image reconstruction, the SIRT-CG algorithm was developed as an alternative to SIRT in order to improve convergence for both overdetermined and underdetermined systems.

When a system is overdetermined, the matrix $[A^T A]$ is symmetric and positive definite. Hence, the conjugate gradient method can be applied in conjunction with the SIRT type algorithm with guaranteed convergence. Unfortunately, when the system is underdetermined, the matrix $[A^T A]$ associated with the SIRT is not positive definite anymore. Hence, the acceleration technique does not lead to convergence if any errors are accumulated during the iterative process. However, with the PIRT type algorithm, the state space matrix $[A A^T]$ is symmetric and positive definite when the system is underdetermined. Consequently, the PIRT-CG methods can be applied for solving underdetermined systems. Convergence of such algorithms is then guaranteed even if explicit constraints are not applied.

Since the residual in the algorithm expressed in eqs. 69, 71 or 72 is calculated recursively instead of obtaining from the current state $t(k)$ (or $x(k)$) and the original input b, decoupling between the system and the original input can be caused by numerical errors or noise associated with optoelectronic devices. In order to avoid the decoupling, the residual $r_{k+1}$ can be updated using the true residual, $[b-A x_{k+1}]$, instead of using the recursive approach. The PIRT-CG algorithm can be rewritten as follows $$p_k \leftarrow [A A^T] d_k$$

$$\alpha_k = r_k^T r_k / d_k^T p_k$$

$$t_{k+1} \leftarrow t_k + \alpha_k d_k$$

$$x_{k+1} \leftarrow A^T t_{k+1} \tag{73}$$

$$r_{k+1} \leftarrow b - A x_{k+1}$$

$$\beta_k = r_{k+1}^T r_{k+1} / r_k^T r_k$$

$$d_{k+1} \leftarrow r_{k+1} + \beta_k d_k$$

where $t_0=0$, $d_0=b$ and $r_0=b$.

The matrix-vector-multiplications associated with the PIRT-CG can be performed using optical projections. This allows implementation of the algorithm using a high speed optoelectronic structure. Implementation details are presented in the next section.

The algorithm of eq. 42 can also be expressed in terms of projections from different angles:

repeat $x_{old} \leftarrow x_{new}$ $x_{new} \leftarrow 0$ for q=1 to np do $$t_q \leftarrow t_q + \alpha [b_q - A_q x_{old})] \tag{74}$$

$$x_{new} \leftarrow x_{new} + \beta A_q^T t_q$$

end of for
until done where $t_q$, $A_q^T$, $b_q$ and $A_q$ are submatrices or subvectors of t, $A^T$, b and A respectively corresponding to the $q^{th}$ angle. The total number of projections from all measured angles is represented by np.

Implementation of PIRT

Figure 32:
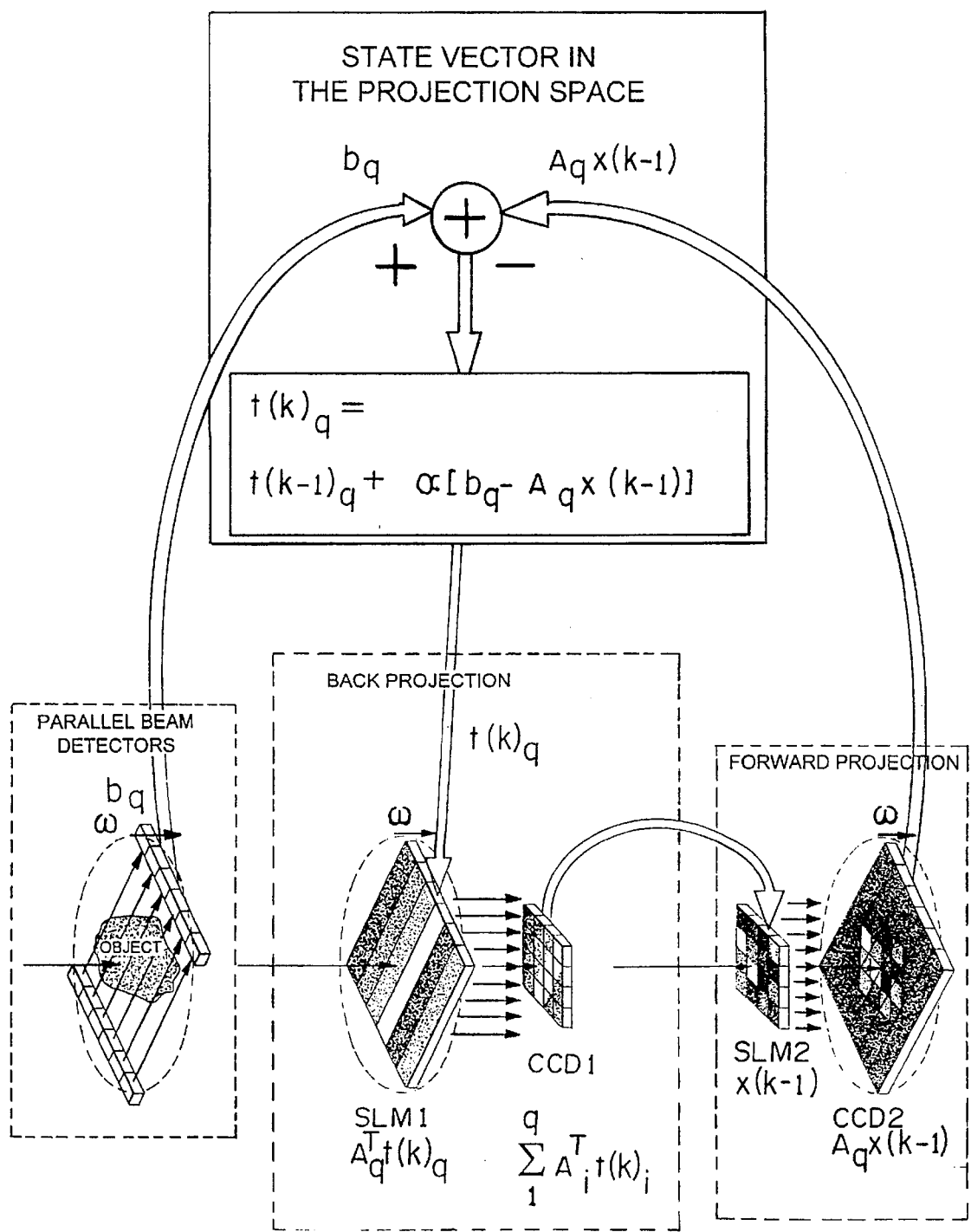
FIG. 32 depicts an optoelectronic structure for the PIRT.
Figure 33A:
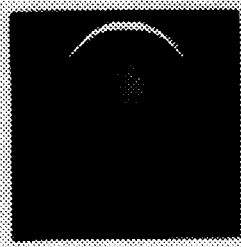
FIGS. 33$a$–$d$ depict reconstructed images using PIRT at the $8^{th}$, $16^{th}$, $32^{nd}$, and $64^{th}$ iterations, respectively.
Figure 33B:
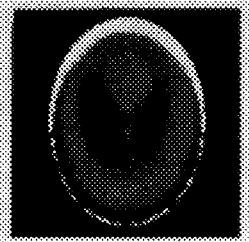
Figure 33C:
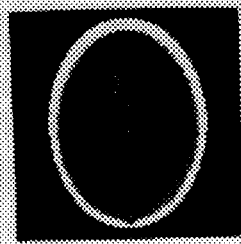
Figure 33D:
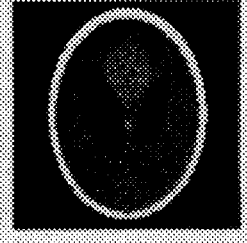

The proposed optoelectronic system for implementing a PIRT underdetermined system is shown in FIG. 32. The structure is similar to that for the SIRT shown in FIG. 14. The implementation of the forward and back projection operations were explained hereinbefore. The complexity of operations is about the same as SIRT but extra storage is needed for the state vector t in the projection space. In addition, the iterations are not carried out in the image space. Instead, a new image is reconstructed using only the updated state vector in the projection space.

The iterative procedure which can be implemented using the structure shown in FIG. 32 can be described as follows:
procedure
constant $b_q$: q=1 to np, measured projection at the $q^{th}$ angle;
variable $t_q$: q=1 to np, state vector at the $q^{th}$ angle;

$x_{new}$: in CCD1, reconstructed image;

$x_{old}$: in SLM2, reconstructed image from the previous iteration;

1. Update $x_{old}$ in SLM2 with $x_{new}$ in CCD1; reset $x_{new}$ in CCD1 to 0;
2. for q=1 to np do
3. Rotate to $\theta_q$;
4. Forward project $x_{old}$, the reconstructed image from the 2-D array SLM2 into the 1-D array CCD2, thereby generating $[A_q x_{old}]$.
5. Update $t_q$ by $\{t_q + [b_q - A_q x_{old}]\}$; load $t_q$ into the 1-D array SLM1;
6. Back project the state vector in the 1-D SLM1 into the 2-D CCD1. The result in CCD1 is a superimposed set of back projections:

$$\sum_{i=1}^{q} A_i^T t_i$$

7. end of for
8. end of the iteration.

The conjugate gradient method can also be implemented using the structure shown in FIG. 32. In the accelerated algorithm described by eq. 73, there are two matrix-vectormultiplications associated with the matrix $[AA^T]$. Using the optoelectronic structure, these matrix-vector-multiplications are performed by passing the vectors d and t through the back projection and the forward projection operators separately. The reconstructed image is obtained without additional cost since the output vector x represents the intermediate result obtained after back projecting t. The rest of the calculations in the algorithm are simple vector-vector or scalar operations and therefore, do not require any special structures.

The simulation results presented in this section are in agreement with the analytical properties with respect to PIRT. The performance of the PIRT has been verified in respect of convergence properties both for the basic as well as the modified version employing the conjugate gradient algorithm.

Figure 34:
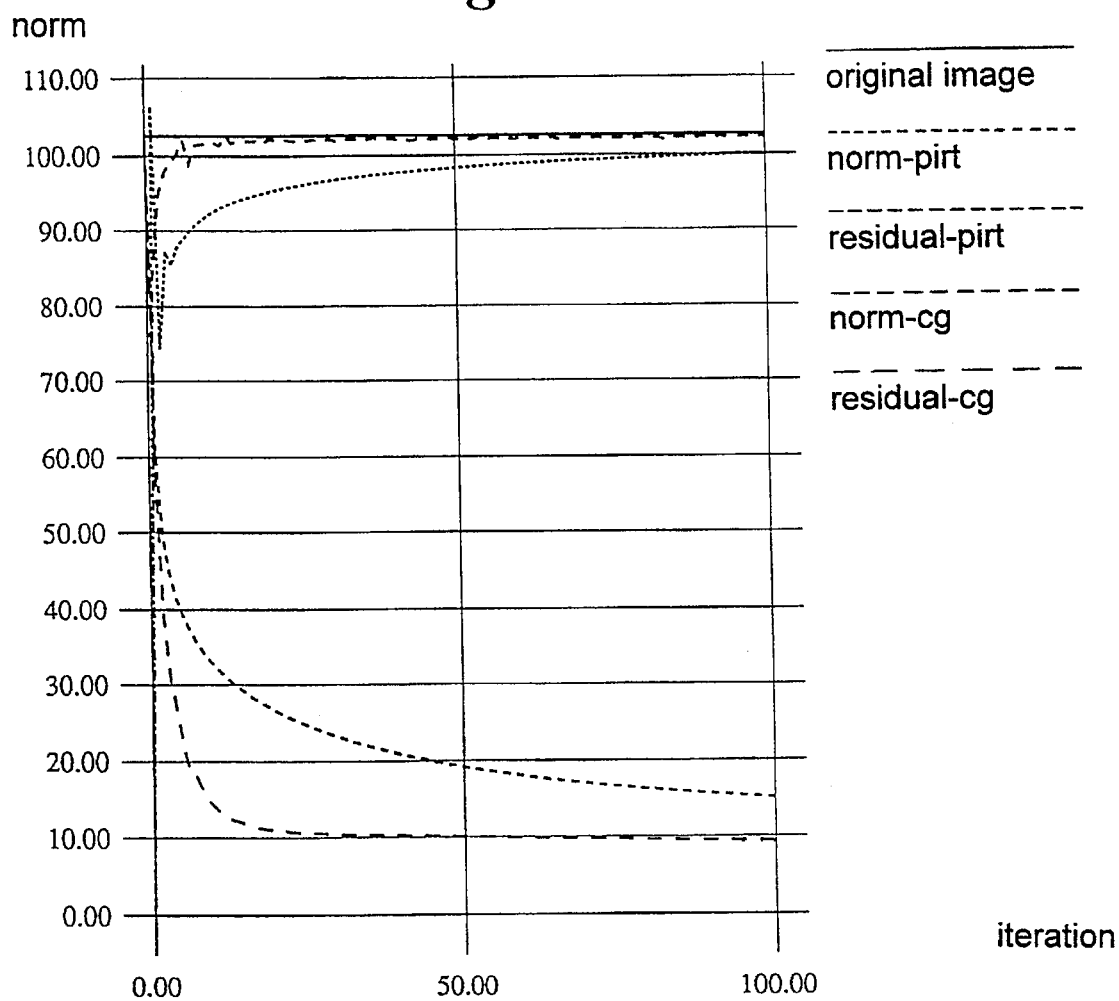
FIG. 34 depicts a plot of residuals of reconstructed images using the original phantom using PIRT and CG-PIRT.
Figure 35A:
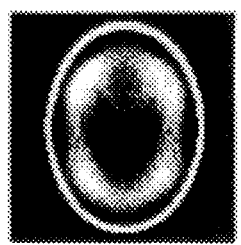
FIGS. 35$a$–$d$ depict reconstructed images using the PIRT-CG at the $8^{th}$, $16^{th}$, $32^{nd}$, and $64^{th}$ iterations, respectively.
Figure 35B:
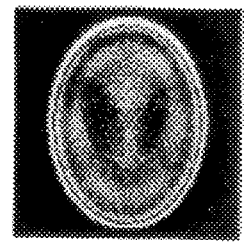
Figure 35C:
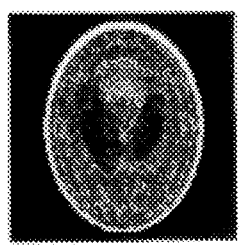
Figure 35D:
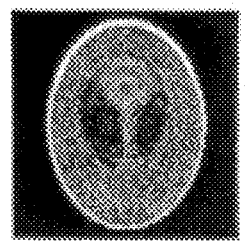
Figure 36A:
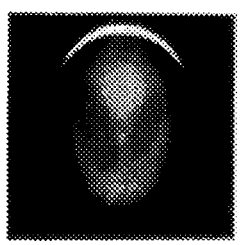
FIGS. 36$a$–$d$ depict reconstructed images using PIRT with additive noise at the $16^{th}$, $32^{nd}$, $64^{th}$ and $512^{th}$ iterations, respectively.
Figure 36B:
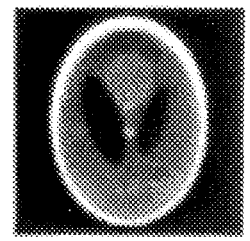
Figure 36C:
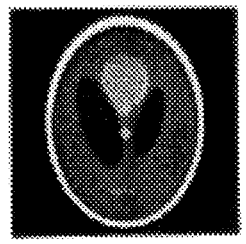
Figure 36D:
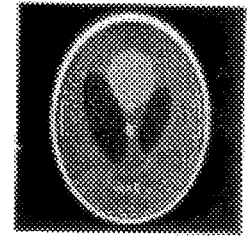

FIGS. 33a–d show the reconstructed image obtained using the basic PIRT while FIG. 34 presents plots of Euclidian norms of the image and the residual as a function of the number of iterations. The residual is the distance between the reconstructed image and the original image. The reconstructed images are 128×128 and consequently N=16, 384. The number of projections are 120 and there are 121 ray-sums in each projection. Therefore, M=14,520. The ratio of M to N for the underdetermined system is 0.886. In order to study the convergence characteristics, constraints have not been imposed.

FIG. 35 and FIG. 34 show results obtained using the conjugate gradient method. FIGS. 35a–d show the reconstructed image while FIG. 34 gives the plots of the Euclidian norms of the solution and the residual as a function of the number of iterations. The corresponding values of the original images, the reconstructed images and the residuals obtained using the two methods are listed in Table 4. The images reconstructed using the basic PIRT are relatively smooth compared to those obtained using the conjugate gradient method. However, the residual of the conjugate gradient method at the $8^{th}$ iteration (16.06363) is approximately the same as that obtained using the basic method at the $82^{th}$ iteration (16.07527). The residual obtained using the basic PIRT at the $8^{th}$ iteration is 34.65206.

guarantees that the solution converges to the unique minimum-norm solution in the image space. With a priori information, this algorithm minimizes the Euclidian distance between the reconstructed image and the initial image in the image space. When constraints are applied and the minimum-norm solution is outside the constraint boundary, the solution converges to a unique minimum-norm solution in the reduced solution space. It also allows the application of acceleration techniques, such as conjugate gradient method, directly to the underdetermined system without the need for imposing explicit constraints.

When the system is underdetermined, the PIRT guarantees convergence in contrast to the SIRT which fails to converge.

Iterative Filtered Back Projection—IFBP

In this section, the Iterative Filtered Back Projection (IFBP) technique is presented. This algorithm is based on the strategy of iteratively applying the Filtered Back Projection (FBP) method to approach the weighted minimum least square error in the frequency domain. In addition, a scheme for implementing the system using optoelectronic devices is given.

The Filtered Back Projection (FBP) is considered as a direct method for tomographic image reconstruction. The FBP and the corresponding convolution algorithms are commonly used in medical and industrial applications because of their lower computational demands. In some situations, reconstructed images can be distorted due to several factors, such as those introduced by aliasing from undersampling, finite filter bandwidth, limited views of projections, finite dynamic range of optoelectronic devices, and especially, speckle noise associated with optical transforms. The iterative approach introduced in this section can be used to improve the quality of reconstructed images by applying error corrections repeatedly. It will be shown that the errors introduced by the FBP procedures can be minimized in terms of the weighted mean square error in the frequency domain. Although FBP procedures can be considered as a method for estimating the inverse of the Radon transform, the accuracy is poor when the inverse is obtained using

TABLE 4

Residuals of Reconstructed Images Using PIRT and PIRT-CG.

| algorithm | iteration | | | | | | | | |
|---|---|---|---|---|---|---|---|---|---|
| | 0 | 1 | 2 | 4 | 8 | 16 | 32 | 64 | 82 |
| PIRT | 102.54 | 61.16 | 49.68 | 41.57 | 34.62 | 28.40 | 22.53 | 17.54 | 16.08 |
| PIRT-CG | 102.54 | 57.32 | 38.97 | 26.51 | 16.06 | 11.41 | 10.35 | 9.80 | 9.58 |

In this simulation, the system is severely underdetermined. The dimensions of the reconstructed image are 256×256. The number of projections are 120 and there are 121 ray-sums in each projection. Therefore, the ratio of the M to N is 0.222 where M and N are dimensions of the matrix A in eq. 42. Uniformly distributed noise in the range of −0.5 to +0.5 is added to the reconstructed image after each iteration. The resulting SNR is 48.27 dB. FIGS. 36a–d show clearly that the PIRT converges monotonously even with the additive noise. In contrast, the SIRT algorithm fails to converge as shown in FIG. 25.

The tomographic image reconstruction algorithm—PIRT is obviously superior to SIRT in respect of its convergence properties for underdetermined systems. This algorithm optical transforms. However, optical transforms can be used to accelerate the iterative reconstruction procedure based on the method proposed hereinbefore.

The IFBP method is presented after a brief review of the FBP. The properties of the optical Fourier Transform are described first. An optoelectronic complementary filter structure is then introduced, where the bipolar radius filter of the FBP is implemented using a low pass optical complementary filter. The optoelectronic implementation of the IFBP is presented and simulation results are given.

The Fourier Slice Theorem can be stated as follows: The Fourier transform of a parallel projection of an image f(x,y) taken at angle θ is equal to the 1-D slice of the two-dimensional transform, F(u, v), subtending an angle θ with the u-axis. In other words, the Fourier transform of P(θ,ρ) is identically equal to F(u, v) along the axis u' in FIG. 37.

Figure 37A:
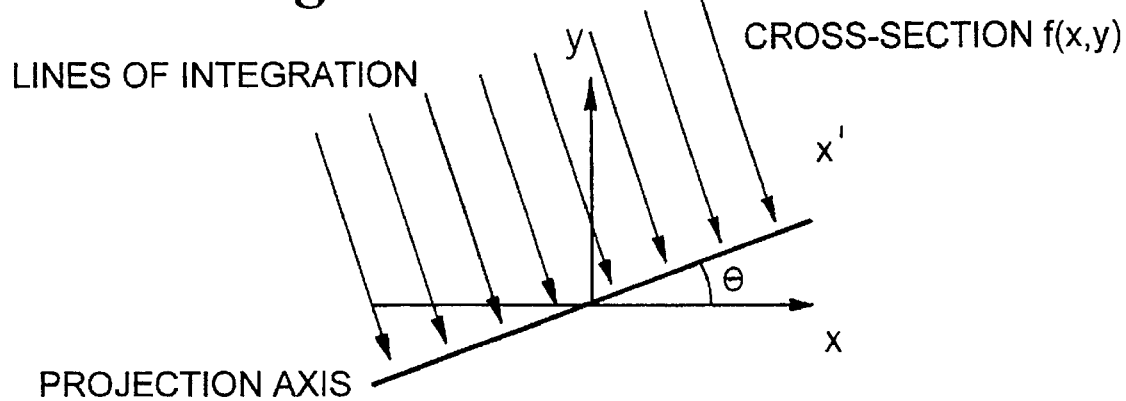
FIG. 37$a$ depicts a projection taken on a x–y plane of a cross-sectional image by line integration in a direction perpendicular to the x' axis and FIG. 37$b$ depicts the Fourier transform of the projection of FIG. 37$a$.
Figure 37B:
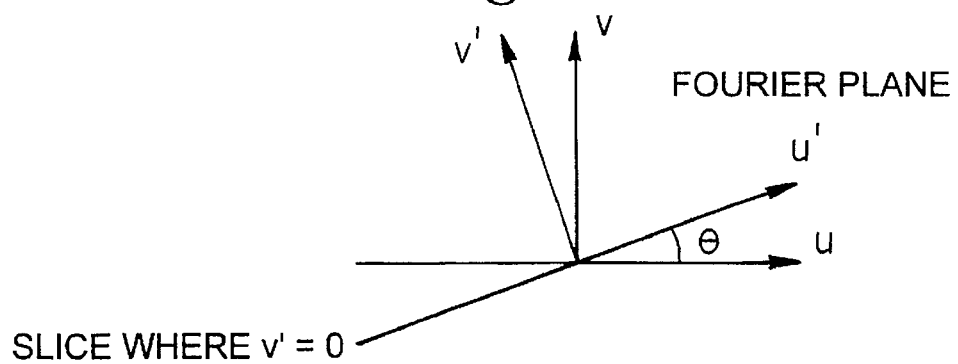

In FIG. 37a, a projection is taken on the x–y plane of a cross-sectional image by line integrating f(x, y) in a direction perpendicular to the x' axis where the angle between the x' axis and the x axis is θ. As shown in FIG. 37b, the Fourier Transform of this projection can be obtained by computing F(x, y) along u' where the angle between axis u' and axis u is also θ. Consequently, the entire frequency plane can be established by taking projections at various values of θ from 0 to π and then transferring the information into the frequency domain.

A cross-sectional image can be reconstructed using the 2-D Inverse Fourier Transform to map the information from the u–v plane to the x–y plane as shown in eq. 75. When the Inverse Fourier Transform is expressed in a polar raster coordinate system, an additional term, ρ representing the radius in the frequency plane, is introduced in the integral. Since the integrations are separable, the first integration within the brackets is equivalent to the filtering at a given angle θ using a filter whose kernel is $|\rho|$.

$$f(x,y) = \int_{-\infty}^{\infty} \int_{-\infty}^{\infty} F(u,v) e^{j2\pi(ux+vy)} du dv \quad (75)$$

$$= \int_{0}^{2\pi} \int_{0}^{\infty} P(\theta,\rho) e^{j2\pi(x\rho\cos\theta+y\rho\sin\theta)} \rho d\rho d\theta$$

$$= \int_{0}^{\pi} \left\{ \int_{-\infty}^{\infty} P(\theta,\rho)|\rho| e^{j2\pi\rho r} d\rho \right\} d\theta$$

$$= \int_{0}^{\pi} Q(\theta,r) d\theta$$

where r=x cos θ+y sin θ, (θ, ρ) and (θ, r) are the radii and the angles along the polar raster scans corresponding to the u–v and x–y planes respectively. In eq. 75, f(x, y) is the value of the image at the coordinate (x, y). F(u, v) is the Fourier representation of f(x, y) on the u–v plane. P(θ, ρ) is the Fourier presentation of a projection at angle θ and radius ρ, and is equal to F(u, v) on the θ–ρ plane. Q(θ, r) is the filtered projection on the θ–r plane. As shown in eq. 75, the filtered back projection Q(θ, r) at a given θ can be obtained by computing only the 1-D Fourier Transform and filtering it using a 1-D filter kernel shown in FIG. 38.

The representation of eq. 75 in discrete form is the Filtered Back Projection (FBP) method which can be expressed as $$x(i_1, i_2) = \sum_{\theta=0}^{\pi} \sum_{\rho=-\rho_0}^{\rho_0} P(\theta,\rho)|\rho| e^{j2\pi\rho r} \quad (76)$$

$$= \sum_{\theta=0}^{\pi} Q(\theta,r)$$

where r=i₁ cos θ+i₂ sin θ, i₁ and i₂ are coordinates in the discrete image plane, and x(i₁, i₂) represents the grey level of the (i₁, i₂)$^{th}$ pixel. In eq. 76, the 1-D filtering operation can be performed separately and then overlapped into the image plane. Since all the indices in eq. 76 are in the discrete form, interpolations are usually used.

It has been shown in FIG. 10 that projections can also be represented by means of weighting factor w(i, j)'s which are the fractional areas intercepted by ray-sums of projections and pixels of the image. Therefore, the discrete form of the filtered back projection method of eq. 76 can also be expressed in terms of the back projection matrix, $A^T$. Using linear operator matrices, the FBP procedure can be expressed as $$x = \sum_{q=1}^{np} A_q^T F_{INV\_q} R_q F_q \hat{b}_q \quad (77)$$

$$= A^T F_{INV} R F b$$

where, the matrix $A^T$ is the back projection operator matrix, the vector b contains the measured projections, the matrices F and $F_{INV}$ are linear operators representing Fourier and Inverse Fourier Transform operations respectively, the diagonal matrix R is the kernel of the radius filter and np is the total number of projections. The matrices and vectors with the subscript q correspond to the $q^{th}$ projection angle.

Figure 39:
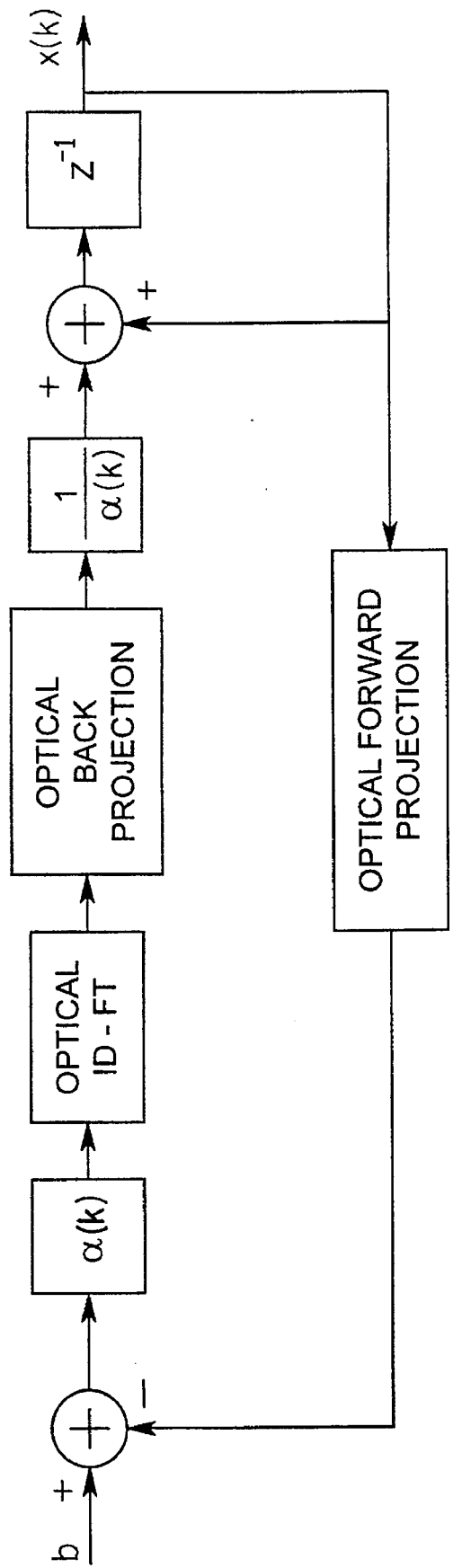
FIG. 39 depicts a block diagram of an iterative filtered back projection (IFBP)

When the system is overdetermined, the FBP procedure in eq. 77 can be used iteratively to minimize the square errors in the frequency domain. An iterative procedure based on the basic Richardson (RF) method is given by the following difference equation $$x(k) = x(k-1) + \alpha A^T F_{INV} R F [b - A x(k-1)] \quad (78)$$

where k is the index of iterations, α is the relaxation factor, matrices A and $A^T$ are the forward projection operator matrix and back projection operator matrix as defined in eqs. 9 and 11. FIG. 39 shows the block diagram for the iterative filtered back projection algorithm.

The IFBP expressed in eq. 78 can be considered as a time-invariant linear multi-variable feedback system with step input. The reconstructed image is the steady-state output which can be found using the z-transform and invoking the final value theorem. Using z-transforms, the difference equation in eq. 78 can be written as $$x[z] = x[z]z^{-1} + \alpha A^T F_{INV} R F [b[z] - Ax[z]z^{-1}] \quad (79)$$

$$= [I - [I - \alpha A^T F_{INV} R F A]z^{-1}] \alpha A^T F_{INV} R F b \frac{z^{-1}}{1-z^{-1}}$$

Obviously, when the matrix $[A^T F_{INV} R F A]$ is non-singular and α is chosen such that all eigenvalues of $[I-\alpha A^T F_{INV} R F A]$ are within the unit circle, eq. 79 converges to $$\lim_{k \to \infty} x(k) = \lim_{z \to 1} x[z] \frac{1-z^{-1}}{z^{-1}} \quad (80)$$

$$= [A^T F_{INV} R F A]^{-1} A^T F_{INV} R F b$$

Since the Inverse Fourier Transform matrix $F_{INV}$ is the conjugate transpose of the Fourier Transform matrix F, i.e., $F_{INV}=F^*$, and the diagonal matrix R can be decomposed as $R=(R)^T R$, the algorithm minimizes $$\|R^{\frac{1}{2}} FAx - R^{\frac{1}{2}} Fb\|_2 = \|(R^{\frac{1}{2}} F)(Ax - b)\|_2 \quad (81)$$

where $\|.\|_2$ denotes the Euclidean norm of a vector. Eq. 81 shows that the solution of IFBP is obtained by minimizing the least square error of the filtered projections in the frequency domain with a square root radius filter.

Figure 38:
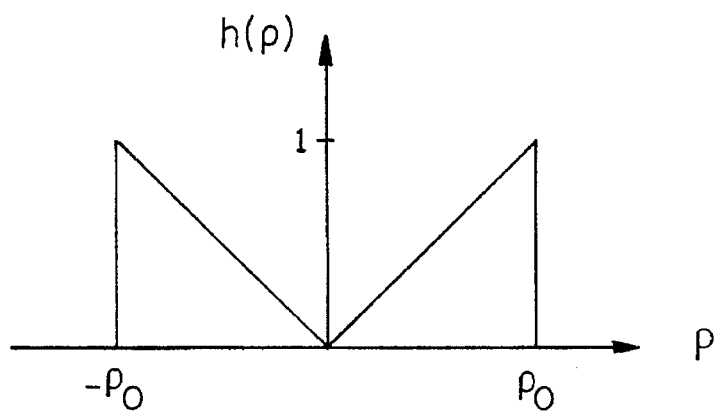
FIG. 38 depicts a spatial frequency response of a radius filter.

The diagonal matrix R in eq. 78 represent the radius filter kernel as shown in FIG. 38. Unfortunately, the zero and near zero values in the radius filter operator matrix, reduce the rank of the system. For an M×N system Ax=b, where M and N are the column and row dimensions of the matrix A respectively, the dimensions of R are M×M. When the number of nonzero entries in the diagonal matrix R is less than N, the system is singular and convergence is not guaranteed. In order to have enough nonzero entries in R, the system has to be overdetermined, i.e., the number of projection data should be larger than the number of pixels in the reconstructed image.

As described hereinafter, the conjugate gradient method can be used as an acceleration technique for solving overdetermined and underdetermined systems. When the system is not singular, the matrix $[A^T F^T(R)^T R \, FA]$ in the IFBP method is positive and symmetric definite. Therefore, the convergence of the IFBP can be accelerated using the conjugate gradient method. A unique solution is guaranteed.

Optical Fourier Transform Using a Two Lens System

In this section, the optical Fourier Transform using a two lens system is briefly described. An optical complementary filtering structure implementing the radius filter of the FBP is then introduced.

Figure 40:
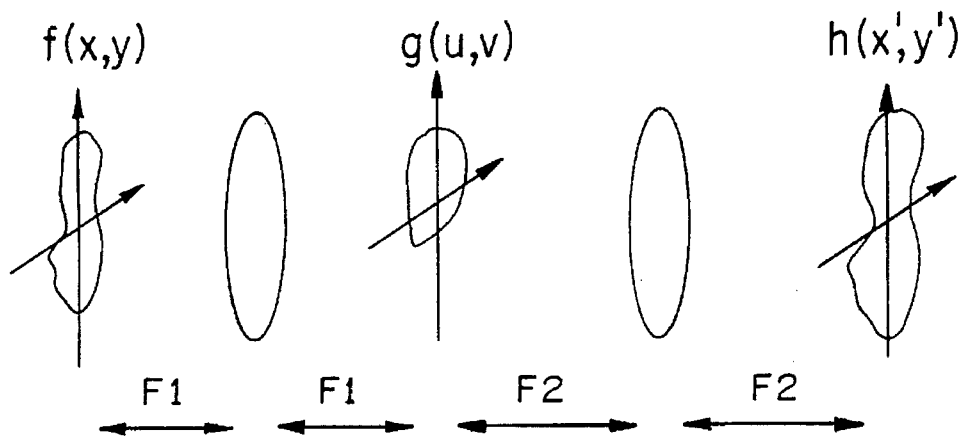
FIG. 40 depicts a two lens system implementing a two dimensional Fourier transform spatial filter.

Consider a two lens coherent optical system as shown in FIG. 40, where $F_1$ and $F_2$ are the focal lengths of the lenses respectively. If an image, $f(x, y)$, is placed at the front focal plane of the first lens, its Fourier Transform in the spatial frequency domain, $g(u,v)$, is obtained at the back focal plane:

$$g(u,v) = \frac{c_1}{F_1} \iint f(x,y) e^{-j2\pi \frac{xu+yv}{\lambda F_1}} dx dy \qquad (82)$$

$$= \frac{c_1}{F_1} F\left\{ \frac{u}{\pi F_1}, \frac{v}{\pi F_1} \right\}$$

where $c_1$ is a constant and $l$ is the wave length of the monochromatic light. The image at the back focal plane of the second lens is a "flipped" Inverse Fourier Transform of $g(u,v)$:

$$h(x',y') = \frac{c_2}{F_2} \iint g(u,v) e^{-j2\pi \frac{x'u+y'v}{\lambda F_2}} du dv \qquad (83)$$

$$= c_3 \frac{F_1}{F_2} \iint F\left\{ \frac{u}{\lambda F_1}, \frac{v}{\lambda F_1} \right\} e^{j2\pi[(-x'\frac{F_1}{F_2})(\frac{u}{\lambda F_1}) + (-y'\frac{F_1}{F_2})(\frac{v}{\lambda F_1})]} d\frac{u}{\lambda F_1} d\frac{v}{\lambda F_1}$$

$$= c_3 \frac{F_1}{F_2} f\left( -\frac{F_1}{F_2} x', -\frac{F_1}{F_2} y' \right)$$

where $c_2$ and $c_3$ are constants and $F_2/F_1$ is the magnification coefficient.

If a spatial frequency mask is placed between the back focal plane of the first lens and the front focal plane of the second lens, $h(x', y')$ represents a filtered version of the original image.

In coherent optical systems, the representations of $f(x, y)$, $g(u, v)$, $h(x', y')$ and the filter mask are in terms of the magnitude of the light. In contrast, in an incoherent optical system, the intensity is used instead of the magnitude. In optical information processing, coherent optical Fourier filtering usually suffers from speckle noise caused by the granularity of imaging devices and dust. This is considered to be one of the major obstacles in optoelectronic implementations of tomography.

Figure 41:
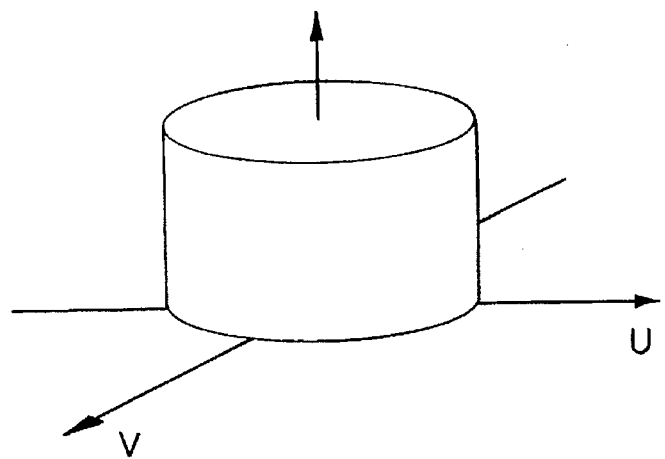
FIG. 41 depicts a frequency response of the coherent transfer function for a circular aperture.

The finite passband in the Coherent Transfer Function (CTF), within which the coherent imaging system exists, passes all frequency components without amplitude and phase distortion. At the boundary of this pass band, the frequency response drops to zero, implying that the frequency components outside the passband are completely attenuated. The frequency response of a circular aperture is shown in FIG. 41. The cutoff frequency in terms of the image spatial frequency is $$\rho_0 = \frac{D}{2\lambda F} \qquad (84)$$

where D is the diameter of the aperture.

For incoherent optical systems, the spatial frequency spectrum of the image can be obtained by applying the complex weighting factor $H(\rho)$ to the spatial frequency spectrum of the object intensity. The function $H(\rho)$ is known as the optical transfer function (OTF) and the modulus $|H|$ is the modulation transfer function (MTF).

Figure 42:
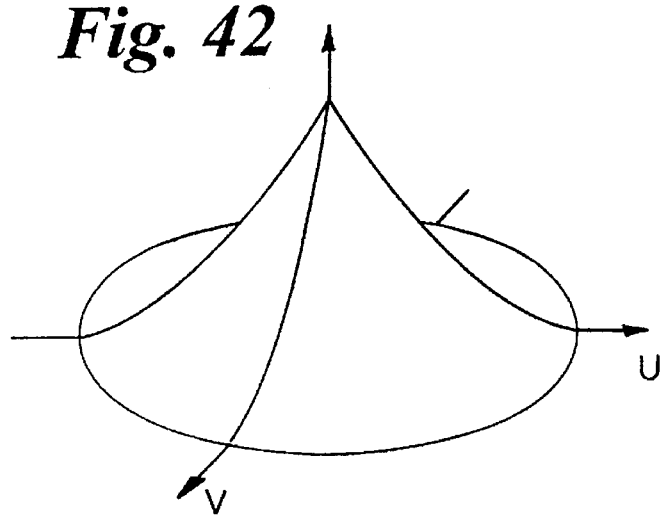
FIG. 42 depicts a frequency response of the optical transfer function for a circular aperture.

The OTF for the aberration-free lens system of a circular aperture can be found to be $$H(\rho) = \begin{cases} \frac{2}{\pi} \cos^{-1}\left(\frac{\rho}{2\rho_0}\right) - \frac{\rho}{\pi\rho_0} \sqrt{1 - \left(\frac{\rho}{2\rho_0}\right)^2}, & \rho \leq 2\rho_0 \\ 0, & \text{otherwise} \end{cases} \qquad (85)$$

where $\rho_0$ is given in eq. 80. The spectrum of $H(\rho)$ is shown in FIG. 42.

The 1-D radius filter in the filtered back projection method has a frequency response given by $$h(\rho) = \frac{\rho}{\rho_0}, \quad 0 \leq \rho \leq \rho_0 \qquad (86)$$

where $\rho_0$ is the cut-off frequency. The frequency response is shown in FIG. 43. The filtered output is $$g(r) = IFT\{FT\{f(r)\} \cdot h(\rho)\} \qquad (87)$$

where $g(r)$ and $f(r)$ are the output and the input of the filter, respectively.

Since $h(0)=0$, the zero frequency component should be eliminated completely and the dynamic range of the outputs must be bipolar. However, in an optoelectronic system, photo detectors can only detect intensity of light, and consequently both input signal and output signal should be biased to non-negative values. Therefore, the optical filter is required to be able to separate the zero frequency component of the bias and the zero frequency component of the signal. The zero frequency component of the bias should be passed while suppressing the zero frequency component of the signal. These requirements are contradictory. In order to circumvent the conflicting requirements, an optical complementary filter is proposed. The complementary radius filter decomposes the original radius filter into two components, one is the filtered complementary function of the input while the other is the original input. The output of radius filter is obtained by superimposing the filtered signal on the original input. The frequency response of the low pass complementary filtering channel is given by $$\bar{h}(\rho) = d(\rho) - h(\rho)$$

$$= \frac{\rho_0 - \rho}{\rho_0}$$

-continued $$\text{where } d(\rho) = \begin{cases} 1, & |\rho| \leq \rho_0 \\ 0, & \text{otherwise.} \end{cases} \quad (88)$$

Figure 43A:
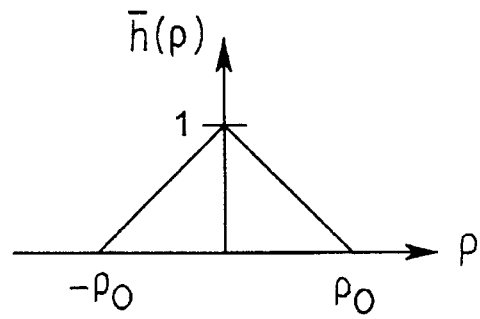
FIGS. 43a–b depict the frequency responses of negative and positive channels of a complimentary filter.
Figure 43B:
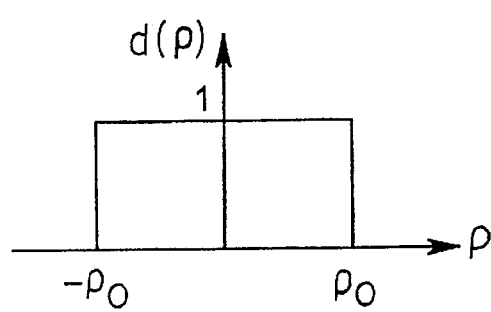
Figure 44A:
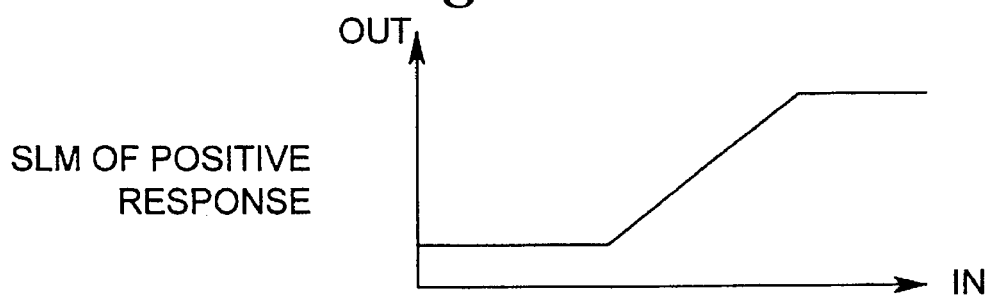
FIGS. 44a–c depict characteristic curves of a negative response SLM and a positive response SLM.
Figure 44B:
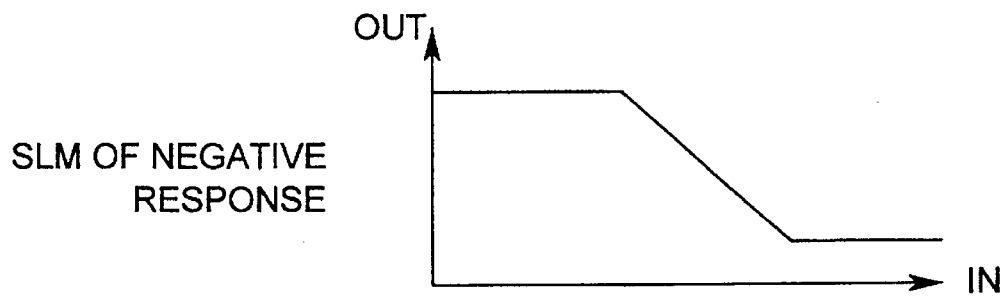
Figure 44C:
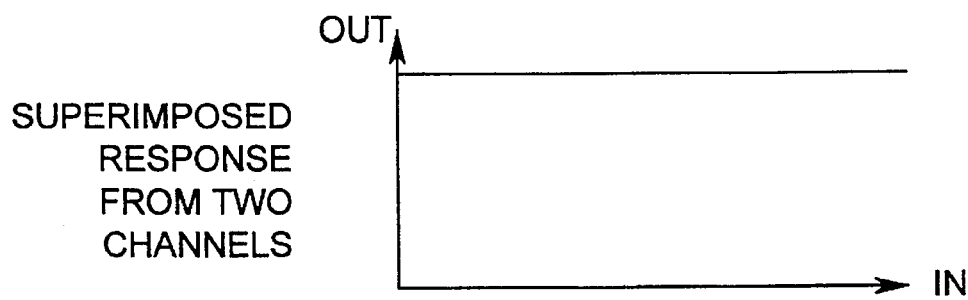

The frequency response is shown in FIGS. 43a–b. The output of the filter can be described as follows $$\begin{aligned} g'(r) &= \left[ \frac{c}{2} + f(r) \right] + IFT \left\{ FT \left\{ \frac{c}{2} - f(r) \right\} \cdot \overline{h}(\rho) \right\}^{(89)} \\ &= \frac{c}{2} + IFT\{FT\{f(r)\}\} + IFT \left\{ FT \left\{ \frac{c}{2} \right\} \cdot \overline{h}(\rho) \right\} + \\ &\quad IFT\{FT\{f(r)\} \cdot [-\overline{h}(\rho)]\} \\ &= c + IFT\{FT\{f(r)\} \cdot [d(\rho) - \overline{h}(\rho)]\} \\ &= c + IFT\{FT\{f(r)\} \cdot h(\rho)\} \\ &= c + g(r) \end{aligned}$$

where g'(r) is the output of the complementary filter and c/2 is the value of the zero frequency component bias light intensity applied to both the filtered and unfiltered channels. The terms [c/2+f(r)] and [c/2–f(r)] in eq. 89 represent biased nonnegative inputs applied to the optical filter. This filter can be implemented by a two lens system with symmetrical positive and negative response SLM's. FIGS. 44a–c show I/O response curves of a pair of symmetric positive and negative SLM's.

The dynamic range of the filtered output is c±c/2 representing about 33% loss in the dynamic range. However, the loss can be compensated for in the form of a zero frequency component bias in the input to the next optically addressed SLM.

Using the complementary radius filter structure, the high pass spatial frequency response of the radius filter is replaced by a low pass response characteristic. In addition, the proposed feedback scheme offers increased tolerance to distortion introduced at the filter stage. The complementary radius can be implemented using incoherent optical systems, such as, the Ronchi pupil and optical transfer function (OTF) synthesis techniques.

The iterative procedure of the IFBP in eq. 78 can be rewritten as a summation in terms of operations of each projection angle. Let q be an index of projections and q=1, 2, . . . , np, and np be the number of angles, then $$x(k) = x(k-1) +$$

$$x(k) = x(k-1) + \alpha \sum_{q=1}^{np} \frac{A_q^T}{\mu(k)} F_{INV-q} R_q F_q \mu(k) [\hat{b}_q - A_q x(k-1)] \quad (90)$$

where μ(k) is inserted as a scaling factor used to keep optoelectronic devices working at their full dynamic range and α is a relaxation coefficient. Variables in eq. 90 with subscript q represent the corresponding submatrices and subvector at the $q^{th}$ projection angle respectively.

Figure 45:
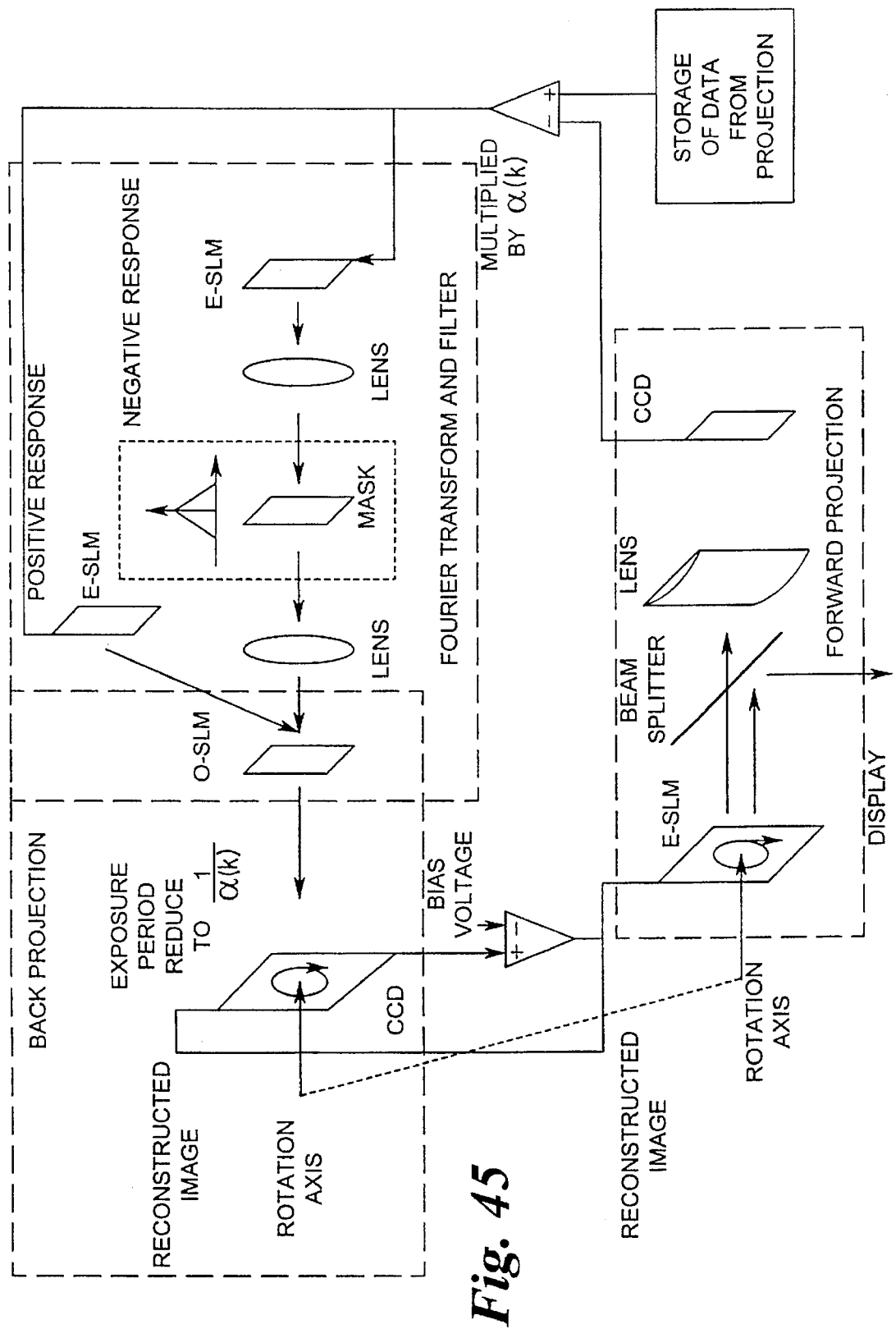
FIG. 45 depicts structure of an optoelectronic implementation of an iterative filtered back projection technique.
Figure 46A:
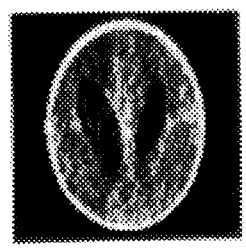
FIGS. 46a–d depict reconstructed images obtained using the IFBP at the $1^{st}$, $2^{nd}$, $3^{rd}$ and $64^{th}$ iterations, respectively with finite numbers of distinguishable grey levels.
Figure 46B:
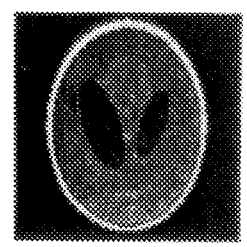
Figure 46C:
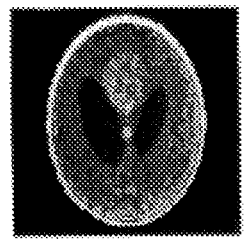
Figure 46D:
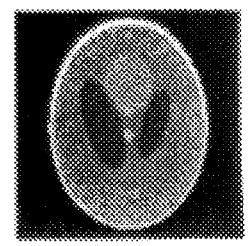
Figure 47A:
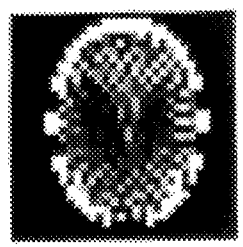
FIGS. 47a–d depict an original 32×32 phantom and the reconstructed images using the IFBP at the $1^{st}$, $256^{th}$ and $30,720^{th}$ iterations, respectively.
Figure 47B:
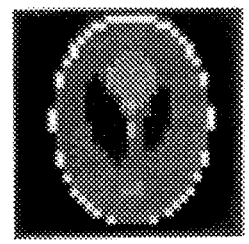
Figure 47C:
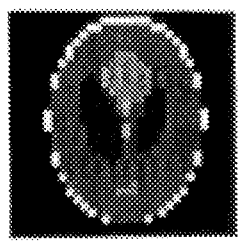
Figure 47D:
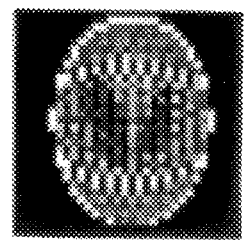

FIG. 45 shows an optoelectronic structure for implementing the IFBP algorithm. There are three major functional blocks in the structure which implementing the back and projection, the forward projection, and the optical radius filter. Implementations of forward and back projections are similar to those used for implementing SIRT and described hereinbefore. Amplifiers are inserted prior to optical filtering. Magnitudes of the error terms are scaled by the factor μ(k) up to the full device range before filtering is performed. During the back projection, the error correction terms are re-scaled correspondingly down to their correct magnitudes by varying the exposure period. As the number of iterations increase, the magnitudes of the errors decrease. Therefore, the distortion caused by the noise associated with the optical transform and the finite dynamic range of the device are minimized by reducing relative errors using the feedback scheme.

FIGS. 46a–d show the result obtained by simulating the IFBP algorithm for synthesizing a 128×128 image. The dynamic range of the SLM's and the filter are set at 256 and ±16 respectively. The system is overdetermined (M>N) to the same degree as that employed for the simulation of the SIRT. The result shows that the first reconstructed image is distorted due to the poor accuracy associated with the filtering. The distortion is corrected after the second and third iteration. When these results are compared with the results obtained in the simulation of the SLM/CCD implementation of SIRT in FIG. 24, it is seen that the number of iterations required to obtain the same level of performance is significantly lower when the IFBP method is employed. In addition, the distortion is reduced when the numbers of distinguishable dynamic ranges of the SLM's are set at the same level as before, i.e., 256.

FIGS. 47a–d show reconstructed images (32×32) converging to the original cross-section. The number of projections is 60 and projections are taken from a 32×32 original cross-sectional image.

The IFBP algorithm is an iterative version of the FBP algorithm. With the IFBP, iterative reconstructions are speeded up significantly and distortion in the reconstructed images is reduced. When the system is overdetermined, the solution of IFBP minimizes the least square errors of the filtered projections in the frequency domain with a square root radius filter.

The potential application of this algorithm is in high speed and low cost optoelectronic systems. Inaccuracies associated with optical systems is minimized within a few iterations. The structure can also be used to implement the Projection Space Iterative Reconstruction-Reprojection (PIRR) algorithm in limited view tomography applications.

Accelerated Method Using a FIR Filter

In this section, another accelerated method utilizing an FIR filter is proposed. In addition, a hybrid prototype using off-the-shelf devices for implementing the algorithms is proposed.

The convolution back projection method (CBP) for direct tomographic image reconstruction utilizes spatial domain FIR filtering instead of frequency domain filtering for the filtered back projection method (FBP). An hybrid structure implementing digital FIR filtering and optical back projection has been proposed by Gmitro, et. al. However, the large size of the FIR filter increases the cost and processing time. In addition, distortions caused by the optical back projection stage cannot be avoided. The PIRT iterative procedure, not only allows distortion to be corrected, but also the length of the FIR filter can be significantly reduced. It will be shown that the reconstruction can be accelerated process considerably by using only a few taps. It will also be shown that the PIRT with partial convolution (PIRT-PC) converges to the minimum-norm solution for an underdetermined system. In order to circumvent the limitations of finite dynamic range of the both back projection and forward projection SLM's, an alternative iterative procedure—called the residual iterative reconstruction technique (RIRT) is presented.

Hybrid Approach

The rationale behind optical implementations of tomographic forward and back projections has been described extensively in literature. The optical forward projection processor is also called optical Radon Transformer and employs the same principle as the optical Hough transform feature space processor. Optical back projection processors have been used for implementing direct reconstruction algorithms. The optoelectronic implementations of iterative algorithms using CCD and SLM arrays were discussed previously. A hybrid prototype consisting of an SLM/CCD back projection processor, a digital auxiliary image processor, an SLM/CCD forward projection processor and an auxiliary projection processor is proposed in the section. The SLM and the CCD arrays in the back projection processors are a linear FLC SLM (Ferroelectric Liquid Crystal SLM) array and a commercial CCD image detecting array respectively. The SLM and CCD arrays in the forward processor consists of a LCTV SLM (Liquid Crystal TV SLM) panel and a linear CCD detector array respectively. The auxiliary processors in the image and projection spaces can be built using commercial microprocessors. The two additional electronic digital microprocessor-based auxiliary processors are important for flexibility and ensuring stability.

In an analog electrically addressed SLM, the output light intensity is proportional to the applied voltage. Several distinguishable gray levels can be obtained using such SLM's. In the case of binary SLM's, the output can be either in the "ON" or "OFF" states. Analog SLM's are very often used in image and signal processing applications. However, commercial available analog SLM's, such as the LCTV, can only operate at the speed of about 100 Hz. Binary SLM's, such as FLC SLM, can however be operated at a rate of about 100 KHz. In many applications, analog SLM's operating at KHz rates are desired. In this section, a method of implementing high speed analog SLM's for generating multiple gray levels using fast binary SLM's is described.

The convolution back projection method can be derived from the filtered back projection method. A filtered projection in eq. 75 can be described as $$Q(\theta,r) = \int_{-\rho_0}^{\rho_0} P(\theta,\rho) e^{j2\pi\rho r} d\rho \tag{91}$$

$$\text{where } H(\rho) = \begin{cases} |\rho| & |\rho| < \rho_0 \\ 0 & \text{otherwise} \end{cases}$$

and $P(\theta, r)$ is the Fourier representation of the measured projections. The frequency response is shown in FIG. 38. The impulse response, h(r) in the spatial domain, is given by the inverse Fourier transform of $H(\rho)$ which is $$h(r) = \int_{-\infty}^{\infty} H(\rho) e^{j2\pi\rho r} d\rho \tag{92}$$

$$= 2 \int_0^{\rho_0} \rho \left( \frac{e^{j2\pi\rho r} + e^{-j2\pi\rho r}}{2} \right) d\rho$$

$$= 2\rho_0 \left[ \frac{\sin 2\pi r \rho_0}{2\pi r \rho_0} - \frac{1}{2} \left( \frac{\sin r \rho_0}{r \rho} \right)^2 \right]$$

Figure 48:
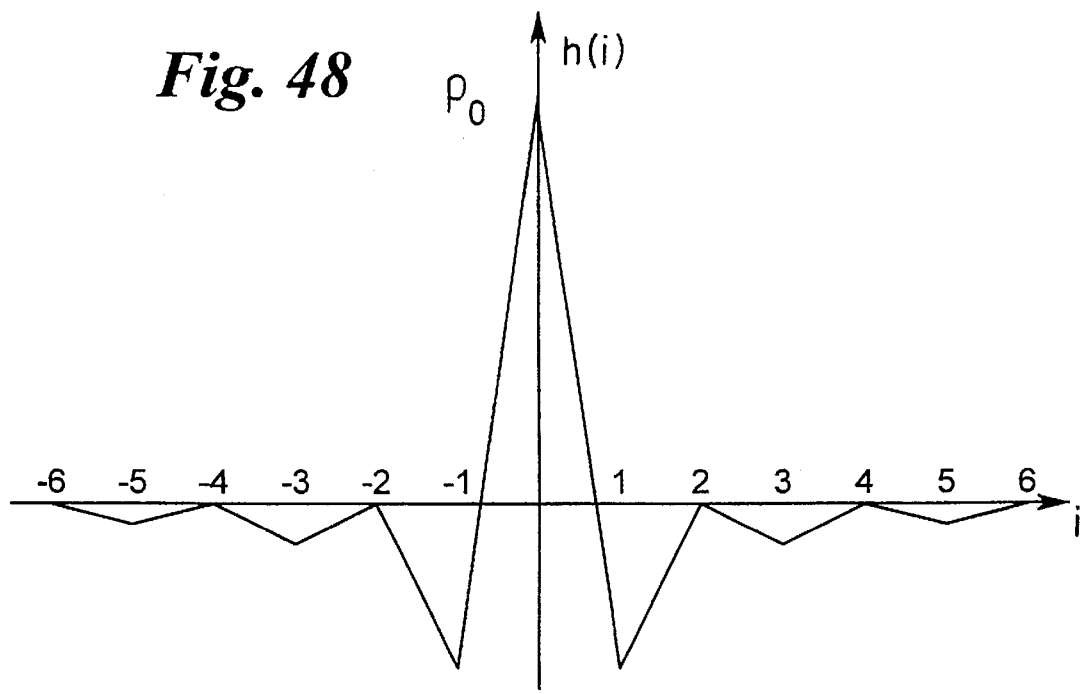
FIG. 48 depicts an impulse response of a radius filter.

In the discrete case, we substitute the sampling interval $T=\frac{1}{2} \rho_0$ in eq. 92, to obtain the impulse response h(i), i=−∞ to ∞, $$h(i) = 2\rho_0 \left[ \frac{\sin \pi i}{\pi i} - \frac{1}{2} \left( \frac{\sin \pi i/2}{\pi i/2} \right)^2 \right] \tag{93}$$

which is shown in FIG. 48. The impulse response can be rewritten as $$h(i) = \begin{cases} \rho_0, & i = 0 \\ 0, & i \text{ even} \\ -\rho_0 \cdot \frac{4}{\pi^2} \cdot \frac{1}{i^2} & i \text{ odd} \end{cases} \tag{94}$$

Using the convolution theorem, the filtered projection in eq. 91 can be written as $$Q(\theta, r) = \int_{-\infty}^{\infty} b(\theta, r') h(r - r') dr' \tag{95}$$

where $b(\theta, r)$ is the measured projection. In discrete form $$Q(\theta, i) = \sum_{k=-\infty}^{\infty} h(k) b(\theta, i-k) \tag{96}$$

As in the case of the FBP method described by eq. 76, the cross-sectional image can be reconstructed by superimposing all filtered projections at different projection angles in the image plane. Using the convention defined in eq's. 91 to 93, the convolution back projection method can be expressed in matrix form. We truncate h[i] and incorporate a finite number of samples in the impulse response the matrix H. Then, the reconstruction scheme can be expressed as $$x = A^T H b \tag{97}$$

where H is an M×M matrix representing the zero-padded convolution operation given by $$H = \begin{bmatrix} \tilde{H} & 0 & 0 & \cdots & 0 \\ 0 & \tilde{H} & 0 & \cdots & 0 \\ & & \cdots\cdots\cdots & & \\ 0 & 0 & 0 & \cdots & \tilde{H} \end{bmatrix} \tag{98}$$

$$\tilde{H} = \begin{bmatrix} h(0) & h(1) & h(2) & \cdots & h(m-1) \\ h(1) & h(0) & h(1) & \cdots & h(m-2) \\ h(2) & h(1) & h(0) & \cdots & h(m-3) \\ & & & \cdots\cdots\cdots & \\ h(m-1) & h(m-2) & h(m-3) & \cdots & h(0) \end{bmatrix}$$

and m is the number of ray-sums per projection. The matrix H is not only symmetric but also positive definite because it is diagonally dominant for any finite m. The diagonal dominant nature can be shown as follows, $$\sum_{\substack{i=-\infty \\ i \neq 0}}^{\infty} |h(i)| = \left( 2 \cdot \frac{4\rho_0}{\pi^2} \right) \cdot \left( \sum_{j=1}^{\infty} \frac{1}{(2j-1)^2} \right) \tag{99}$$

$$= \left( \frac{8\rho_0}{\pi^2} \right) \cdot \left( \frac{\pi^2}{8} \right)$$

$$= \rho_0$$

and $$h(0) + \sum_{\substack{i=-\infty \\ i \neq 0}}^{\infty} |h(i)| = \rho_0$$

Therefore, when m is finite, $$h(0) > \sum_{-m, m \neq 0}^{m} |h(i)| \tag{100}$$

It has been shown that, when the dimensions of the system are finite, H is symmetric and positive definite and the inverse, $H^{-1}$, exists. A reduced order convolution scheme can be used as an FIR filter to accelerate the convergence of the PIRT algorithm. The improved algorithm can be expressed as $$t_k = t_{k-1} + \alpha\, H\, [b - A\, x_{k-1}]$$

$$x_k = \beta\, A^T\, t_k \tag{101}$$

where $\beta = 1/\|AA^T\|_2$ is used to normalize the projections and $\alpha$ is chosen so that $\|I - \alpha\beta AA^{TT}\|_2 < 1$. The solution will converge to the minimum-norm solution provided the system is underdetermined $$\lim_{k \to \infty} t_k = [\beta HAA^T]^{-1} Hb \tag{102}$$

$$= \frac{1}{\beta}\, [AA^T]^{-1} b$$

and $$\lim_{k \to \infty} x_k = A^T [AA^T]^{-1} b$$

Eq. 101 represents the basic PIRT accelerated by partial convolutions (PIRT-PC). The coefficients of the $n^{th}$ order filter are given by $$h(i) = \begin{cases} \rho_0, & i = 0 \\ -\rho_0 \cdot \frac{4}{\pi^2} \cdot \frac{1}{i^2}, & i \text{ odd and } i \leq n \\ 0, & \text{otherwise.} \end{cases} \tag{103}$$

Employing the reduced convolution, reconstructions of the high frequency components are speeded up. Usually, only a few taps are needed in order to accelerate the convergence of high frequency components. When the order of the FIR filter reduces to zero, H becomes an identity matrix reducing the approach to the basic PIRT.

Let $r_k$ denote the residual in the projection space. A tomographic reconstruction system using the information contained in the residual to arrive at the minimum-norm solution can be described as follows $$r_k = r_{k-1} - \alpha AA^T H r_{k-1} \tag{104}$$

$$= r_{k-1} + A d_{k-1}$$

$$d_k = \alpha A^T H r_k$$

$$x_k = x_{k-1} + d_k$$

where H is the partial convolution matrix and $\alpha$ is chosen so that $\|I - \alpha AA^{TT}H\| < 1$. The initial values can be chosen as $r_0 = b$ and $x_0 = 0$. The method described by eq. 104 is similar to the steepest descent method with a fixed descent step $\alpha$. The matrix H can be considered as a preconditioning matrix. The algorithm expressed by eq. 99 will be referred to as the residual iterative reconstruction technique (RIRT).

The convergence properties can be derived as follows. By substituting $r_{k-m}$ by $[I - \alpha AA^{TT}]\, r_{k-(m+1)}$ into eq. 104 recursively until $m = k-1$, we obtain $$r_k = [I - \alpha AA^T H] r_{k-1} \tag{105}$$

$$= [I - \alpha AA^T H]^k r_0$$

and $$x_n = \sum_{k=0}^{n} \alpha A^T H r_k \tag{106}$$

Substituting eq. 105 into eq. 106

$$\begin{aligned} x_n &= \alpha A^T H \left\{ \sum_{k=0}^{n} [I - \alpha AA^T H]^k \right\} r_0 \\ &= \alpha A^T H \{I - [I - \alpha AA^T H]\}^{-1} \\ &\quad \left\{ \{I - [I - \alpha AA^T H]\} \left\{ \sum_{k=0}^{n} [I - \alpha AA^T H]^k \right\} \right\} r_0 \\ &= A^T [AA^T]^{-1} \{I - [I - \alpha AA^T H]^{n+1}\} r_0 \end{aligned} \tag{107}$$

When $\|I - \alpha AA^{TT}\|_2 < 1$, and $n \to \infty$, $$[I - \alpha AA^T]^{n+1} \to 0 \tag{108}$$

The solution, $x_n$, converges to $$\lim_{n \to \infty} x(n) = A^T [AA^T]^{-1} r_0 \tag{109}$$

where $r_0 = b$

An alternative iterative procedure can be written as $$r_k = r_{k-1} - \alpha\, A\, A^T H\, r_{k-1}$$

$$t_k = t_{k-1} + \alpha\, H\, r_k \tag{110}$$

The final solution is $$x = A^T \lim_{k \to \infty} t_k \tag{111}$$

For an under determined system, the solution obtained using the algorithms described by eqs. 104 and 110 are the same if numerical errors are ignored. If the system is overdetermined, the state vector t given by eq. 100 will diverge in the projection space.

Hybrid Prototypic Solution

Optoelectronic architectures for implementing a variety of iterative reconstruction algorithms have been outlined in previous sections. This section describes a hybrid prototypic system that can be built to establish the proof of principle. The hybrid system employs off-the-shelf devices.

Figure 49:
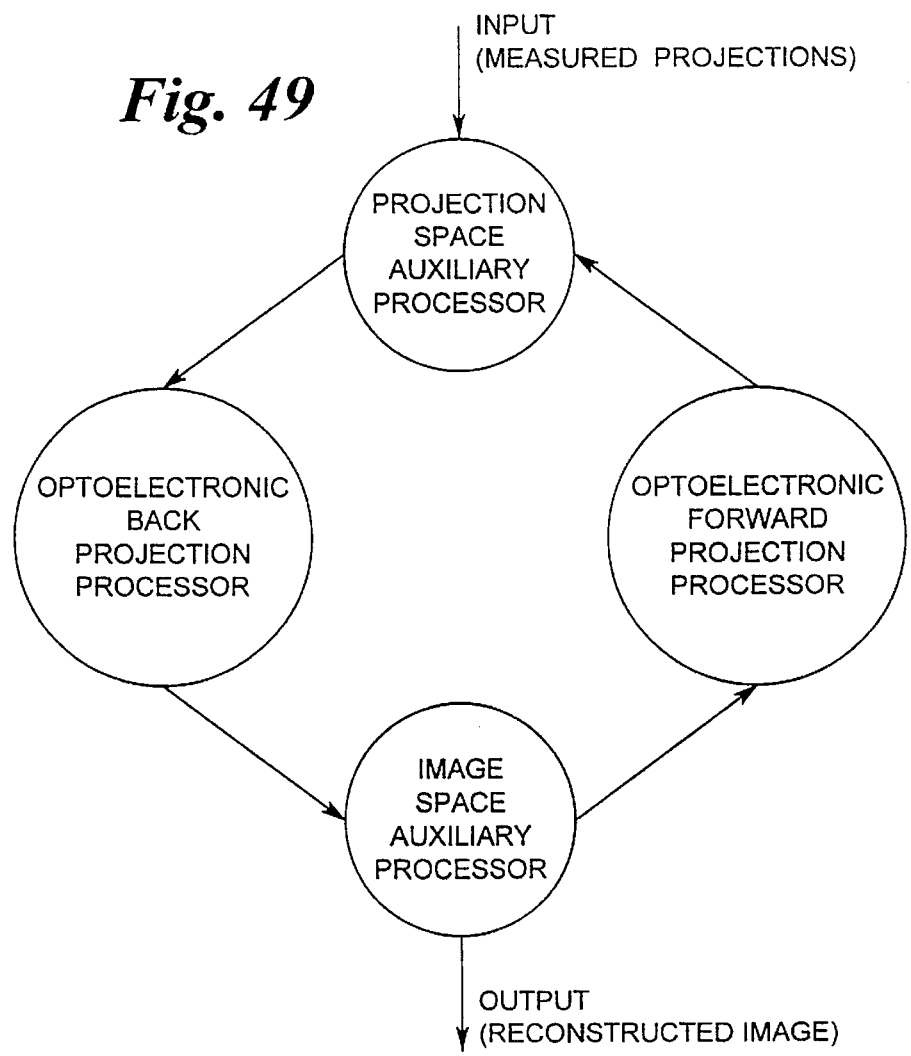
FIG. 49 depicts a line diagram of a proposed hybrid prototype.

FIG. 49 shows a line diagram outlining the basic building blocks in the system. The building blocks include An Optoelectronic Back Projection Processor.

An Optoelectronic Forward Projection Processor.

An Image Space Auxiliary Processor.

A Projection Space Auxiliary Processor.

Each of the building blocks is described briefly in the following sections.

The back projection operations in tomographic image reconstruction involves mapping the data in the projection space into the image space from all the measured projection angles. The optoelectronic back projection processor shown in FIG. 50 performs the tomographic back projection operations. It consists of:

a linear array of analog SLM's and a cylindrical lens.

an image detection array.

an image rotator.

Figure 50:
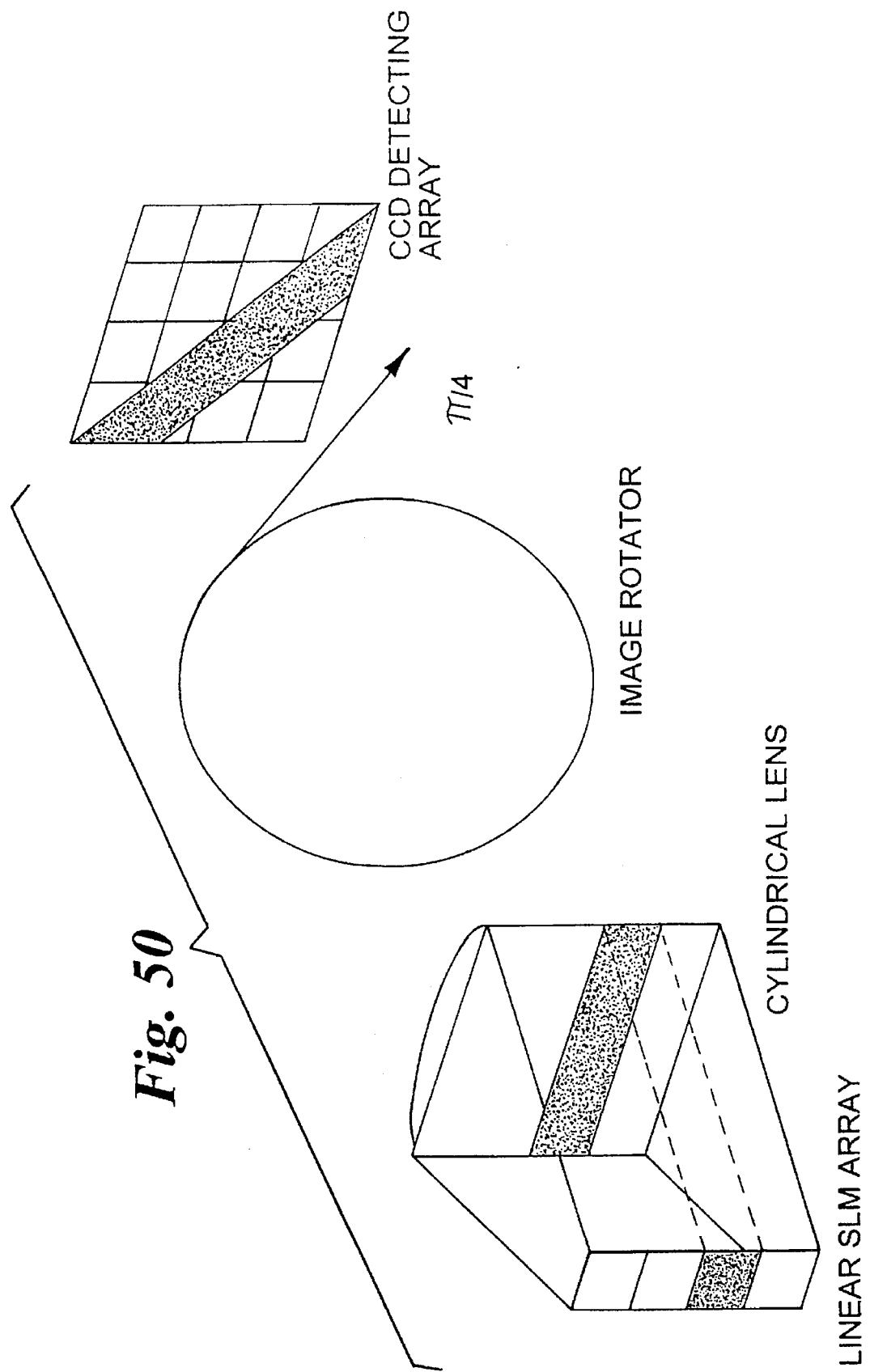
FIG. 50 depicts projection data back projected into an image space at the same angle as when an original measured projection was taken.

The transmissivity of the linear SLM array represents the magnitudes of the data in the projection space corresponding to a projection angle. The pattern in the linear array is then "stretched" into an array of strips as shown in FIG. 50. The linear SLM array is not specified deliberately since a wide range of choices are available. Among those choices is the Ferroelectric Liquid Crystal (FLC) SLM..

The image detection array integrates the projection data, corresponding to the area intercepted on the pixel by the light beam, at all the projection angles. The image detection array can be a CCD image detector or a commercial CCD TV camera.

Figure 51A:
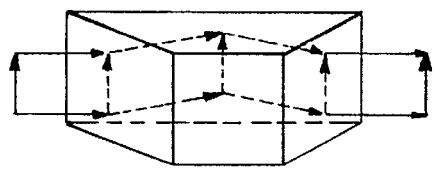
FIGS. 51a–c depict a dove prism rotated 0, 45 and 90 degrees counterclockwise, respectively.
Figure 51B:
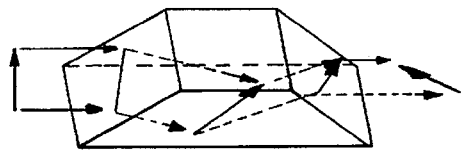
Figure 51C:
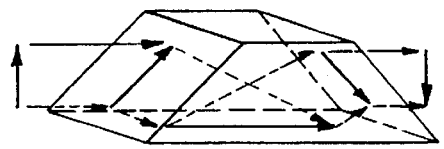

A complete set of back projections involves performing back projection operations at all the projection angles over an angle of 180°. The purpose of the image rotator is to rotate the projection pattern to the corresponding projection angle relative to the image detector. The most commonly used image rotator consists of a dove prism image rotator driven by a stepper motor. FIGS. 51a–c show a dove prism image rotator where the prism is rotated 0, 45 and 90 degrees and the image is rotated 0, 90, and 180 degrees correspondingly.

The dove prism image rotator is not electronically connected to the mechanical rotating part. However, optical distortions may be introduced by the prism. The operation can also be performed by rotating the linear SLM array and the lens "back and forth" over a range of 180°. Alternative approaches using a static structure can also be employed.

The Optoelectronic Forward Projection Processor

Figure 52:
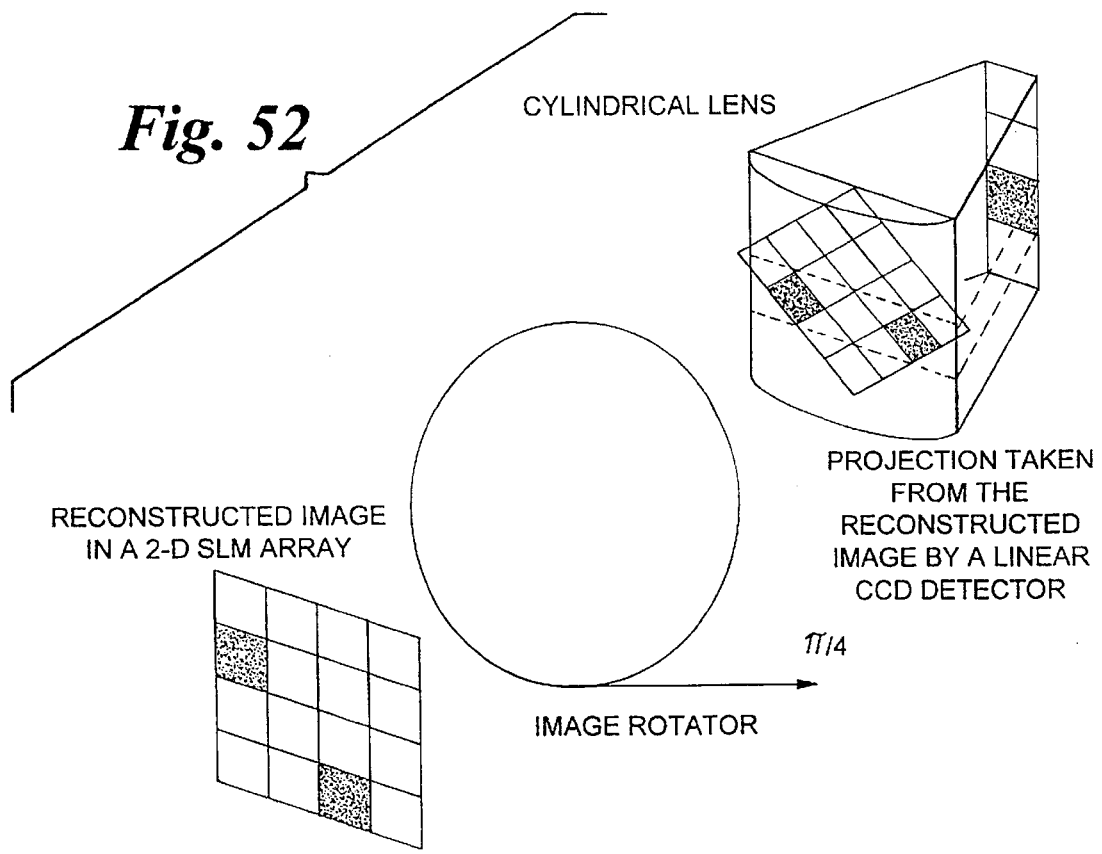
FIG. 52 depicts a forward projection processor wherein the reconstructed image is forward projected into projection space at the same angle which the original measured projection was taken.

The optoelectronic forward projection processor as shown in FIG. 52 performs the forward projection operation to map the data in the image space into the projection space. It consists of:

an image display array.

a linear projection detector array and a cylindrical lens.

an image rotator.

The image display array displays a reconstructed image using either a two dimensional analog SLM or a commercial liquid crystal projection TV. The linear projection detector array detects the image generated by the cylindrical lens. The linear projection detector array can be a linear CCD array. The role and the design of the image rotator is identical to the one described in the preceding section.

Since operations of image addition can be performed directly on the CCD array, a separate image auxiliary processor may not be required. However, when the performance of devices is not guaranteed, additional flexibility and improvement in accuracy can be gained by employing an auxiliary processor. The processor is required to be able to store a frame of the image and perform simple pixel by pixel addition or subtraction. Real-time digital video image processors which are commercially available can be used to perform these operations.

The basic functions of the auxiliary space processor are:

to receive data from the forward projection detector arrays.

perform simple arithmetic operations.

store projections.

and send data to the back projection linear SLM array.

This basic auxiliary processor can be built using either a commercial digital microprocessor or a special purpose processor.

Most commercial analog SLM's are developed for building television displays. Examples include liquid crystal SLM panels used for image projectors. The refresh or update periods for analog SLM's are typically in the range of video frame rates, i.e., one to ten milliseconds. Unfortunately, the algorithms described earlier involve several hundreds of projections in each iteration. If such analog SLM's are used for implementing the 1-D back projections, then the resulting processing period will be in the range of a few seconds. In order to increase the processing speed, high speed 1-D analog SLM's are required. This can be accomplished by controlling the duration of exposure instead of relying on the need for varying the gray levels continuously.

Figure 53A:
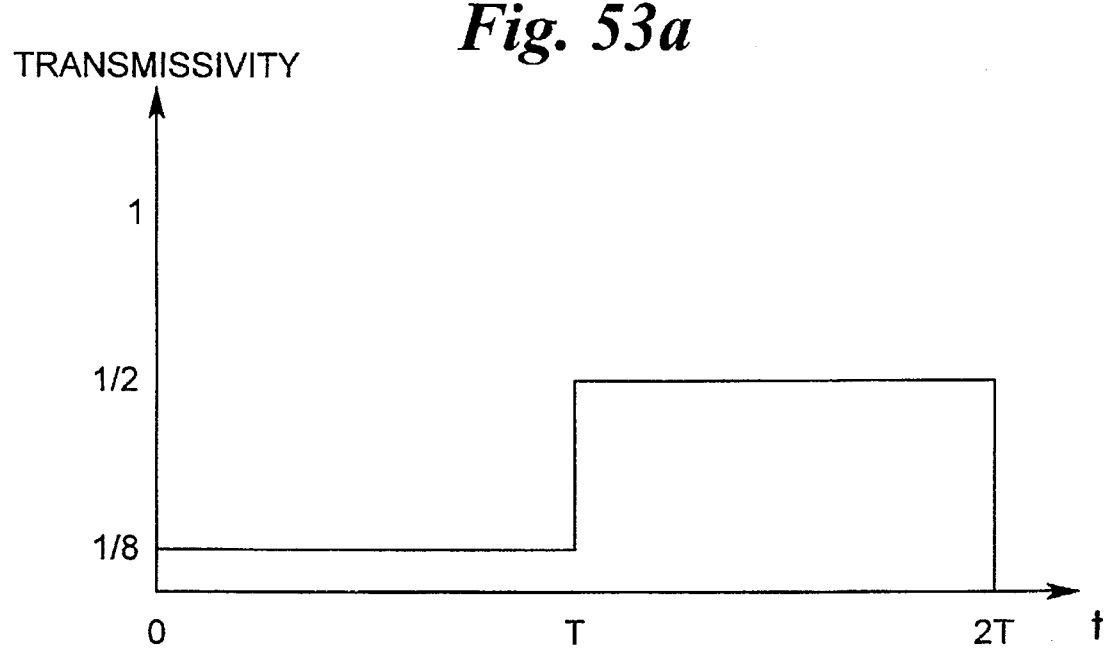
FIGS. 53a–b depict a timing diagrams for the control of exposure period for an analog SLM.
Figure 53B:
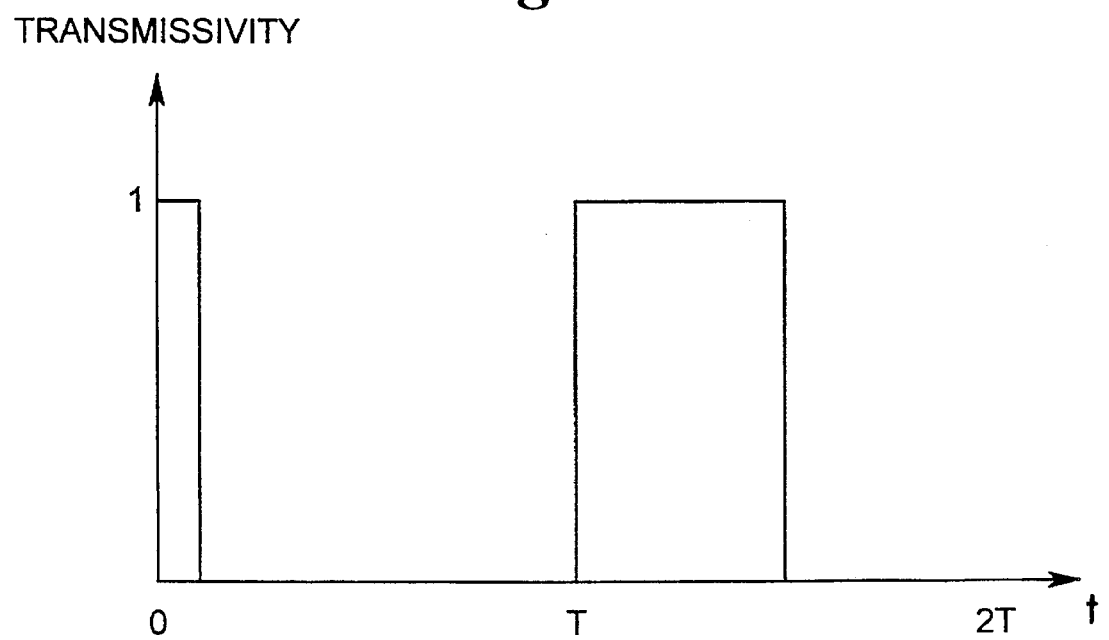

CCD detectors are essentially integrating devices generating charge/voltage levels proportional to the intensity of the incident light and the exposure period. When the CCD array is coupled with a SLM array, the charge/voltage levels in the CCD can be controlled by varying either the intensity of the light being integrated or the "ON" period of the SLM. Since most fast SLM's are binary in nature, we proposed to use the latter approach to control the CCD signal. The timing diagram of scheme is shown in FIGS. 53a–b.

Figure 54:
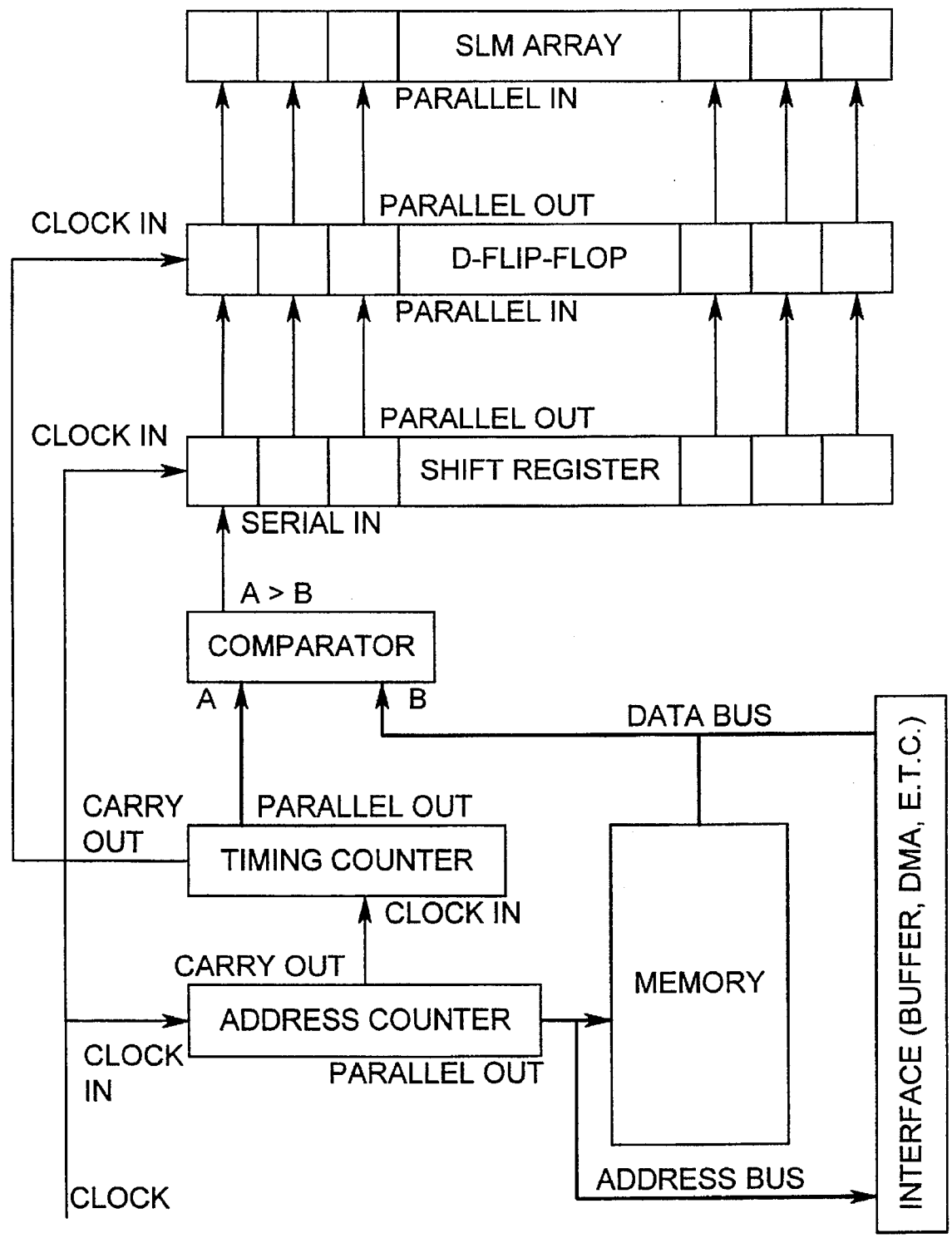
FIG. 54 depicts a circuit implementation of an analog SLM array using a binary SLM array.

This circuit consists of a comparator, an address counter, a timing counter, timing memories, and registers as shown in FIG. 54. Values of grey levels of the SLM cells are preloaded into the timing memories. A cell is switched "OFF" when the value of the timing counter is larger than the value stored in the corresponding timing memory. The cell remains "ON" otherwise. During each timing counter clock period, the contents of the timing memories are read out sequentially with the address generated by the address counter.

Figure 55:
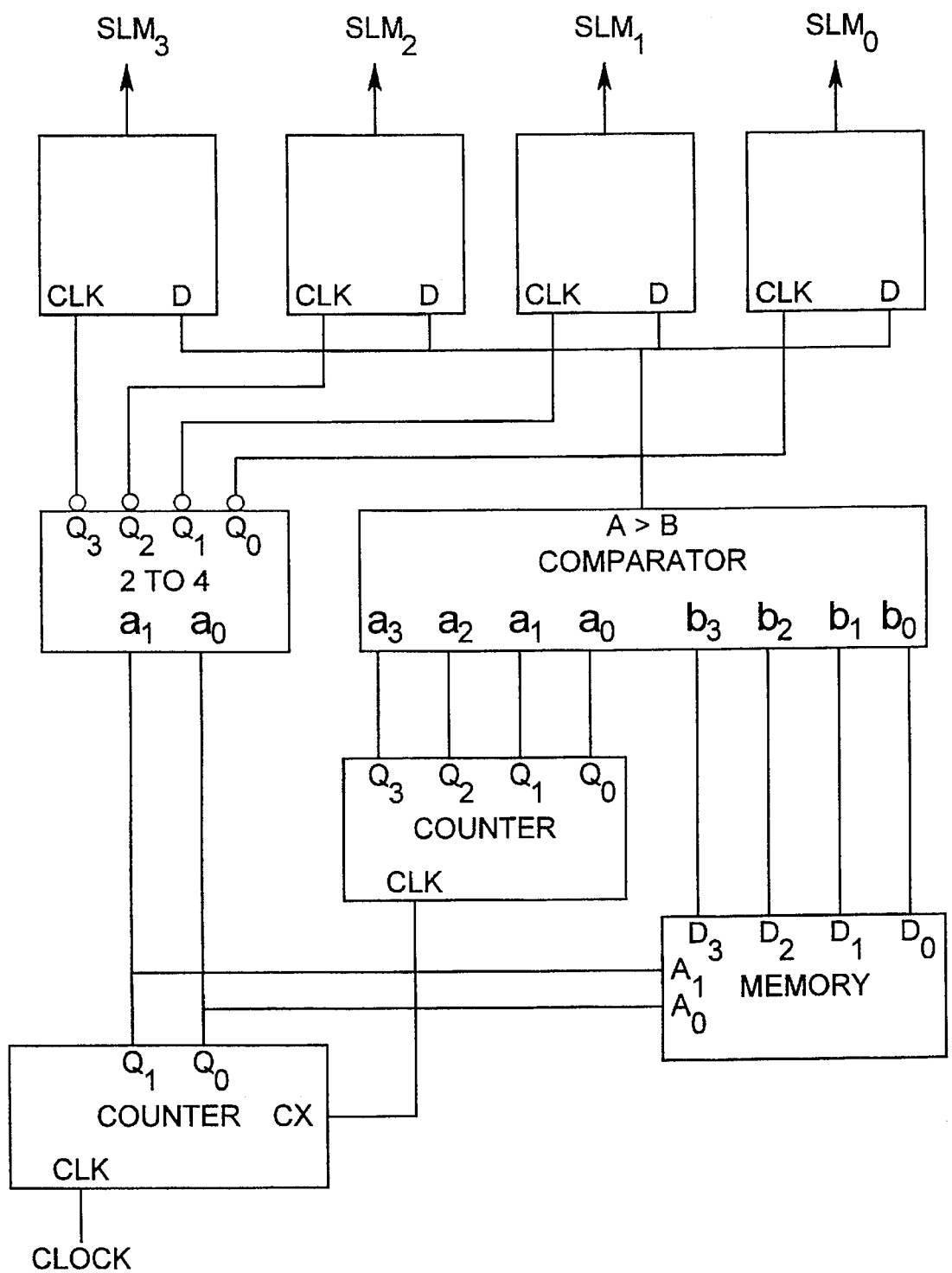
FIG. 55 depicts four SLM cells and 16 grey levels.
Figure 56A:
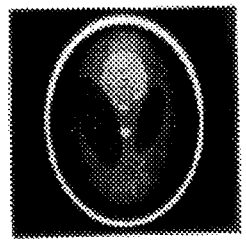
FIGS. 56a–d depict reconstructive images at the $8^{th}$, $16^{th}$, $32^{nd}$ and $64^{th}$ iterations, respectively obtained using PIRT-PC.
Figure 56B:
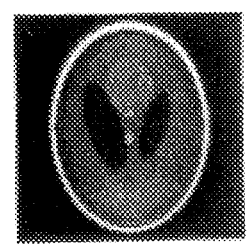
Figure 56C:
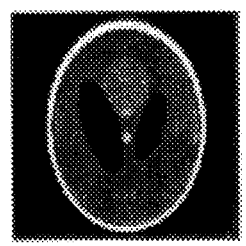
Figure 56D:
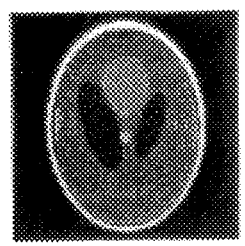
Figure 57A:
FIGS. 57a–d depict reconstructed images at the $8^{th}$, $16^{th}$, $32^{nd}$ and $64^{th}$ iterations, respectively obtained using basic PIRT.
Figure 57B:
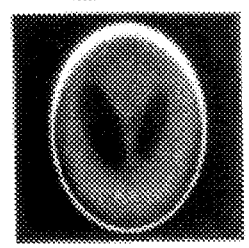
Figure 57C:
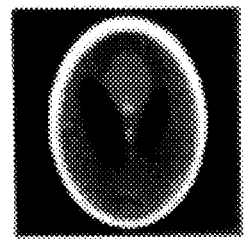
Figure 57D:
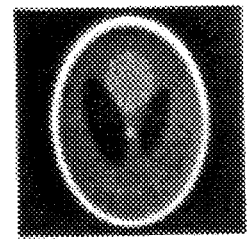

An example involving four SLM cells and sixteen gray levels is shown in FIG. 55. The address counter is clocked at a period $T_{address}$. The timing counter is clocked by the carry output of the address counter whose period is $T_{timing}$. The period $T_{timing} = m \times T_{address}$ where m is the number of SLM cells driven by the circuit. During each $T_{timing}$, all the timing parameters in the memories are scanned out and compared with the output of the timing counter. If the value read out from the memory is less the value of the counter, then the corresponding SLM cell is set to one, else it is reset to zero. The maximum number of gray levels which can be represented is given by $$n = \frac{T_{total} - T_{update}}{T_{address} \times m} \tag{112}$$

where $T_{total}$ is the frame period for an analog SLM and $T_{update}$ is the time required for updating the memories. When the number of SLM cells is large, the speed depends on the speed of the circuit at which it can be driven.

After all the n gray levels are counted, the memories are updated by the external data with a fast memory access technique, such as a direct memory access scheme (DMA). When a large number of SLM cells are to be driven, the cells can be partitioned into blocks. The size of blocks depends on the desired driving speed.

When the timing clock period is less than the SLM settling time, the resolution deteriorates. The problem can be circumvented by setting a constant zero bias exposure time which is equal to the minimum SLM settling time. The additional offset can be subtracted from the output of each CCD detector.

The dynamic range of reconstructed image is mainly affected by three factors:

a) The nonnegative offset associated with the projection data may reduce the actual dynamic range to approximately 10%.

b) The finite dynamic range of the back projection 1-D SLM array.

c) The finite dynamic range of the forward projection 2-D SLM array.

The first effect can be eliminated by back projecting the positive and negative projection data separately. In addition, the error caused by the finite contrast ratio can also be minimized by using the dual projection scheme.

The RIRT described in eq. 104 provides a method for minimizing distortions caused by the finite dynamic ranges of the SLM arrays. In the iterative procedure, only back and forward projections of residuals are involved. In a stable feedback system, the magnitude of the residual will vanish as the number of iterations increase. Therefore, the vanishing residuals can always be adjusted to fit the maximum dynamic range of the SLM arrays and then rescaled back appropriately using the auxiliary processors after optical projections.

Figure 58:
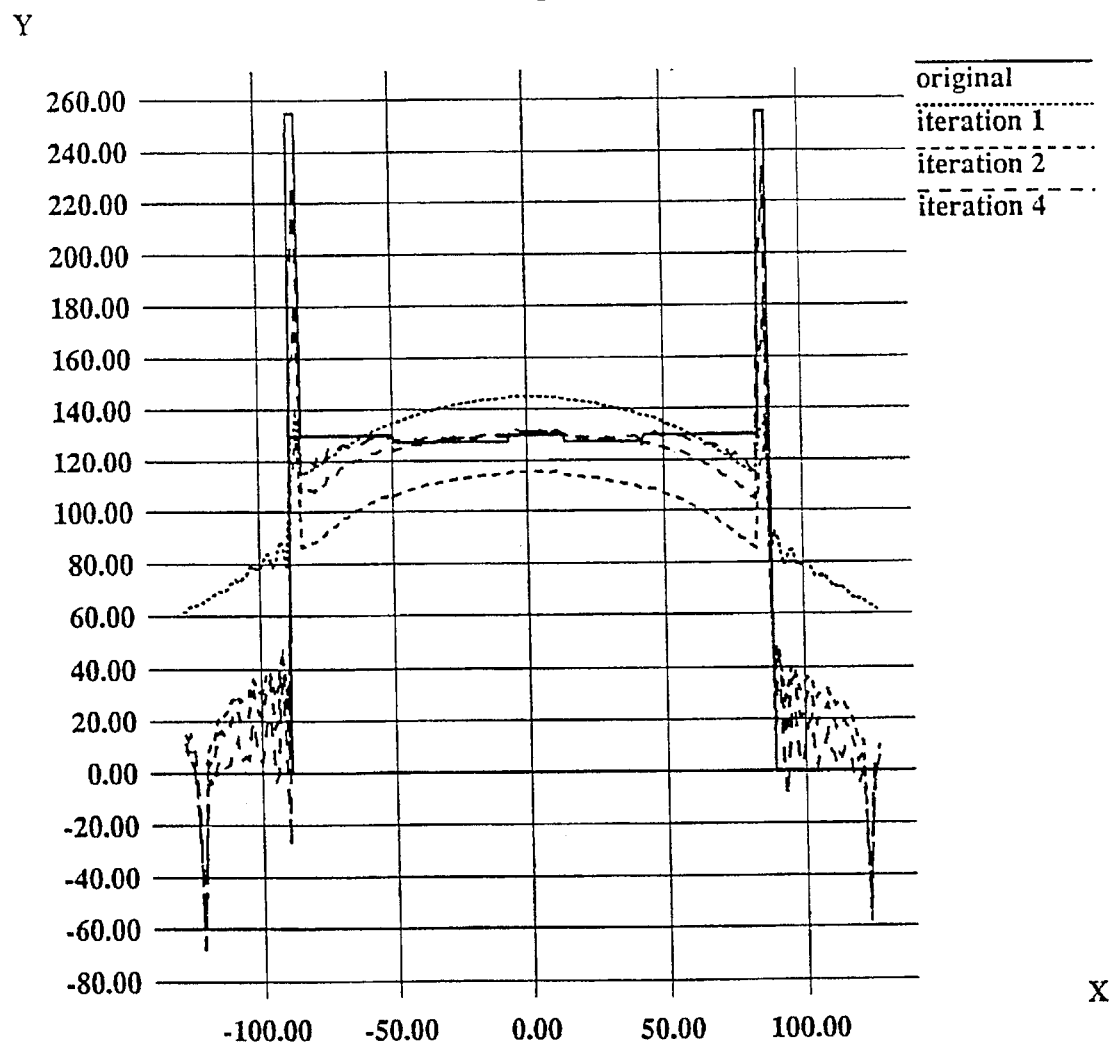
FIG. 58 depicts cross-sections of reconstructed images at the $1^{st}$, $2^{nd}$, $4^{th}$ and $8^{th}$ iterations obtained using PIRT-PC.
Figure 59:
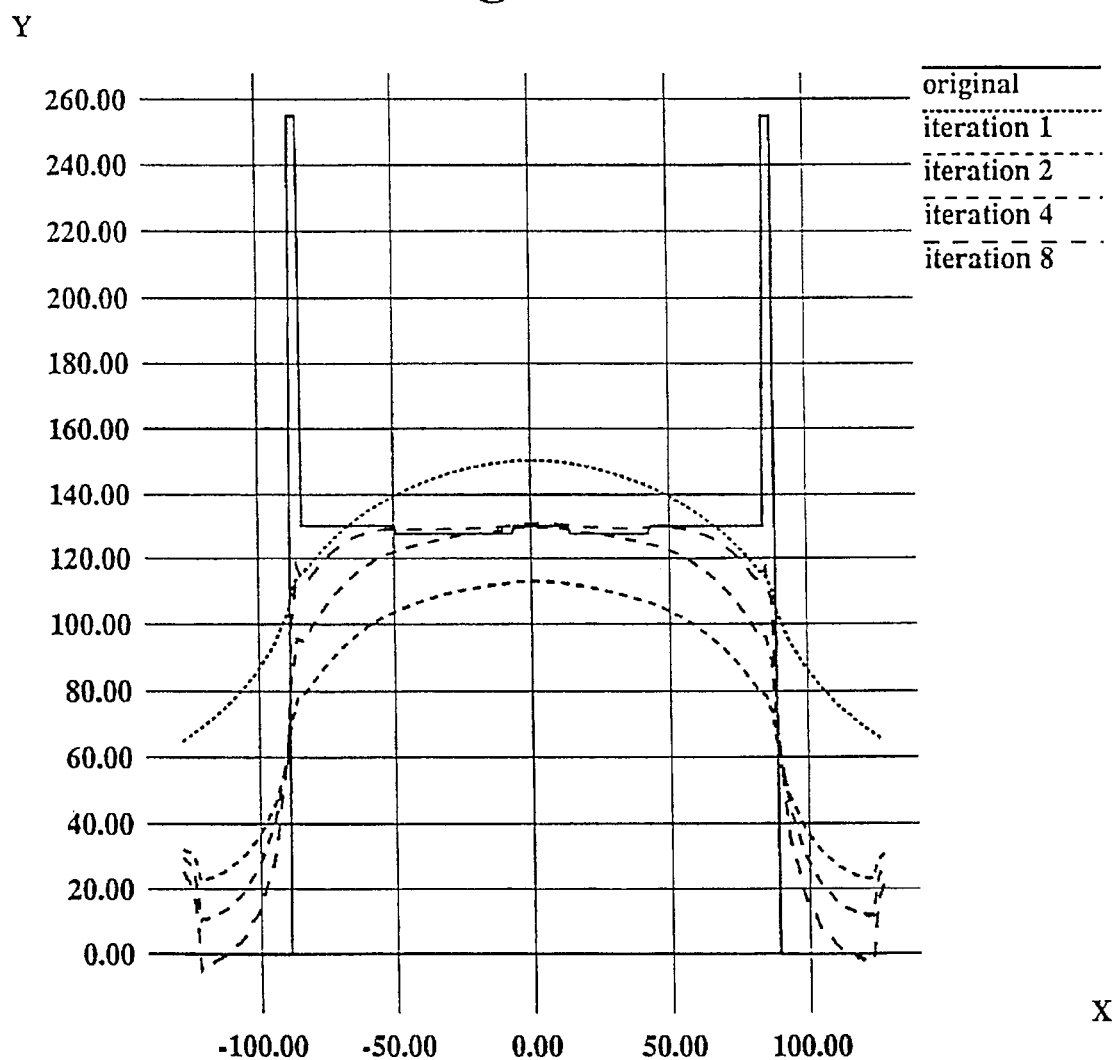
FIG. 59 depicts cross-sections of reconstructed images at the $1^{st}$, $2^{nd}$, $4^{th}$ and $8^{th}$ iterations obtained using basic PIRT.

FIGS. 56a–d show the reconstructed Shepp and Logan phantom at the $8^{th}$, $16^{th}$, $32^{nd}$, and $64^{th}$ iterations when a third order FIR filter (n–3, n–1, n, n+1, n+3) is used. FIGS. 57a–d show the reconstructed images obtained using the basic PIRT at the same iterations. FIGS. 58 and 59 are cross-sections of reconstructed images using PIRT-PC and PIRT respectively where the number of iterations are 4, 8, 16 and 32. It is apparent that the convergence of high frequency components is accelerated considerably when a short FIR filter is used. However, the speed of convergence of the low frequency components does not improve.

Figure 60:
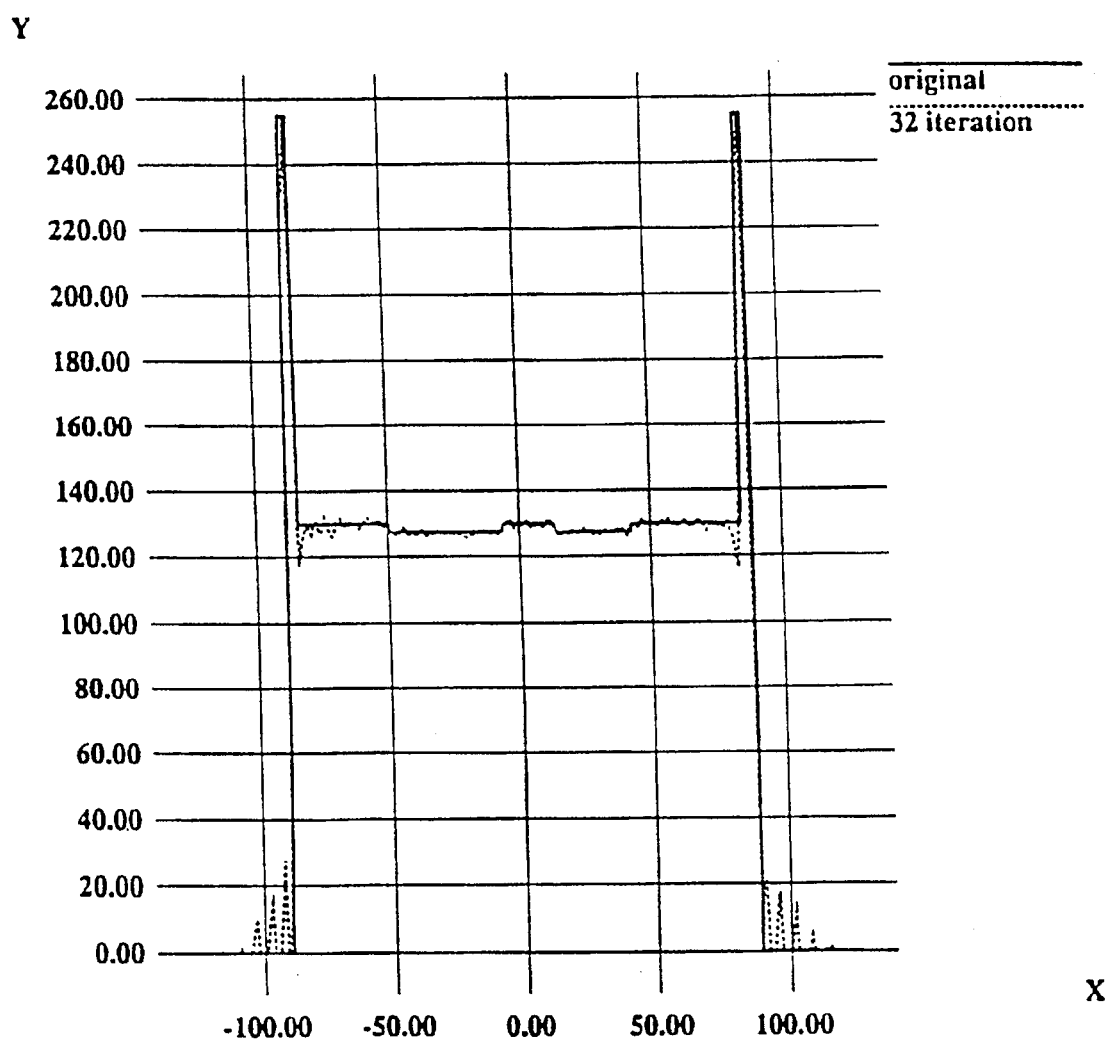
FIG. 60 depicts cross-sections of reconstructed images at the $32^{nd}$ iteration obtained using PIRT-BC with constraints and assuming finite dynamic range.
Figure 61:
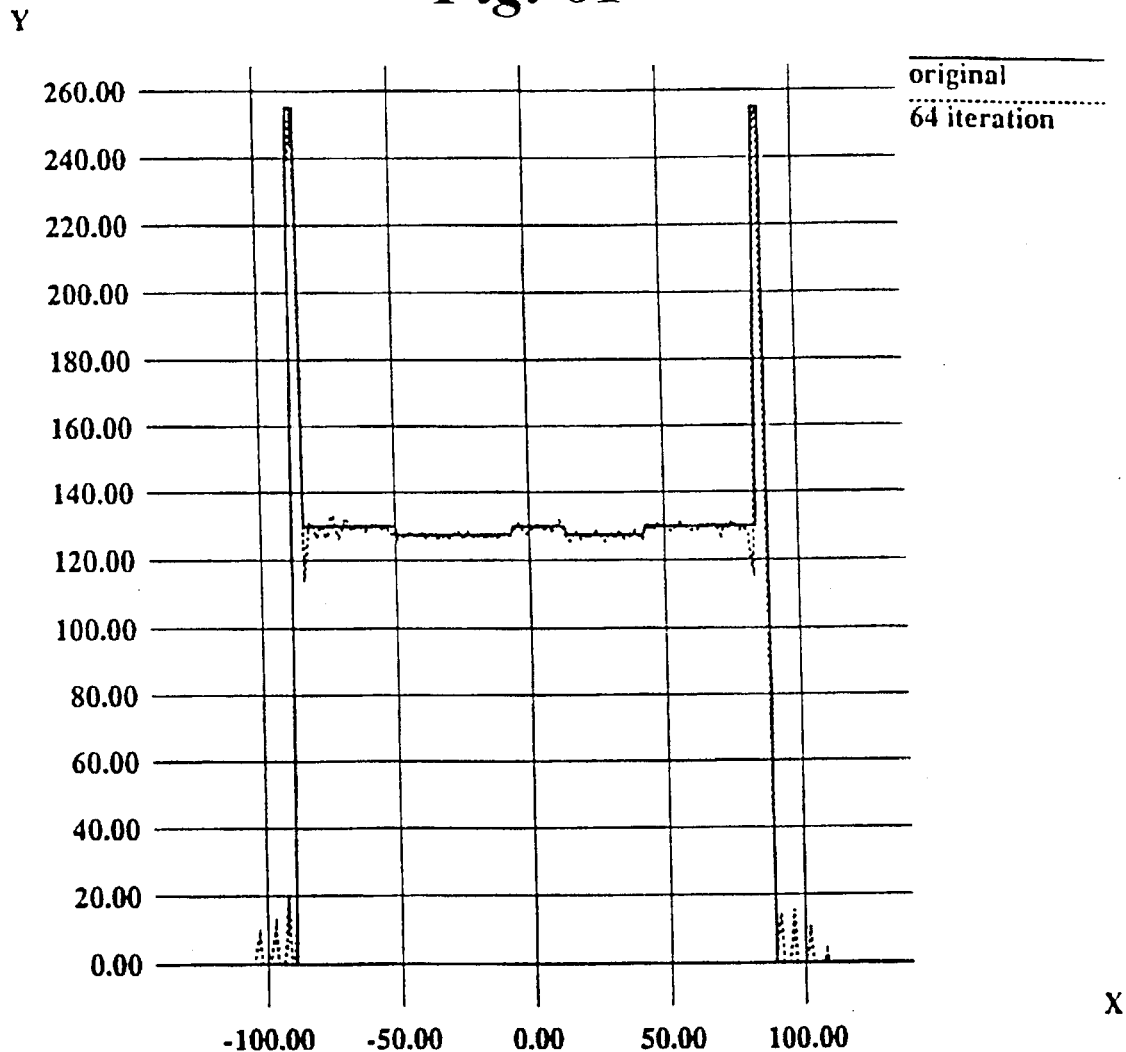
FIG. 61 depicts cross-sections of reconstructed images at the $64^{th}$ iteration obtained using PIRT-PC with constraints and assuming finite dynamic range.
Figure 62A:
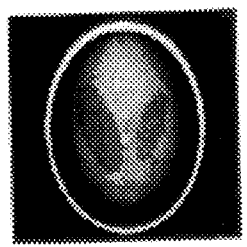
FIGS. 62a–d depict reconstructed images at the $8^{th}$, $16^{th}$, $32^{nd}$ and $64^{th}$ iterations, respectively, obtained using PIRT-PC with constraints and assuming finite dynamic range.
Figure 62B:
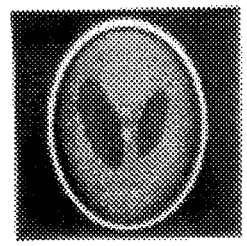
Figure 62C:
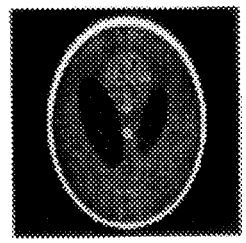
Figure 62D:
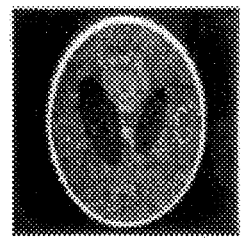

FIGS. 60 and 61 show plots of the cross sections at the $32^{nd}$ and $64^{th}$ iterations respectively. The error across the image, as shown in FIG. 60 is less than 1% of the entire dynamic range except for regions where the variation is sharp. The plot shown in FIG. 61 indicates that there is very little improvement in the result after 32 iterations. If commercial video devices operating at 30 frames per second are employed, then the reconstruction time, with an expected contrast resolution of less than 1%, is about 1 second.

Finite dynamic ranges (numbers of distinguishable grey levels) of both forward and back projection SLM arrays represent the dominant source of distortion in the structure. The dynamic ranges of the available CCD arrays are much higher than those of available SLM arrays and consequently the effects can be neglected. In the simulation, 256 distinguishable gray levels are imposed by normalizing the state variable t and the reconstructed image x and quantizing them into 255 distinguishable levels before projecting. In addition, the reconstructed image is constrained to be within the range 0 to 255. FIGS. 62a–d show reconstructed images at the $8^{th}$, $16^{th}$, $32^{nd}$ and the $64^{th}$ iterations. The results show that, compared to the image obtained by PIRT-PC without quantization as seen in FIGS. 56a–d, the distortion is insignificant.

Figure 63:
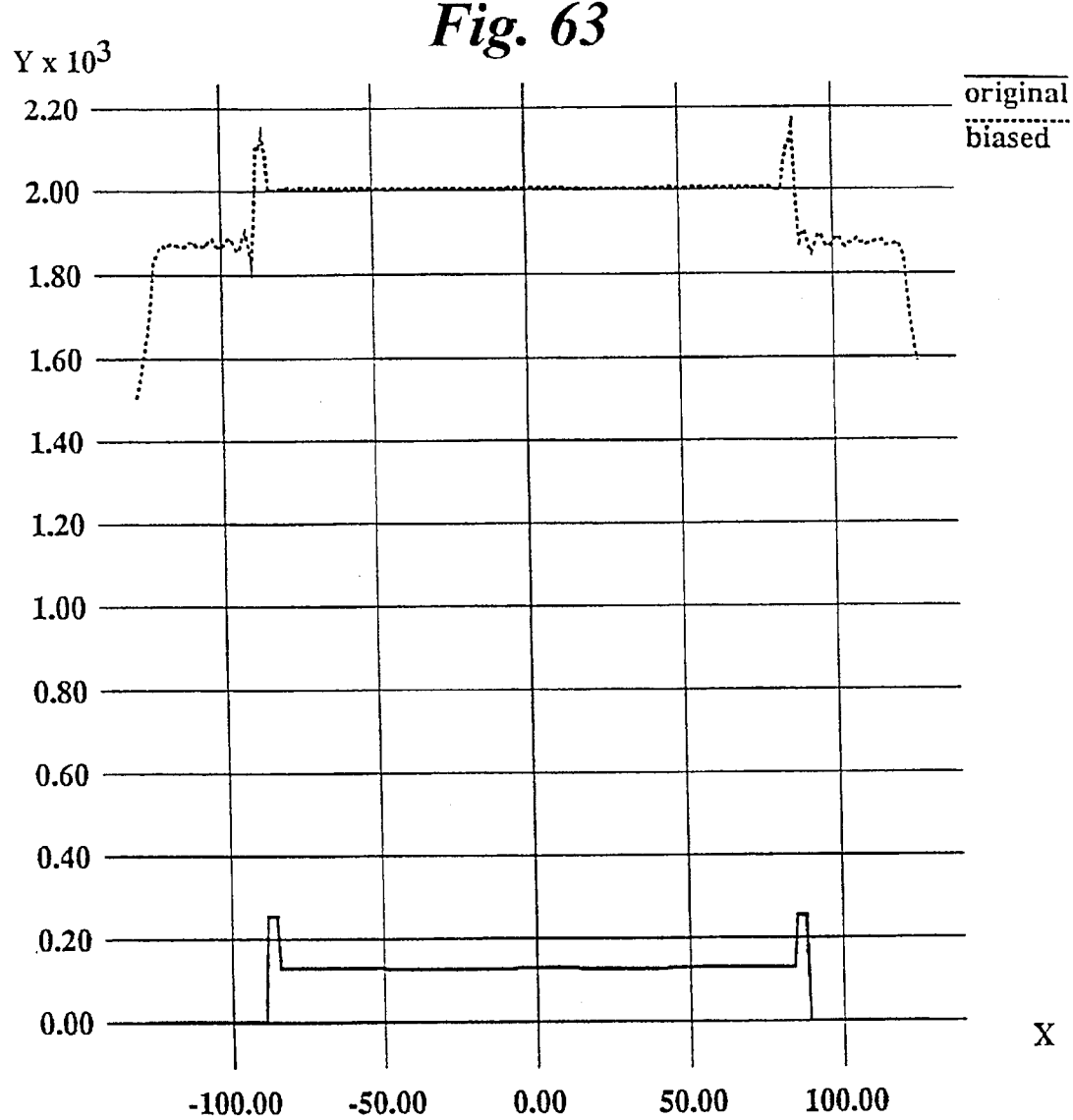
FIG. 63 depicts a cross-section of an image where all projections are biased to non-negative values.
Figure 64:
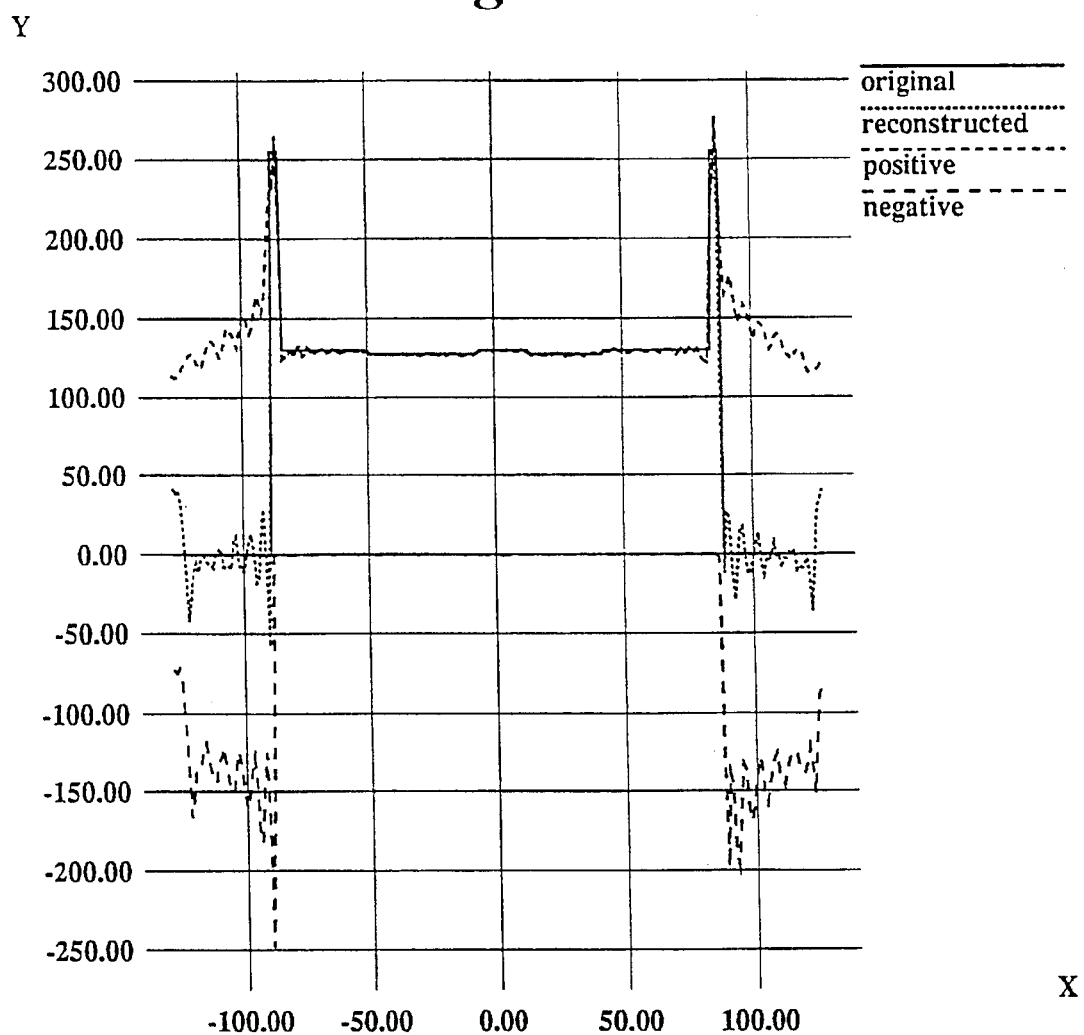
FIG. 64 depicts cross-sections of two reconstructed images where the images are reconstructed by processing positive and negative protection separately.

If all projections are biased to nonnegative values, then, only about ten percent of the dynamic range in the image space is available. FIG. 63 shows a plot of the cross-section of a reconstructed image using this strategy. However, if projections are separated into positive and negative projections and back projected separately, then, there is no degradation in the useful dynamic range in the image space as shown by the plot in FIG. 64.

The PIRT-PC proposed in this section is a combination of PIRT and reduced CBP. This algorithm is capable of reducing the cost associated with a full size convolution with CBP, correct the errors of reduced length convolutions, and possesses superior convergence properties relating to PIRT. In addition, the method guarantees the minimum-norm solution for an underdetermined system.

The proposed hybrid prototype described in this section represents a practical design which can be built using off-the-shelf video and optoelectronic devices. The prototype design represents a first step. The additional electronic processors in the projection and the image space not only offer flexibility which is necessary while building the first prototype. But also enables us to investigate other algorithms. In comparison with existing approaches, the proposed structure offers

* reduced dependency on the accuracy of filter devices.
* reduced dependency on the precision and dynamic range of optoelectronic devices.
* significant reduction in the cost of filtering devices.

Several iterative tomographic image reconstruction methods have been presented. These methods are based on the projection iterative reconstruction technique. In contrast to conventional approaches, the algorithms described herein offer superior results when the tomographic system is underdetermined and computational errors are present.

New system concepts, involving the use of optoelectronic devices for implementing iterative tomographic image reconstruction algorithms, have also been proposed. The optoelectronic feedback structures built with conventional optical and imaging devices offer high speed reconstructions with quality levels required in medical applications.

The PIRT algorithm has been developed for tomographic image reconstruction. As shown in Table 5, the new algorithm differs from the conventional iterative algorithms, such as SIRT, in that it solves for a state vector in the projection space in contrast to conventional algorithms which solve for the solution in the image space. The feed back process in PIRT is performed in the projection space. Hence, iterative error corrections in the image space are avoided. The feedback scheme in SIRT is implemented in the image space leading to complications in optoelectronic implementations.

TABLE 5

| | SIRT and PIRT Algorithms | |
|---|---|---|
| algorithm | SIRT | PIRT |
| expression | $x(k) = x(k-1) + A^T(b - Ax(k-1))$ | $t(k) = t(k-1) + (b - AA^T t(k-1))$ |
| feedback | image space | projection space |

When a system is underdetermined, the new algorithm PIRT is superior to the conventional SIRT algorithm since it guarantees a unique minimum-norm solution. The properties of the two algorithms are compared in table 6.

TABLE 6

| Comparison of Performance for Underdetermined Systems | | |
|---|---|---|
| algorithm | SIRT | PIRT |
| solution | not unique | minimum-norm |
| convergence | not unique | guaranteed |
| cg method | does not converge | guaranteed |
| initial image | no unique solution | minimum norm of difference |
| with constrant | no unique solution | minimum-norm in reduce space |

However, the PIRT is not useful for solving overdetermined systems since the state vector may diverge in the projection space as show in table 7.

TABLE 7

Comparison of Performance for Overdetermined Systems

| algorith | SIRT | PIRT |
|---|---|---|
| solution convergence | least squares guaranteed | least squares diverges in projection space |

The tomographic reconstruction algorithms described in this dissertation include PIRT, PIRT-CG, PIRT-PC, RIRT and IFBP.

The PIRT is a basic iterative algorithm for solving large sparse underdetermined systems. The PIRT is considered as a counterpart of the conventional iterative algorithm SIRT. The PIRT solves for the minimum-norm solution of normal equations whereas the conventional algorithms are based on a strategy for computing the least squares solutions. The PIRT guarantees unique solutions for underdetermined systems while conventional algorithms provide unique solutions when systems are overdetermined.

The PIRT-CG method differs from the conventional SIRT-CG methods in that it applies the conjugate gradient acceleration method to solve for a state vector in the projection space instead of directly solving for a solution vector in the image space. Therefore, when the system is underdetermined, the algorithm does not diverge since the matrix of the state equation is not singular.

The PIRT-PC method is another accelerated PIRT type algorithm in which a short order FIR filter is used to speed up the convergence of high frequency components. Results show that when a third order filter is used, the convergence can be accelerated significantly. The PIRT-PC is a simple and efficient algorithm, and should therefore be preferred for optoelectronic implementations.

The RIRT recursively eliminates the residue in the projection space instead of building a state vector. RIRT algorithms are equivalent to SIRT, PIRT, PIRT-CG, PIRT-PC or the steepest descent type algorithms depending on the acceleration technique used. When computational errors exist, the algorithm does not guarantee uniqueness of the solution.

The IFBP is a SIRT type algorithm whose convergence properties are improved by using a spatial frequency filter. This algorithm is mainly useful for optoelectronic implementations since optical devices can be used to build a fast spatial frequency domain filter although the accuracy is relatively poor. The structure uses a feedback scheme to eliminate distortions associated with optical transforms.

The structure implementing SIRT is simple and does not employ sophisticated filtering or convolution processing units. The structure for implementing IFBP using optoelectronic devices employs a high speed, low accuracy, inexpensive optical filter to accelerate convergence.

In the case of SIRT, the error corrections are superimposed on the previously reconstructed image. Therefore, errors introduced by optoelectronic devices may be accumulated in the reconstructed image. This is especially true, if the system is underdetermined where the accumulated errors may cause divergence and reach the dynamic range limits of devices. With the proposed PIRT algorithm, the need for superimposing images is eliminated. This leads to a smoother image with a better spatial resolution from fewer projection data. The PIRT has reduced the complexity of structures for optoelectronic tomographic reconstruction. In addition, schemes for acceleration, such as PIRT-PC, can be implemented without additional expense.

Iterative tomographic image reconstruction algorithms are commonly used in single photon emission computerized tomography (SPECT) and positron emission tomography (PET). Applications of PIRT type algorithms for SPECT and PET applications need to be further developed.

Many iterative estimation algorithms have been developed based on statistical models of tomographic systems. Some of these algorithms can be implemented using PIRT as a tool.

Only optoelectronic implementations of additive iterative reconstruction algorithms have been presented. Multiplicative iterative reconstruction algorithms are also commonly used. Multiplicative algorithms offer solutions which are nonnegative and are therefore attractive for optoelectronic implementation.

Multiplicative x-ray tomographic algorithms can be implemented with a slightly modified optoelectronic structure. In the modified structure, only an additional SLM array needs to be coupled to the back projection CCD array. The system concept is straightforward. However, the theoretical foundations are yet to be developed.

A hybrid prototype for implementing the iterative algorithms has been proposed. The hybrid structure can provide flexibility required for pursuing further research. The prototype can be built using commercial available optoelectronic devices and reach a speed of 30 frames per second.

Novel optoelectronic systems for implementing iterative tomographic image reconstruction algorithms have been proposed. In order to exploit the advantages of optoelectronic devices fully, a new iterative tomographic image reconstruction algorithm—PIRT has been developed. The PIRT algorithm is general, in that it can be employed to solve a wide variety of problems involving large sparse matrices and underdetermined systems. The ideas developed in the present invention are, therefore, far broader in scope than their narrow application to tomographic reconstruction described here would suggest.

Summary

The tomographic reconstruction scheme outlined in this disclosure offers many advantages over conventional methods of implementation. In comparison with existing approaches, the method outlined herein offers reduced dependency on the accuracy of filter devices.

reduced dependency on the precision and dynamic range of optoelectronic devices.

significant reduction in the cost of filtering devices.

The new algorithm PIRT is superior to the conventional algorithm SIRT since a unique solution is guaranteed when the system is underdetermined. The PIRT-PC is a combination of the PIRT and reduced CBP. This algorithm is able to reduce the cost of a full size CBP, correct the errors of reduced CBP, and accelerate the convergence of the PIRT.

We claim:

1. A back projection processor, comprising:

(a) a 2-D charge coupled device (CCD) detecting array;

(b) spatial light modulator (SLM) projection means for generating, using spatial light modulation, in response to input data representing a 1-D image, a corresponding 1-D image stretched along one axis to provide a stretched 1-D image, and for projecting the stretched 1-D image onto the 2-D CCD detecting array;

(c) image rotation means for orienting a stretched 1-D image projected by the SLM projection means on the 2-D CCD detecting array at a desired projection angle, the 2-D CCD detecting array outputting back projected data; and (d) whereby the back projection processor smears a 1-D image represented in a data array onto the 2-D CCD detecting array.

2. A forward projection processor, comprising:

(a) a CCD detecting array;

(b) SLM projection means for generating, using spatial light modulation, in response to input data representing a 2-D image, a corresponding image compressed along one axis to provide a compressed 1-D image, and for projecting the compressed 1-D image on the CCD detecting array, the CCD detecting array outputting forward projected data, (c) image rotation means for orienting a compressed 1-D image projected by the SLM projection means on the CCD detecting array at a desired projection angle; and (d) whereby the forward projection processor forward projects a 2-D image represented in a data array onto the CCD detecting array.

* * * * *

UNITED STATES PATENT AND TRADEMARK OFFICE
CERTIFICATE OF CORRECTION

PATENT NO. : 5,654,820

DATED : August 5, 1997

INVENTOR(S) : Tongxin Lu et al.

It is certified that error appears in the above-identified patent and that said Letters Patent is hereby corrected as shown below:

At Col. 5, line 26, please delete "Specificaitons" and insert --Specifications--.

At Col. 5, line 34, under "Material", please delete "Iron" and insert --Iron garnet--.

At Col. 5, line 34, under "Semetex SMID", please delete "2000" and insert --100--.

At Col. 5, line 34, under "Contrast Ratio", Semedex SMID, please delete "---" and insert --$10^4:1$--.

At Col. 5, line 35, under "Litton MOSLM", please delete "100" and insert --2000--.

At Col. 21, line 57, please delete "$2.0 \leq z$" and insert --$2.0 \leq z$--.

At Col. 28, line 41, please delete "where $M \leq N$" and insert --where $M \leq N$--.

At Col. 28, line 49, please delete "$A, M \leq N,$" and insert --$A, M \leq N,$--.

At Col. 29, line 47, please delete "$a_x =$" and insert --$a_k =$--.

At Col. 30, line 37, please delete "$a_x =$" and insert --$a_k =$--.

At Col. 31, line 11, please delete "$a_x =$" and insert --$a_k =$--.

UNITED STATES PATENT AND TRADEMARK OFFICE
CERTIFICATE OF CORRECTION

PATENT NO. : 5,654,820

DATED : August 5, 1997

INVENTOR(S) : Tongxin Lu et al.

It is certified that error appears in the above-identified patent and that said Letters Patent is hereby corrected as shown below:

At Table 4, "iteration" and "algorithm" should be on the same line separated by a slash mark.

At Col. 37, line 26, please delete "$\pi$" in both locations and insert --$\lambda$-- in both locations.

At Col. 38, line 16, please delete "$p \leq 2\ po$" and insert --$p \leq 2\ po$--.

At Col. 38, line 25, please delete "$o \leq p \leq po$" and insert --$o \leq p \leq po$--.

At Col. 39, line 44, please delete "$x(k)=x(k-1)+$".

At Col. 41, line 40, please delete "$P(\theta, p)\ e$" and insert --$P(\theta, p)\ H(p)\ e$--.

At Col. 43, line 32, please delete "i odd and $i \leq n$" and insert --i odd and $i \leq n$--.

Signed and Sealed this

Sixteenth Day of March, 1999

Attest:

Q. TODD DICKINSON

*Attesting Officer*            *Acting Commissioner of Patents and Trademarks*